United States Patent [19]
Malcolm et al.

[11] 3,913,070
[45] Oct. 14, 1975

[54] MULTI-PROCESSOR DATA PROCESSING SYSTEM

[75] Inventors: Donald H. Malcolm, Minneapolis, Minn.; Matthew E. Kramer, San Jose, Calif.

[73] Assignee: Memorex Corporation, Santa Clara, Calif.

[22] Filed: Feb. 20, 1973

[21] Appl. No.: 333,770

[52] U.S. Cl. .............................................. 340/172.5
[51] Int. Cl.[2] ...................... G06F 9/18; G06F 15/16
[58] Field of Search .................................. 340/172.5

[56] References Cited

UNITED STATES PATENTS

| | | | |
|---|---|---|---|
| 3,386,082 | 5/1968 | Stafford et al. | 340/172.5 |
| 3,480,914 | 11/1969 | Schlaeppi | 340/172.5 |
| 3,537,074 | 10/1970 | Stokes et al. | 340/172.5 |
| 3,573,852 | 4/1971 | Watson et al. | 340/172.5 |
| 3,641,505 | 2/1972 | Artz et al. | 340/172.5 |
| 3,643,227 | 2/1973 | Smith et al. | 340/172.5 |
| 3,648,253 | 3/1972 | Mullery et al. | 340/172.5 |
| 3,676,860 | 7/1972 | Collier et al. | 340/172.5 |

*Primary Examiner*—Mark E. Nusbaum
*Attorney, Agent, or Firm*—Merchant & Gould

[57] ABSTRACT

A micro-program controlled data processing system having a plurality of data processors integrally formed within a central processor unit for performing on a priority assigned time slice basis a plurality of data processing functions. Dedicated registers within the central processor unit are functionally grouped and connected to share common resource main storage, control storage and shared register circuits. The functional groups of dedicated registers when activated to share the common resource circuits, define a plurality of data processors. The processors execute machine language instruction programs under micro-program control wherein each processor when active performs a unique data processing task functionally independent of the other processors. A resource allocation circuit selectively activates the individual processors on a minute time slice basis, where a time slice has approximately the same time duration as the storage reference time of the data processor system, such that one or more micro-program instruction is executed by the active processor during each time slice. The resource allocation circuit successively activates processors in a manner such that processor activation switching is accomplished with zero central processor unit overhead. The resource allocation circuit includes a priority network that receives real time common resource utilization requests from the processors according to the individual processor's needs, assigns a priority rating to the received requests and alters in response thereto the otherwise sequential activation of the processors. Program execution efficiency of each processor is thereby maximized, and individual processors appear to be simultaneously continuously executing their associated machine language programs.

22 Claims, 24 Drawing Figures

| INPUTS | | OUTPUTS | | |
|---|---|---|---|---|
| E | PRIORITY | $A_0$ | $A_1$ | $A_2$ |
| L | a = L | L | L | L |
| L | b = L | L | L | H |
| L | c = L | L | H | L |
| L | d = L | L | H | H |
| L | e = L | H | L | L |
| L | f = L | H | L | H |
| L | g = L | H | H | L |
| L | h = L | H | H | H |
| L | ALL = H | H | H | H |

| SELECT INPUTS | | | DECODED OUTPUT |
|---|---|---|---|
| (c) [$2^2$] | (b) [$2^1$] | (a) [$2^0$] | |
| L | L | L | AA = L |
| L | L | H | BB = L |
| L | H | L | CC = L |
| L | H | H | DD = L |
| H | L | L | EE = L |
| H | L | H | FF = L |
| H | H | L | GG = L |
| H | H | H | HH = L |

MULTI-PROCESSOR DATA PROCESSING SYSTEM

TABLE OF CONTENTS

Abstract of the Disclosure
Background of the Invention
Summary of the Invention
Brief Description of the Drawings
Description of the Preferred Embodiment
  General Description
  Processor Concept
  Task Execution
  Basic Timing
  Register File
  Arithmetic and Logic
  Control Storage/Address Table
  Resource Allocation Network (General)
  Resource Allocation Network (Detail)
Operation of the Preferred Embodiment
  Resource Allocation-General
  Busy/Active Register Operation
  Resource Allocation Network--Operation
  General System Operation
  Major Cycle Timing Considerations
  Basic Task Operation During a Time Slice
  Boundary Crossing

BACKGROUND OF THE INVENTION

1. Field of the Invention

This invention generally relates to data processing systems and more particularly to electronic digital data processing systems having a plurality of data processors each functionally connected to share common resource networks.

2. Description of the Prior Art

Throughout this application, distinction is neither implied nor will be made between the terms "computer" and "data processing system". The two terms will be used interchangeably, with the use of one necessarily implying the other. As hereinafter described, however, distinction will be made between a data processing system and a "data processor", a data processor being one functional element of a larger data processing system. Throughout this application the term "multiprocessor" is intended to refer to a data processing system containing more than one data processor, and unless otherwise indicated, to such a data processing system that contains only one central processor unit. Also, throughout this application, the phrase "data processing operations", unless otherwise qualified, is intended to include the general "handling" of digital data as well as the manipulation and modification thereof. Unless otherwise distinguished within this application, the technical terminology employed is intended to bear its commonly accepted meaning within the data processing art.

Marked by a history of phenomonal market and developmental growth accompanied by major advances in semiconductor and memory technology, the computer art has become over the last few years one of the most advanced and complex within the electronics field. The computer industry has been forced to remain dynamic in its development of advanced data processing systems which employ an optimum mix of the technological innovations developed within the associated electronics fields. In the last few years, data processing system conceptual designs, previously inconceivable based upon the then existing level of technology within the associated electronics fields, have revolutionized the computer art. As an example, several years ago it would have been physically impossible to construct the data processing system of this invention due to the nonexistence of the required hardware to do so, within the semiconductor and memory fields.

Despite the myriad of computer hardware, software and associated technology existing within the art today, data processing systems may generally be best classified and characterized according to their functional purposes. The characteristics differentiating the traditional scientific and commercial computer classifications have become less significant as the distinguishing lines therebetween have faded with the complexity, speed and data formats of the new generation computers.

A more meaningful characterization of modern digital data processing systems is the functional classification as either computational or input/output (hereinafter referred to as "I/O") oriented. As the classifying labels imply, computational oriented data processing systems are designed primarily for performing long, complicated calculations. I/O oriented data processing systems are designed to handle large quantities of digital data, thereby requiring extensive I/O operations. Our invention directly applies to an I/O oriented data processing system as above defined, and applies in a more limited sense as hereinafter described to a computational oriented data processing system.

The structural design of a data processing system is necessarily directly related to the functional use to which the data processing system is put. Since I/O oriented data processing systems functionally depend upon handling large quantities of I/O data, such systems must be designed to handle the I/O data in a timely and efficient manner. In contrast, I/O design considerations are less significant in the design of computational computers where speed and efficiency in achieving the desired computational results predominate the design considerations.

In keeping with the aforementioned departure from the classic use distinctions in classifying computers, it should be noted that computational computers vary in physical size from the giant computer system typically comprised of a high speed central processor unit controlling a plurality of independently operable data processor units, each of which often contains its own memory, to a relatively small dedicated computer for performing specific, narrowly defined computational functions. To maintain the required computational efficiency of the high speed central processor unit within a giant computer system, techniques have been developed to buffer the information that flows to and from the I/O sections. The techniques employ independent hardware data processors which operate autonomously from the high speed central processor.

While our invention is normally associated with that data processing system characterized as I/O oriented, it is also applicable to perform computational functions generally associated with the computational oriented computer. The data processing system of our invention may also be utilized as a peripheral subsystem of a larger computational computer.

Design philosophies in the I/O oriented data processing systems art have generally adopted either a hardware or a software approach. Typical of a hardware oriented I/O data processing system is one whose design employs a plurality of autonomously configured data processors each independently connected to perform a logical or arithmetic data processing operation under hardware control by a central processor unit. Response time is minimized in the true hardware I/O oriented data processing system at the expense of hardware duplication required to implement each individual data processor. In such a data processing systems, multiple concurrent program executions can be performed at the expense of further hardware duplication.

The software design approach for I/O data processing systems is based on time sharing principles that allow individual data processing tasks to share a common memory and other commonly accessible logical circuits on a program controlled interrupt basis. By time sharing common memory and logic circuits, software I/O oriented data processing system designs minimize the hardware duplication requirements necessitated by those designs employing the hardware approach. The software approach provides a significant increase in the number of user programs that can be executed by a single data processing system while decreasing with respect to the hardware oriented approach) the associated hardware requirements, but does so at the expense of overall time required to execute an individual program and the efficiency in use of the system.

Data processing systems employing true time sharing designs, sacrifice not only overall program execution response time but also the active time required to execute an individual data processing function. The term "active" as herein used with reference to performing data processing functions signifies that time period during which a particular data processor is performing operations in real time that are directly related to its associated data processing operation. The active notation is distinguished from that time period during which that data processor is performing ancillary operations not directly applicable to its associated data processing operations.

Time sharing of common resource circuits under a software oriented approach requires program interrupt instructions and routines or polling to effect switching operations from one data processor to the next. Accordingly, the real time that is allocated to the performance of individual data processing tasks is decreased by that amount of time required to read and execute the program interrupt instructions. In addition, the actual response time to any specific interrupt signal can vary significantly depending upon the program instructions under execution and upon the occurrence of interrupt lock-out signals, thus causing inefficient multiple task execution and inefficiency in the operation of the requesting peripheral devices. It follows, therefore, that a true software oriented time sharing data processing system, to be practically effective, must activate individual data processing tasks for continuous periods of time that are large with respect to that time period required to read and to execute the switching interrupt instructions.

The terms "processor state" or "processing mode" have been commonly employed to designate that general operative condition of a time sharing data processing system that exists when a particular data processing task of the system is actively performing its associated data processing function. Individual processor states have been labeled according to the particular logical function normally performed by a data processing task. As an example, the data processing system has been said to be operative in its program control or executive state when the data processing task whose function is to insure orderly program execution by other data processing tasks within the system is actively operative. Accordingly, the act of interrupting the operation of one processor state to activate another has been termed "processor state switching." The program execution efficiency in real time of a true software oriented data processing system, therfore, decreases with the length of time to switch between successive processor states.

A number of I/O oriented processing systems have appeared in the art offering various alternatives to the true hardware and true software design approaches and hybrids thereof. The majority of such hybrid systems, however, have not integrated the two basic design approaches in a manner that provides a cost effective and efficient multi-processor data processing system which is also oriented for ease of programming. Ease of programming and efficiency in the program execution thereof require that an individual programming task be written for execution by a single data processor without interrupt considerations, while practical cost considerations in the hardware design require less than complete data processor autonomy on a functional hardware basis.

One multi-processor data processing system typical of the aforementioned hybrid design and currently available in the art employs a plurality of time sharing data processors, each having its own memory, that communicate with a high speed central processor unit by means of a common central memory. This system employs a time delay device that sequentially activates the individual processors on a minute time cycle basis according to a predetermined mandatory activation schedule. Each of the data processors is sequentially activated according to its relative position in the activation loop once each cycle time period. This technique, representative of an I/O oriented data processing system functioning as the input section of a giant computational computer, satisfies several of the drawbacks of a true hardware or a true software controlled time sharing multi-processor system, but does not minimize hardware requirements through the sharing of common resource circuits other than the common central memory. Further, the technique employed for sharing a common memory among the plurality of data processors does not optimize use of the common memory thereamong, since each data processor is activated once each cycle time period whether or not the processor, when activated, requires to the common memory. It should also be noted that except for the sharing of a common central memory, individual processors of this multi-processor apparatus are functionally divorced from the high speed central processor unit.

The present invention incorporates state of the art semiconductor technology within novel data processing system apparatus to overcome the limitations inherently present in the true hardware and true software multi-processor designs and also found within the previous hybrid multi-processor designs. The apparatus of this invention integrates a plurality of data processors within a central processor unit and activates the individual data processors, under hardware control, on a minute activation cycle time basis so as to share in time common resource memory and other logical circuits.

The minute time period during which an individual data processor is activated, which is approximately of the same time duration as the system storage time, is hereinafter referred to as a "time slice". An individual time slice is further subdivided into a plurality of minor cycle time periods within which that data processor which is currently active sequentially performs its associated data processing task. By performing processor state switching under automatic hardware control, the reading and execution of interrupt routines required in a software oriented time sharing system are eliminated, thereby increasing the active time of a data processor during a task execution. By thus decreasing the real time required to perform a given data processing function in a shared resource system, the number of processor states that can be activated within a given period of time is significantly increased, allowing independent and concurrent program execution by an increased number of system sharing users. The aforementioned hardware and cost efficiency design requirements are satisfied by a unique register file design that integrally incorporates individual data processors within the central processor unit, thereby maximizing individual data processor utilization of common resource circuits within the central processor unit. Ease of programming and program efficiency requirements are also satisfied. With the present invention, a programmer can write a complete program for execution thereof by a single data processor without the burdensome considerations required for interrupt routines.

While the preferred embodiment of our invention as disclosed employs a relatively small number of data processors sharing a single central processor unit, it will be understood that our invention is equally applicable to any number of data processors functionally connected to a central processor unit. It should also be understood that the inventive time slicing concept as applied to a multi-processor data processing system as herein described applies equally well to a larger data processing system having a plurality of central processor units each configured within the spirit and intent of this invention. Further, while the preferred embodiment discloses a specific priority determined method of activating individual data processors to share the common resource circuits, it should be understood that other activating modes may equally lie within the scope of our invention. It should also be understood that while the present invention as disclosed employs a particular mode of program instruction execution, data processing systems can be implemented withn the scope of this invention that employ a variety of alternate program configurations. Further, neither the specific duration of a time slice nor the particular program instruction steps executed during a time slice, as disclosed in the preferred embodiment, are intended to limit the scope of this invention.

Also, although the invention as herein described is not generally thought to apply to the dedicated computational computer, its applicability in performing dedicated computational type calculations is within the scope of this invention. In certain dedicated computational applications, of which pattern recognition is typical, the apparatus of this invention provides a greater cummulative probability distribution than that provided by conventional dedicated computational computers.

SUMMARY OF THE INVENTION

The present invention discloses a novel multiprocessor data processing system characterized by a plurality of data processors operatively sharing, according to their needs, common resource circuits on a minute time slice basis while concurrently and independently executing their associated data processing tasks. A single central processor unit, a main storage memory and I/O networks form the basic functional elements of the multiprocessor system. The electrical networks identified as the common resource circuits include, but are not limited to, arithmetic and logic circuits, timing and control circuits and special purpose shared register file circuits (all located within the central processor unit), and the main storage memory.

In addition to the special purpose register file circuits the register file within the central processor unit also includes dedicated registers divided into a plurality of functional register groups. The registers of each of the dedicated functional register groups are connected to operatively share the common resource circuits in a manner such that each of the functional register groups when actively connected with the common resource circuits forms a data processor capable of performing a unique data processing operation. When active, each of the data processors thus formed performs its associated data processing operation by executing microcode instructions, and does so independently of those data processing operations being performed by the remaining plurality of data processors. Depending upon the specific user application of the multi-processor system, one or more of the plurality of data processors are functionally connected with the I/O networks and operate when activated to effect a transfer of digital data between the multi-processor system and external peripheral devices.

By structurally and functionally integrating the data processors within the central processor unit and by partitioning the register file into dedicated and shared registers, the multiprocessor system of this invention maximizes the use of shared common resource circuits within a data processing system.

A resource allocation network in conjunction with the timing and control circuits selectivey awards time slices of common resource utilization time to the plurality of functional dedicated register groups, thereby selectively activating the data processors. The resource allocation network, automatically monitors the task execution status of each of the data processors by means of common resource utilization request signals received therefrom, assigns a priority weighting to the received request signals and selectively activates in response thereto one of the data processors on each time slice period.

The time slices consecutively occur in real time on a major cycle time basis as determined by the timing and control circuits, where each time slice period is approximately of the same duration as the data processing system storage time. As a result of the selective activation of the data processors on a time slice basis of minute time duration, each data processor performs its associated data processing operation by executing machine language program instructions one at a time according to the selective automatic common resource allocation schedule determined by the resource allocation network. Since each data processor is executing its associated program instructions independently of the other data processors, the plurality of data processors as activated in this invention, execute their associated data processing tasks concurrently in real time and appear to be executing them simultaneously. Therefore, except for their time slice activation relationship with the resource allocation network, each of the data processors is functionally autonomous with respect to the other data processors.

By automatically activating the data processors under hardware control, on a minute major cycle time period basis, the time to complete all of the individual tasks of the data processors is significantly reduced over standard software oriented interrupt techniques, thus allowing an active data processor more time for executing program instructions directly related to its data processing task during its awarded time slice. Further, through the selective activation of the data processors on an individual processor need basis, optimum active utilization of the common resource circuits is insured.

It is one object of the present invention, therefore, to provide an improved multi-processor data processing system.

It is a further object of the present invention to provide an improved multi-processor system having a plurality of data processors selectively activated under hardware control to share common resource circuits on a minute time slice basis.

It is still another object of this invention to provide an improved multi-processor data processing system having a unique structural design that optimizes the sharing of common resource circuits among a plurality of data processors.

It is another object of this invention to provide an improved multi-processor data processing system having a plurality of data processors integrally formed within a single central processor unit, each functionally sharing common resource circuits on a minute time slice basis.

It is yet another object of this invention to provide an improved multi-processor data processing system having a plurality of data processors sharing common resource circuits on a minute time slice basis according to the real time common resource utilization needs of the individual data processors.

It is another object of the present invention to provide an improved multi-processor data processing system having a plurality of data processors sharing common resource circuits on a minute time slice activation basis wherein each data processor can be separately programmed for independently performing its associated data processing task.

These and other objects of our invention will become apparent to those skilled in the art upon consideration of the accompanying specification, claims, and drawings.

BRIEF DESCRIPTION OF THE DRAWINGS

Referring to the drawings, wherein like numerals represent like parts throughout the several views.

DESCRIPTION OF THE PREFERRED EMBODIMENT

Figure 1:
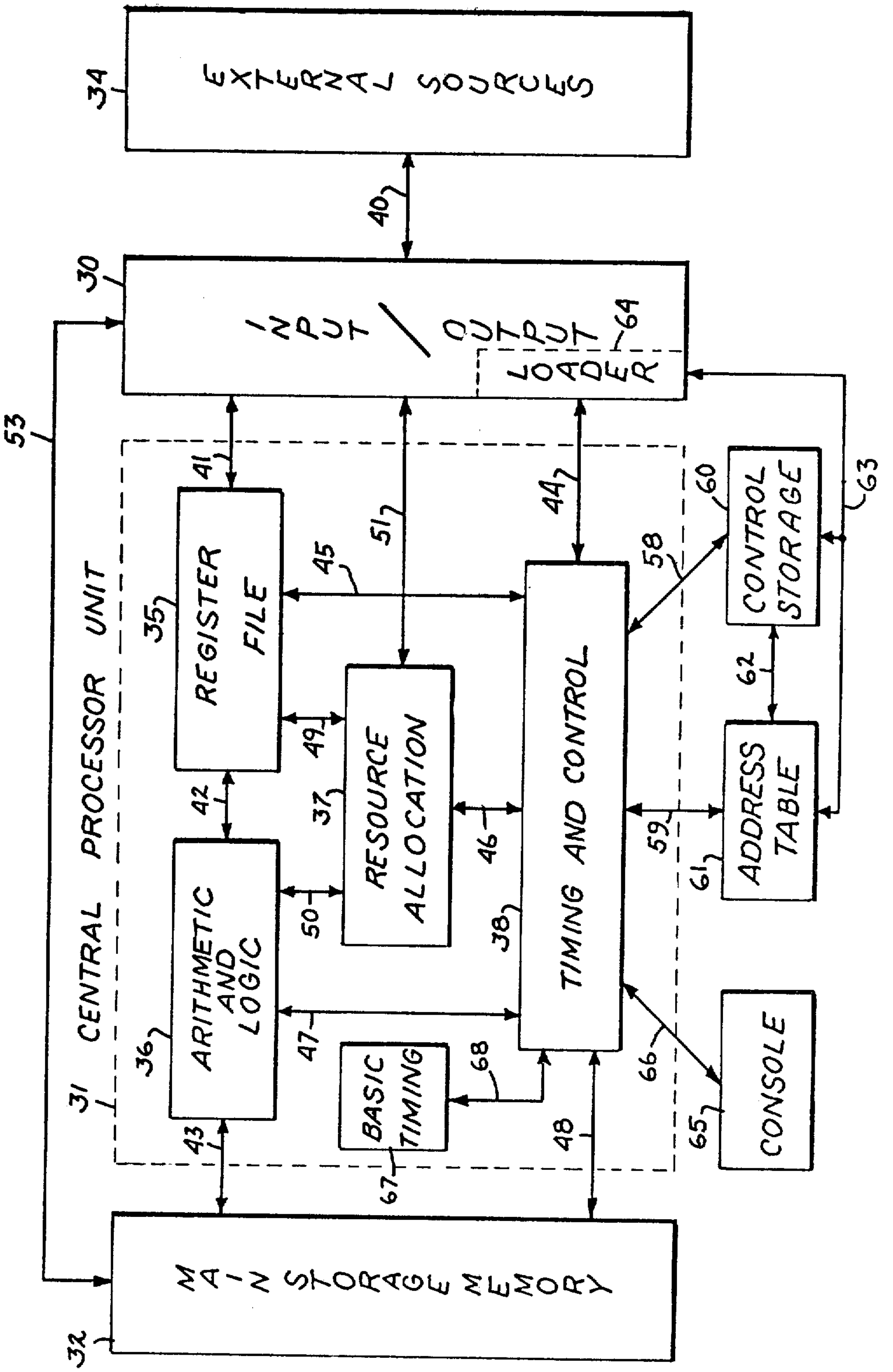
FIG. 1 is a diagrammatic representation generally illustrating the major structural blocks and the signal flow interrelationship thereamong of a preferred embodiment multiprocessor data processing system of the present invention.

Referring to the Figures, there is generally shown in FIG. 1 a block diagram representation of a preferred embodiment multi-processor data processing system illustrating the signal flow interrelationships among the major functional blocks as applicable to this invention. The major functional blocks of the multi-processor data processing system illustrated in FIG. 1 include an I/O section 30, a Central Processor unit 31 and a Main Storage memory 32. The Main Storage memory 32 may consist of any general random access memory including magnetic core and MOS type memories. A typical memory would be a random access memory having storage reference access time of 350 nanoseconds.

A plurality of external sources 34 generally designated as a single functional block in FIG. 1, functionally communicate with the I/O section 30 by means of a signal flow path 40. It will be understood throughout this specification that signal flow paths such as that designated by numeral 40 in FIG. 1, represent one or more data communication lines by which digital information is transferred between those functional blocks forming the terminals of the particular signal flow path. The plurality of external sources 34 (also referred to as peripheral devices) may include but are not limited to such peripheral devices as disc files, card readers, line printers, keyboard terminals and printers, multiplexing input channels and the like, each communicating with the I/O section 30 by means of the signal flow path 40. The I/O section 30 may generally include standard buffer and adapter circuitry required to transform digital data received from the plurality of external sources 34 into a logical format acceptable for transfer to the Central Processor unit 31 and to the Main Storage memory 32. The I/O section 30 has been functionally internally subdivided to include a Loader functional section 64.

The data processing system of the preferred embodiment executes machine language instructions under micro-program control. A Control Storage functional block 60 and an Address Table functional block 61 (to be hereinafter described) respectively accommodate storage for and enable the use the micro command instructions within the data processing system. The Control Storage 60 and the Address Table 61 sections communicate with the I/O section 30 by means of a common signal flow path 63 and communicate with each other by means of a signal flow path 62.

In its most general form, the Central Processor unit 31 is further subdivided into functional blocks designated as: a Register File 35, an Arithmetic and Logic Unit 36 (hereinafter referred to as the ALU), a Resource Allocation network 37, a Basic Timing circuit 67, and a general Timing and Control network 38. The Basic Timing circuit 67 (to be hereinafter described) provides fundamental timing signals to the more general functional circuits of the Timing and Control network 38 by means of a signal flow path 68. Circuits of the Timing and Control network 38 provide basic timing and control signals to functional blocks throughout the multi-processor data processing system by means of the signal flow paths 44, 45, 46, 47, 48, 58, 59, and 66, respectively, connected to the I/O section 30, to the Register File 35, to the Resource Allocation network 37, to the ALU 36, to the Main Storage memory 32, to the Control Storage section 60, to the Address Table 61 and to a Console functional block 65 (to be hereinafter described).

Digital information transfer between the I/O section 30 and the Central Processor unit 31 is provided by means of a signal flow path 41 specifically connecting the I/O section 30 with circuits of the Register File 35. Digital information transfer between the Central Processor unit 31 and the Main Storage memory 32 is provided by means of a signal flow path 43, specifically connecting the ALU 36 with the Main Storage memory 32. Digital information transfer between the Register File 35 and the ALU 36 is performed by means of a signal flow path 42.

Digital information transfer between the I/O section 30 and the Main Storage memory 32 may, in special cases, directly occur by means of a signal flow path 53; however, signal flow therebetween is generally performed through the Central Processor unit 31 by means of the signal flow path 41, the Register File 35, the signal flow path 42, the ALU 36 and the signal flow path 43.

The Register File 35 generally includes a plurality of registers functionally and physically connected, as hereinafter described, to form the basis of a plurality of data processors (to be hereinafter described) defining one of the unique features of the multi-processor data processing system of this invention.

The Register File 35 functionally communicates with the Resource Allocation network 37 by means of a signal flow path 49. The Resource Allocation network 37, to be hereinafter described, functions in communication with circuits of the Timing and Control network 38 to selectively activate on an individual basis the plurality of data processors formed within the data processing system by means of the signal flow path 49 to the Register File 35 and by means of a signal flow path 50 to the ALU 36. In addition, the Resource Allocation network 37 communicates with the I/O section circuits by means of a signal communication path 51. The ALU 36 includes digital circuits logically connected to perform typical data processing and handling functions on digital information it receives.

The Resource Allocation network 37 (FIG. 1) may functionally be termed a control element, but has been separated from the Timing and Control network functional block 38 due to the special role it performs within the data processing system. The Timing and Control functional block 38 of FIG. 1 is a broad functional designation for those timing and control functions required to operate the circuits within the multi-processor data processing system of this invention.

The Console functional block 65 provides the means for manually monitoring and controlling operations within the multiprocessor data processing system including such functions as applying and removing power to the system, selecting and initializing specified sequences within the system, controlling and monitoring fault isolation procedures and operations within the system and provides for visual display of the logical status of specific registers within the system.

Figures 2, 18, 19:
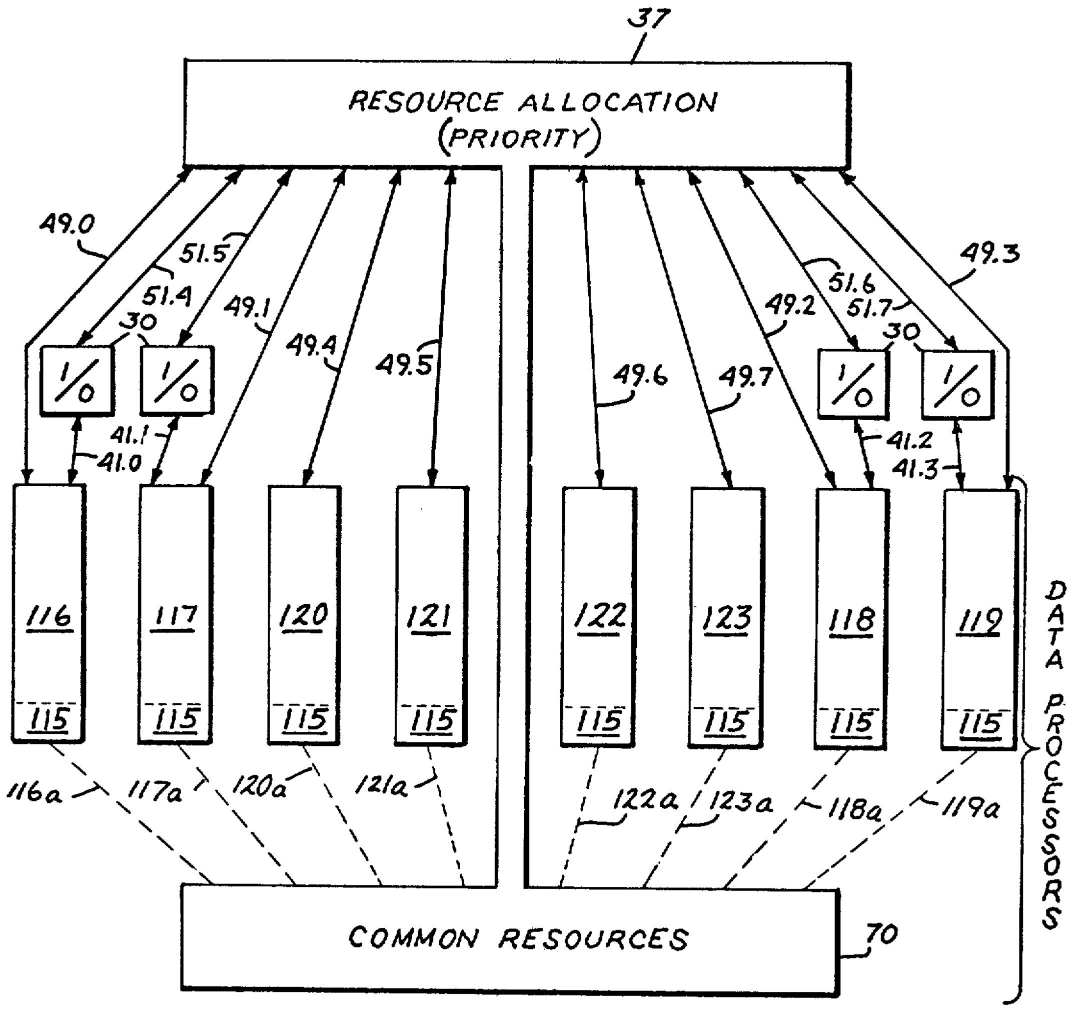
FIG. 2 is a diagrammatic representation conceptually illustrating the sharing of common resource circuits among a plurality of data processors as employed by the present invention.
FIG. 18 (sheet 2) is a logical truth table illustrating the logical operation of the Priority Encoder circuit of the present invention as disclosed in FIG. 15.
FIG. 19 (sheet 2) is a logical truth table illustrating the logical operation of the decoding networks of the Resource Allocation network of the present invention as disclosed in FIGS. 10, 16, and 17.

Signal flow paths other than those illustrated in FIGS. 1 and 2, between the functional elements shown, will be defined and explained with respect to the networks to which they pertain throughout this specification.

Although the following description of the multiprocessor data processing system of this invention will reference those functions and circuits comprising the preferred embodiment, it will be understood that our invention is not limited to the use of a micro-program controlled system or to use of the specific circuits disclosed for implementing the functional blocks of the preferred embodiment system.

General Description

A general description of the overall operation of the multi-processor data processing system of this invention will be helpful in understanding the later analysis of the functional blocks of the system. As illustrated in FIG. 1 the multi-processor data processing system of this invention contains a single Central Processor unit 31, which with the exception of the Main Storage memory 32 and the microcode handling sections (Control Storage 60 and Address Table 61), contains those circuits necessary to form a plurality of data processors. Each data processor when active is operable to perform a unique data processing function upon digital information supplied to it. In the multi-processor data processing system of the preferred embodiment, to be hereinafter described, each of the plurality of data processors contained therein performs its data processing task independently of the other data processors. Further, as will become apparent following a more detailed description of the preferred embodiment, only one data processor may actively reference the Main Storage memory 32 at a time. It should be understood, however, that other multi-processor systems may be conceived within the spirit of this invention wherein more than one data processor may simultaneously reference main storage memory. An example of such a system would be a multi-processor utilizing a compartmentalized main storage memory which would allow simultaneous referencing operations by the data processors of the system.

The functional blocks (FIG. 1) of the multi-processor system of this invention are generally classified as either dedicated or shared (common) resources. It will be recognized that this terminology is commonly used within the software oriented I/O data processing art. The resource classification of functional blocks as employed within this specification will be interpreted as follows. "Dedicated resources" refer to those functional blocks, circuits or elements whose functions are associated only with (dedicated to) data processing functions performed by a specific data processor of the multi-processor data processing system. Dedicated resources as used herein will not be implied to refer to that specific function being performed by an individual functional element. For example, although the only function performed by timing circuits is to provide timing signals, the timing circuits will not be classified as dedicated resources for the purpose of performing timing functions within the above definition. "Shared resources" ("common resources") refer to those functional blocks, circuits or elements whose functions may be operatively shared by more than one data processor of the multi-processor data processing system. Referring again to the previous example of the timing circuits, such circuits may be classified as shared resources within the above definition since their function (providing timing signals) may be equally shared by all of the data processors of the data processing system. Specifically, with reference to FIG. 1, those functional blocks that would be classified within the foregoing definition as shared resources are: the ALU 36, the Timing Control network 38, the Basic Timing network 67, the Resource Allocation network 37, the Address Table section 61, the Control Storage section 60, and the Main Storage memory 32.

The principles of a true hardware oriented I/O data processing system may be recognized in the physical manner in which individual data processors of the multi-processor data processing system of this invention are implemented. The basis for individual data processors within this system are derived from a physical and functional division of registers within the Register File 35 (FIG. 1).

The Register File 35, to be hereinafter described in more detail, is divided into dedicated and shared registers within the meaning of the above definition of these terms. The dedicated registers within the Register File 35 are further divided into a plurality of functional groups, the number of such functional groups being related to the number of data processors contained within the data processing system. Each of the functional dedicated register groups thus formed is associated with and is functionally dedicated to those data processing functions performed by a specific data processor of the multi-processor system. The spirit of the true hardware oriented I/O data processing system philosophy is further maintained in the manner in which registers within the functional dedicated register groups are connected to the shared resource circuits within the multi-processor system. The registers of each of the dedicated functional groups are physically wired to share resource circuits. A data processor, therefore, basically consists of the registers of one of the dedicated register functional groups of the Register File 35 actively and operatively connected with the common resource circuits of the Central Processor unit 31, the microcode handling sections 60 and 61, and with the Main Storage memory 32 so as to perform a unique data processing function.

Processor Concept

In FIG. 2, there is conceptually illustrated a plurality of dedicated register functional groups commonly connected with shared resource circuits forming a plurality of independently operable data processors, as applicable to the preferred embodiment. Referring to FIG. 2, it will be noted that the preferred embodiment contains eight data processors formed by eight independent functional groups of dedicated registers (generally designated as 116–123 as hereinafter described), each of which, when individually functionally connected with common resource circuits 70 (illustrated by a plurality of dotted lines 116*a*–123*a*) forms a data processor. In the preferred embodiment, the four data processors defined in part by the functional dedicated register groups (116–119) perform I/O data processing functions as illustrated by their respective connections to the I/O functional block 30 by means of a plurality of signal flow paths 41.0 through 41.3. The Resource Allocation network 37 (functionally part of the common resources 70) determines, in response to signals from the data processors (by means of a plurality of signal flow paths 49.0 through 49.7), and in response to signals from the I/O section 30 (by means of a plurality of signal flow paths 51.4 through 51.7), which data processor has priority to be allotted the use of the common resource circuits 70, over the remaining data processors. In response to its priority determinations, the Resource Allocation network 37 allocates use of the common resource circuits to the data processors on a major cycle time basis (to be hereinafter described).

It should be noted that unless necessary to the description of the operation of a particular circuit or function within the data processing system, references to power supplies and connections thereto for the various functional blocks and circuits throughout this specification will not be made, it being understood that such power supplies and related connections are impliedly contained within the system.

Task Execution

Each of the eight data processors of the preferred embodiment is assigned a specific data processing task. A task may, for example, consist of handling digital data, executing a machine language instruction program, and the like. A specific task is generally subdivided into a plurality of subtasks based upon the particular nature of the data processing operations to be performed in the execution of the task. For example, a task consisting of the execution of a machine language program for performing an arithmetic calculation will have a plurality of sub-tasks for each arithmetic operation (add, subtract, multiply, etc.) that is to be performed within the task. A task, and sub-tasks thereof, can be diagrammatically illustrated in terms of the length of time required to complete a specific task or sub-task. Such a diagrammatic illustration of a typical task assignment schedule for the eight data processors of the preferred embodiment is illustrated in FIG. 3.

Figure 3A:
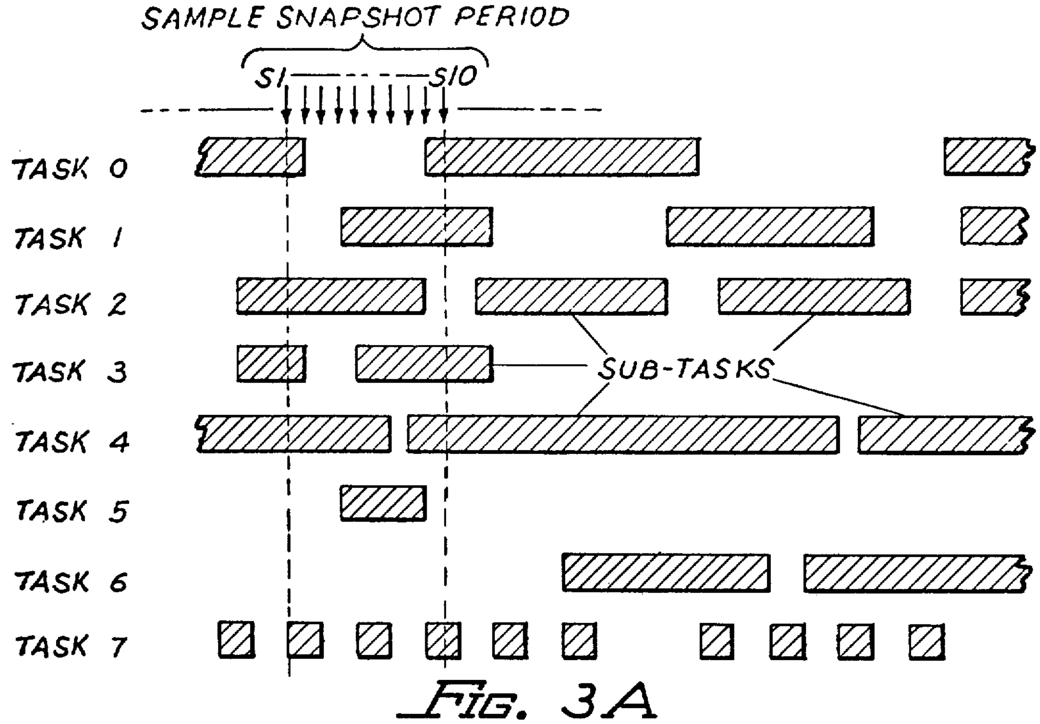
FIGS. 3A–3C are collectively diagrammatic representations conceptually illustrating the method of data processing task execution and the timing considerations relating thereto employed by the multi-processor data processing system of this invention.

Referring to FIG. 3A, eight numerically designated tasks (one task being assigned to each of the eight data processors of the preferred embodiment), are illustrated in time relationship to one another as they could typically appear within the data processing system. Each rectangular cross-hatched block (representing a sub-task) within a task illustrates that period of time for which the data processor assigned to perform the specific task, will require use of the common resource circuits of the system. As later described within this specification, when a data processor requires use of common resource circuits to perform its assigned task, it will simultaneously make such requirements known by initiating a resource utilization request to the Resource Allocation network 37. A data processor thus requiring use of the common resource circuits will continue to request common resource utilization time until it has been "serviced." Therefore, the time related task schedule of FIG. 3A will also represent a resource utilization request schedule for the eight data processors.

The time segments occurring between individual subtasks within a task represent that minimum period of time during which the performance of a specific task does not require the active use of the data processor to which that task was assigned. For a task executing a machine language program that is performing an arithmetic calculation, such a time period between successive subtasks may, for example, represent that time during which continued program execution must be momentarily delayed until the receipt of information from a peripheral I/O device or by the data processor that is performing the task turning itself off for later reactivation by the Executive processor (as hereinafter described).

The Resource Allocation network 37, to be hereinafter described in detail, monitors the common resource utilization requests of the eight data processors. The Resource Allocation network 37 basically performs its monitoring function by repetitively taking "snapshots" on a periodic minute major cycle time basis of the individual common resource utilization requests of the data processors. A typical time segment during which ten of such snapshots (S1 through S10) are taken is illustrated in FIG. 3 as that time segment represented between the two vertical dashed lines. It will be understood, however, that the Resource Allocation network 37 is repetitively taking such snapshots, and that the specific time segment illustrated in FIG. 3A represents only an infinitesimal sample time period of the continuous process.

The equal spacing between successive snapshots (FIG. 3A) illustrates that, relative to specific task execution only, the snapshots occur at discrete, equally-spaced intervals. As will become apparent later, however, the actual time periods between successive snapshots will vary according to the number of data processors which are requesting common resource utilization time.

Figures 3B, 3C:
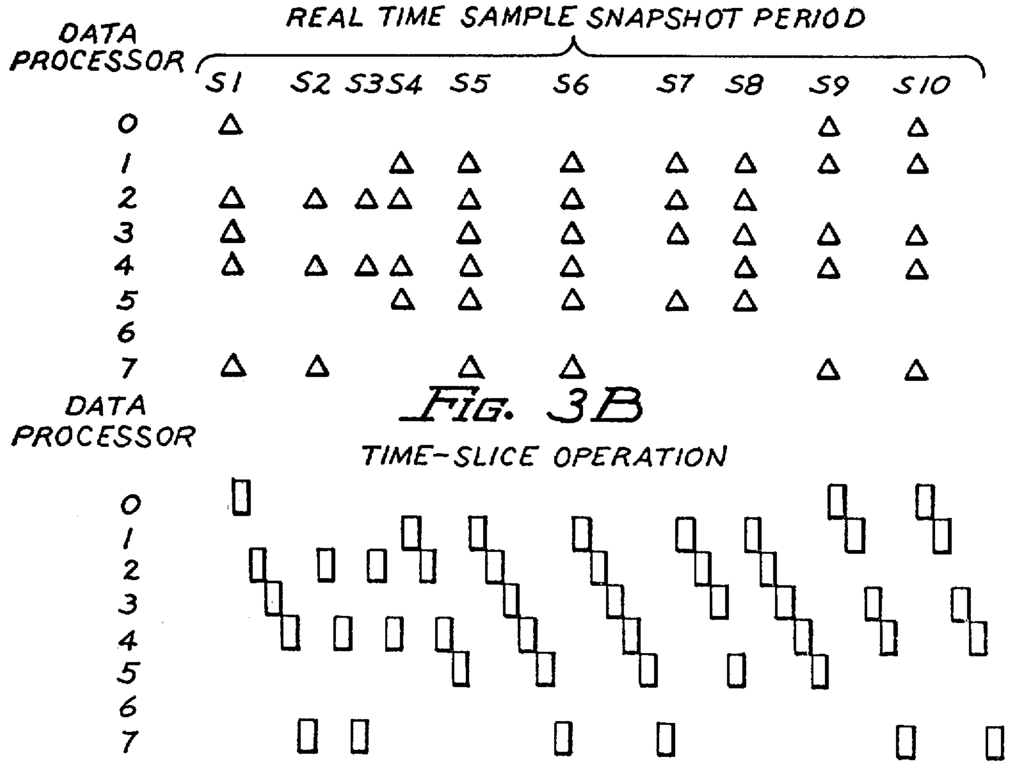

The informative content of individual snapshots (S1-S10) taken within the sample snapshot period illustrated in FIG. 3A is diagrammatically represented in FIG. 3B. The common resource request status of the eight data processors is illustrated by a triangle, or by the absence thereof, for each data processor as it appeared when each of the ten snapshots (S1-S10) was taken. The presence of a triangle in a row corresponding to one of the eight data processors, which is located under one of the ten snapshot headings (S1-S10) signifies that that specific data processor was requesting use of the common resource circuits for the execution of its assigned task (per FIG. 3A) at the time that snapshot (under which the triangle appears) was taken. The absence of a triangle under a specific snapshot heading, signifies that the data processor associatetd with that row was not in need of the common resources at the time the specific snapshot was taken. For example, referring to FIG. 3, data processor "0" was requesting use of the common resources for execution of its assigned task at the time snapshots S1, S9, and S10 are taken (as represented by triangles thereunder) but was not requesting common resource utilization time when the snapshots S2 through S8 were taken. This fact is also illustrated from a task-requirement viewpoint by FIG. 3A.

Referring to FIG. 3B, it will be noted that successive snapshot headings (S1–S10) are not equally spaced with respect to each other. The spacing between the snapshot headings illustrated in FIG. 3B is directly proportional to the actual time periods (with respect to the FIG. 3 example) that occurred between the successive S1–S10 snapshots.

Without considerations as to override priority requests by the individual data processors (to be hereinafter described), FIG. 3C conceptually illustrates the manner and order in which the common resources would be allocated among the eight data processors during the sample snapshot period of the data processor task requirements schedule of FIG. 3A. Referring to FIG. 3C, each rectangular box appearing in a row corresponding to one of the eight data processors diagrammatically illustrates that a time slice of common resource utilization time has been assigned to that data processor. It will be noted that each time slice (box) is of constant width, representing that each awarded time slice period is of the said time duration (one major cycle time period). It will also be noted that the time slices occur consecutively in time such that only one (but always at least one) data processor has use of the common resource circuits at a time.

Referring to FIGS. 3B and C, it will be noted that a data processor only receives a slice of common resource utilization time if that data processor (as determined by its associated task schedule of FIG. 3A) was requesting use of the common resources (FIG. 3B) when the last snapshot was taken.

In other words, the common resources are allocated according to the actual time data processor requests as determined by the snapshots. Time slices are sequentially awarded to the data processors 0 through "7" (starting with data processor 0) to those data processors which requested common resource utilization time at the last snapshot. The taking of the next snapshot is inhibited until all those requests of the immediately preceding snapshot have been satisfied. For example, at the time snapshot S2 was taken (FIG. 3B), data processors "2", "4", and 7 were requesting common resource utilization time. In response to the S2 snapshot, the next three time slices to be awarded will be respectively consecutively awarded to data processors 2, 4, and 7, in that order. Simultaneously, the taking of snapshot S3 will be inhibited until an irreversible decision has been made (in response to snapshot S2) to award the last assigned time slice to data processor 7.

The foregoing example was for illustration purposes only. A detailed description of the Resource Allocation network 37 and its operation in determining priorities and assigning time slices appears within the following specification.

Basic Timing

As in all data processing systems, timing considerations are fundamental to the successful operation of the system. That period of time upon which system considerations are based within the preferred embodiment multi-processor data processing system, is termed a "major cycle", or is referred to as the major cycle time of the data processing system. The duration of a major cycle with respect to the system storage time of the data processing system is important to our invention; a major cycle must be approximately of the same time duration as the system storage time of the multiprocessor data processing system. In the preferred embodiment, the system storage time is approximately 1000 nsec and the duration of a major cycle varies from 800 nsec to 1000 nsec depending upon the particular data processing function being performed by the data processing system. It will be understood, however, that major cycles of longer or shorter duration are possible within the spirit of our invention, as long as the time duration of a major cycle is approximately the same as the system storage time of the data processing system. Since the storage reference time and a major cycle are of the same order of time duration, it follows that a data processing operation including one reference to the Main Storage memory 32 for accessing data stored therein, may be completed within a single major cycle.

Each major cycle is subdivided into a plurality of successive time segments termed "major cycles" or minor cycle times. In the preferred embodiment, the time duration of a minor cycle is 100 nsec; however, it will be realized that any other suitable minor cycle time duration could have been employed. Since the data processing system of the preferred embodiment performs its data processing operations by executing maching language instructions under micro-program control, the execution of individual micro-program instructions requires one or more minor cycles depending upon the particular nature of an individual microprogram instruction. In addition to the basic major and minor cycle times, each minor cycle is further subdivided into a plurality of "phase" times. In the preferred embodiment, five phase clock pulses spaced at 20 nanosecond intervals are generated within each minor cycle time for purposes of executing the microprogram instructions. However, due to the manner in which the Basic Timing circuits 67 produce the phase clock pulses, to be hereinafter described, clock pulses are available for use throughout the data processing system at 10 nsec intervals.

Throughout the specification, the term time-slice will often be interchangeably used with major cycle. The term time slice is a derivative of the software I/O oriented data processing system terminology. Since the data processing system of this invention comprises a plurality of independently operable data processors, as previously described, each of the data processors must have the exclusive use of the shared resources when it is actively performing its data processing operation. That period of time in which the shared resources are assigned to the exclusive use of a particular data processor is commonly referred to as a slice of time, thus use of the term time-slice.

Throughout the specification, the notation "$E_{xyz}$" (where x, y, and z = integers), will be employed to refer to a specific point in time within a given major cycle. The subscript "*x*" designates the number of consecutive minor cycle within the major cycle, where a value of $x = 0$ designates the first minor cycle within a major cycle. Alternatively, the subscript *x* represents the hundredths digit in nanoseconds that has lapsed since the beginning of a major cycle. The subscript "*y*" and "*z*" respectively represent the tens and the unit digits in nanoseconds of the time that has lapsed since the beginning of a particular major cycle. For example, $E_{200}$ refers to a time period within the third minor cycle of a major cycle, or equivalently to a point in time 200 nsec after the beginning of the specific major cycle. Similarly, the notation $E_{220}$ represents that period in time which is 20 nsec within the third minor cycle of the specific major cycle, or equivalently to that period in time occurring 220 nsec after the beginning of the specific major cycle.

Further, the notation "$T_{nn}$" will be employed to designate a specific phase time within a minor cycle. The subscripts "*nn*" represent in nanoseconds that period of time which has lapsed from the beginning of the specific minor cycle. Since a minor cycle duration is 100 nsec in the preferred embodiment, the highest numerical value that the notation $T_{nn}$ can assume is $T_{99}$. Since, however, in the preferred embodiment, the phase clock pulses occur at 20 nsec intervals, the subscripts *nn* will generally appear as a multiple of 20.

Figure 4A:
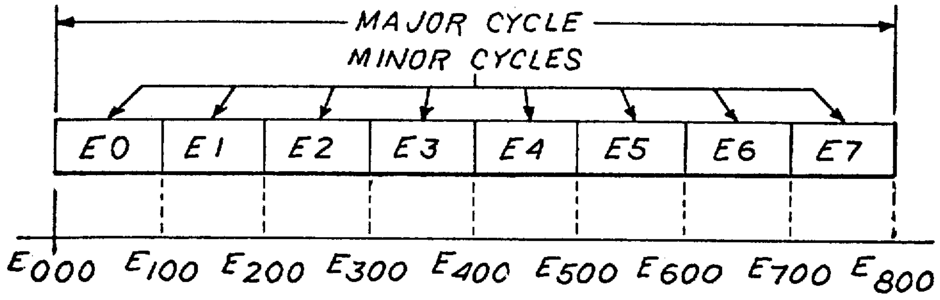
FIG. 4A is a diagrammatic timing illustration of a typical major cycle illustrating the minor cycles contained therein.
Figure 4B:
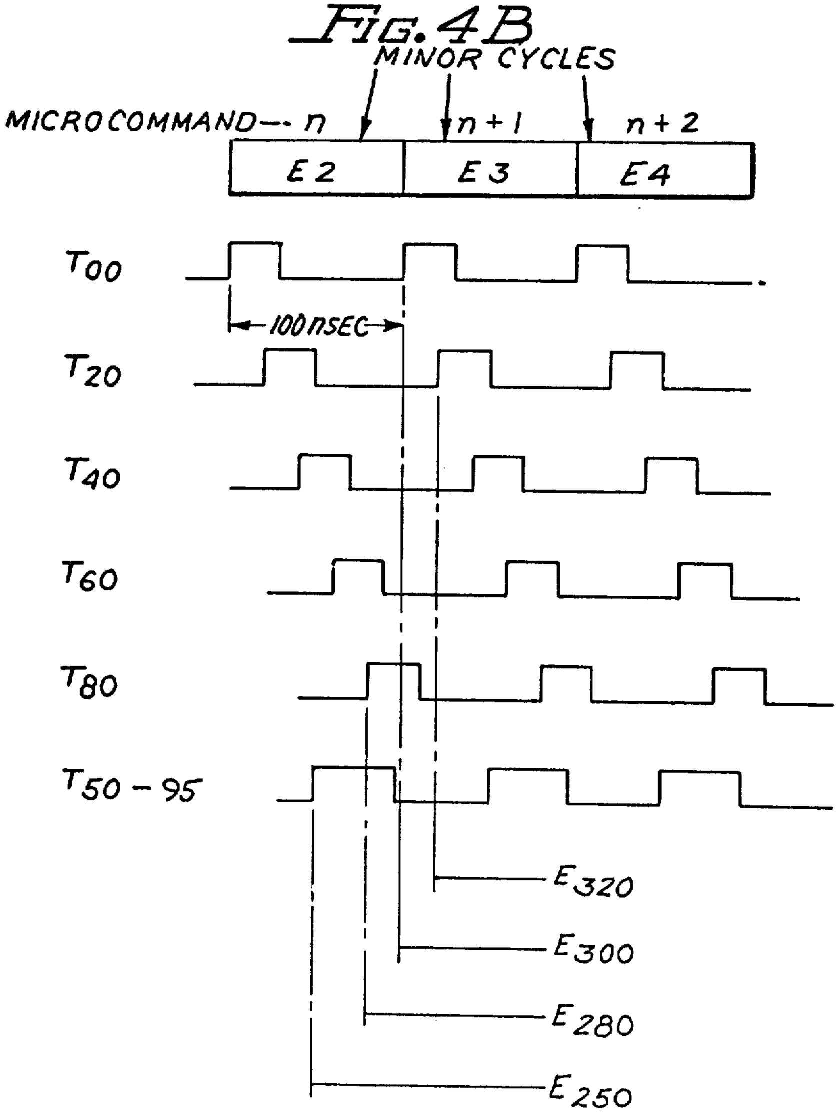
FIG. 4B is a diagrammatic timing illustration of the phase clock pulses occurring during a minor cycle time.

FIG. 4A is a diagrammatic time illustration of an 800 nsec major cycle, where each segment in time denoted "$E_x$" ($x$ = an integer) designates a particular minor cycle within the major cycle. The numeral assigned to x designates the relative time position of a minor cycle within a major cycle, where EO represents the first minor cycle. FIG. 4A also illustrates use of the $E_{xyz}$ terminology. FIG. 4B illustrates the phase clock pulses, employing the $T_{nn}$ notation, typically occurring within several selected minor cycles. Note that the minor cycles are each 100 nsec long.

Figure 5A:
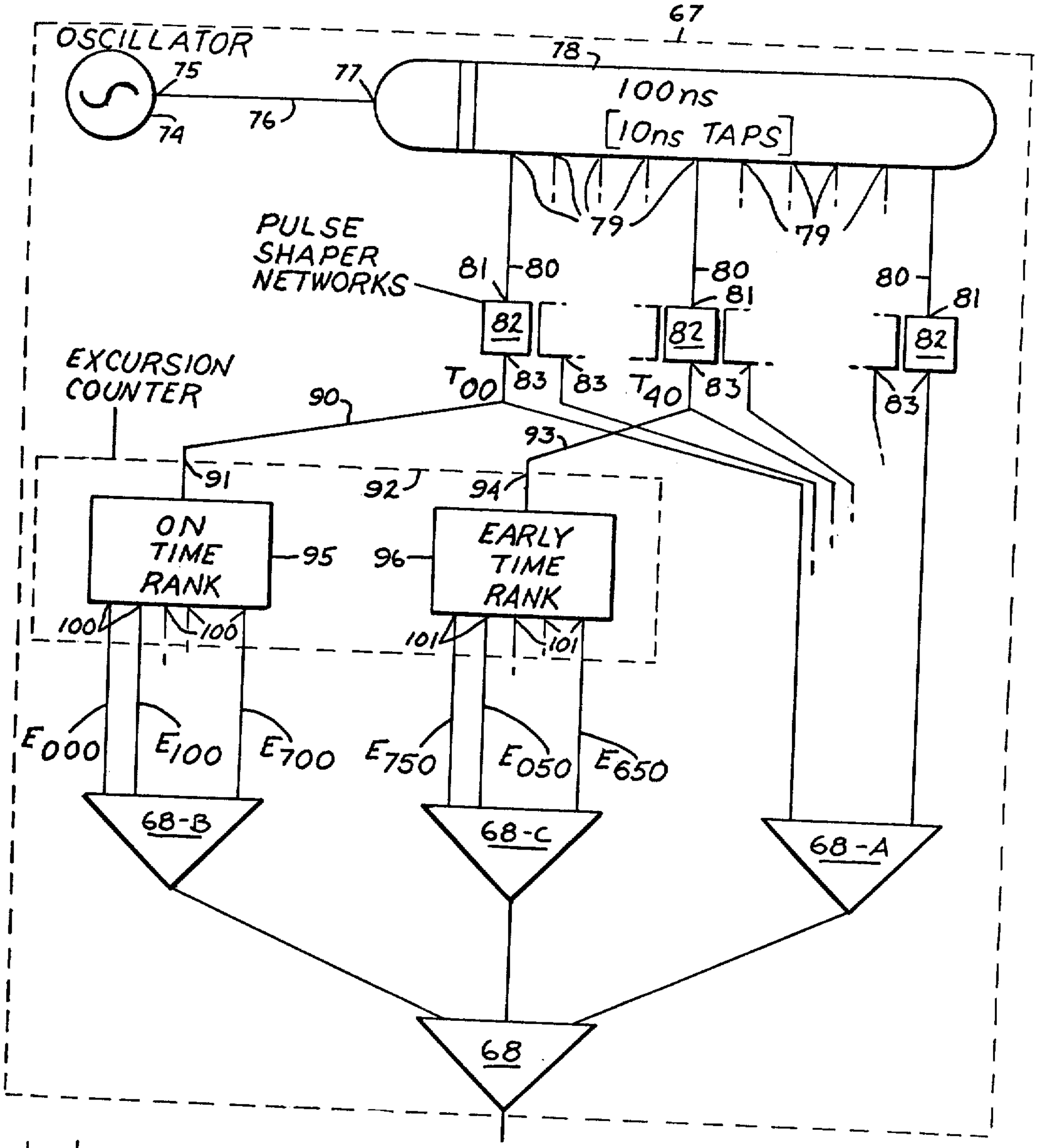
FIG. 5A is a diagrammatic illustration illustrating the functional elements of the Basic Timing circuit portion of the present invention disclosed in FIG. 1.
Figure 5B:
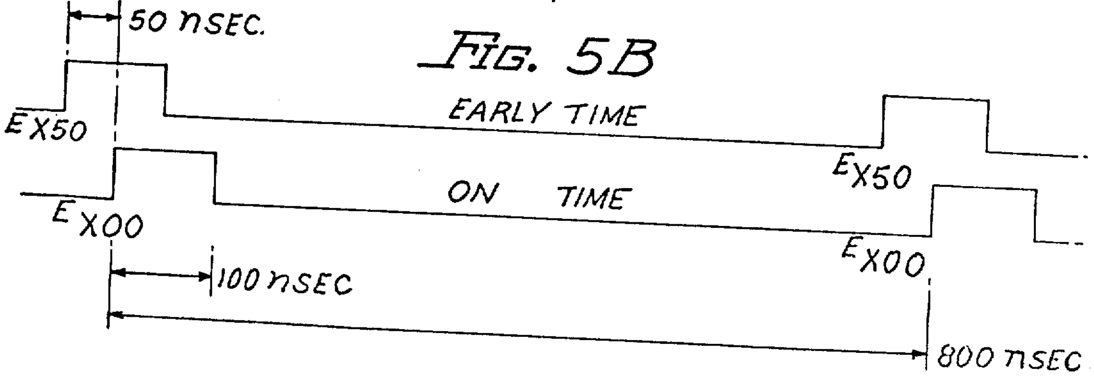
FIG. 5B is a diagrammatic timing representation illustrating the time relationship of output timing pulses from the ON and EARLY time ranks of the Basic Timing circuit disclosed in FIG. 5A.

FIG. 5 illustrates in greater detail the Basic Timing functional block 67 disclosed in FIG. 1. Referring to FIG. 5, there is generally shown an oscillator 74 having an output 75 connected by means of a conductor 76 to an input 77 of a tapped delay line 78. The tapped delay line 78 has a plurality of output taps generally designated as 79. In the preferred embodiment, the oscillator 74 is a crystal oscillator which oscillates at a 10 Mhz rate, and the delay line 78 is a 100 nsec delay line with 10 nsec taps. The plurality of output taps 79 of the delay line 78 are connected by a plurality of conductors, generally designated as 80 in FIG. 5A, to inputs 81 of a plurality of pulse shaper networks 82. The pulse shaper networks 82 respectively have a plurality of outputs 83 that are directly connected to a plurality of signal flow lines generally designated as 68A. The pulse shaper networks 82 may be of any standard digital construction well known in the art. The pulse signals, appearing at the outputs 83 of the plurality of pulse shaper networks 82 are the basic minor cycle phase clock pulse signals previously denoted as $T_{nn}$, (FIG. 4B) as illustrated by the notation accompanying selected outputs 83 in FIG. 5A.

As illustrated in FIG. 5A, two of the outputs 83 of the plurality of pulse shaper networks 82 are designated as $T_{00}$ and $T_{40}$. The output $T_{00}$ is also connected by means of a conductor 90 to a first input 91 of an excursion counter network 92. The output $T_{40}$ of the plurality of pulse shaper networks 82 is also connected by means of a conductor 93 to a second input 94 of the excursion counter network 92. The excursion counter network 92 is a gray code counter containing two independent counting ranks designated in FIG. 5A as an ON time rank 95 and an EARLY time rank 96. The first output 91 of the excursion counter 92 comprises a gating input to the ON time rank 95. Similarly, the second input 94 of the excursion counter 92 comprises a gating input to the EARLY time rank 96.

The ON time rank 95 also has eight outputs generally designated as 100 connected to a plurality of signal flow paths generally designated as 68B in FIG. 5A. The EARLY time rank 96 also has eight outputs generally designated as 101 connected to a plurality of signal paths generally designated as 68C in FIG. 5A. The signal flow paths referred to as 68A, 68B and 68C in FIG. 5A comprise the signal flow path generally designated as 68 in FIG. 1.

The ON time 95 and the EARLY time 96 ranks of the excursion counter 92 are identical in construction and function. In the preferred embodiment, each rank consists of a four flip-flop gray code counter having a single gating input and eight outputs. Each of the flip-flops is commonly gated by the single input and are connected in a manner well known in the art so as to switch when gated so as to yield a changed pulse output on only one of the eight output paths per gating input pulse. Each of the plurality of outputs (100 and 101) of the counting ranks 95 and 96 respectively is physically connected and functionally associated with a specific minor cycle of a major cycle period such that the sequentially occurring output pulses appearing at the plurality of 100 and 101 outputs respectively correspond to consecutive minor cycles within a major cycle. This fact is illustrated in FIG. 5A by the $E_{xyz}$ labels as previously discussed, assigned to the plurality of 100 and 101 outputs.

It will be recognized that although the ON and EARLY time ranks 95 and 96 respectively of the excursion counter 92 contain four flip-flops and eight outputs for each rank, the number of flip-flops and outputs employed within such a counter depends upon the desired number of minor cycles within a major cycle. The Basic Timing section 67 of the preferred embodiment has been designed to accommodate an 800 nsec major cycle having eight minor cycles; therefore, the counting rank defining the major cycle must complete its counting excursion (one complete counting cycle) once each 800 nsec. The clock pulses appearing at the plurality of outputs 100 and 101 of the gray code counting ranks are therefore spaced 100 nsec apart and define the major and minor cycle timing of this data processing system. It will be recognized that the 100 nsec pulse spacing occuring at the plurality of outputs 100 and 101, occurs as a result of the 100 nsec spacing between respectively successive $T_{00}$ and $T_{40}$ gating pulses applied to the gating inputs of the counters.

One counting rank, for example the ON time rank 95, is sufficient to define the major and minor cycles of the data processing system. However, a physical delay is associated with each state change of the flip-flops within the ON time rank 95 during normal counting operations. Therefore, a second counting rank, the EARLY time rank 96, whose output signals physically overlap those of the ON time rank 95, is included to provide any clocking signals required by the data processing system in the interim period in which switching operations are taking place within the ON time rank 95. The output pulses appearing at one of the ON time rank outputs 100 and at a corresponding one of the EARLY time rank outputs 101 that are associated with the same minor cycle of a major cycle are illustrated as they appear relative to each other in FIG. 5B. It will be recognized that a pair of such pulses appear at the corresponding ON and EARLY time rank outputs 100 and 101 for each minor cycle within a major cycle.

Register File

Figure 6:
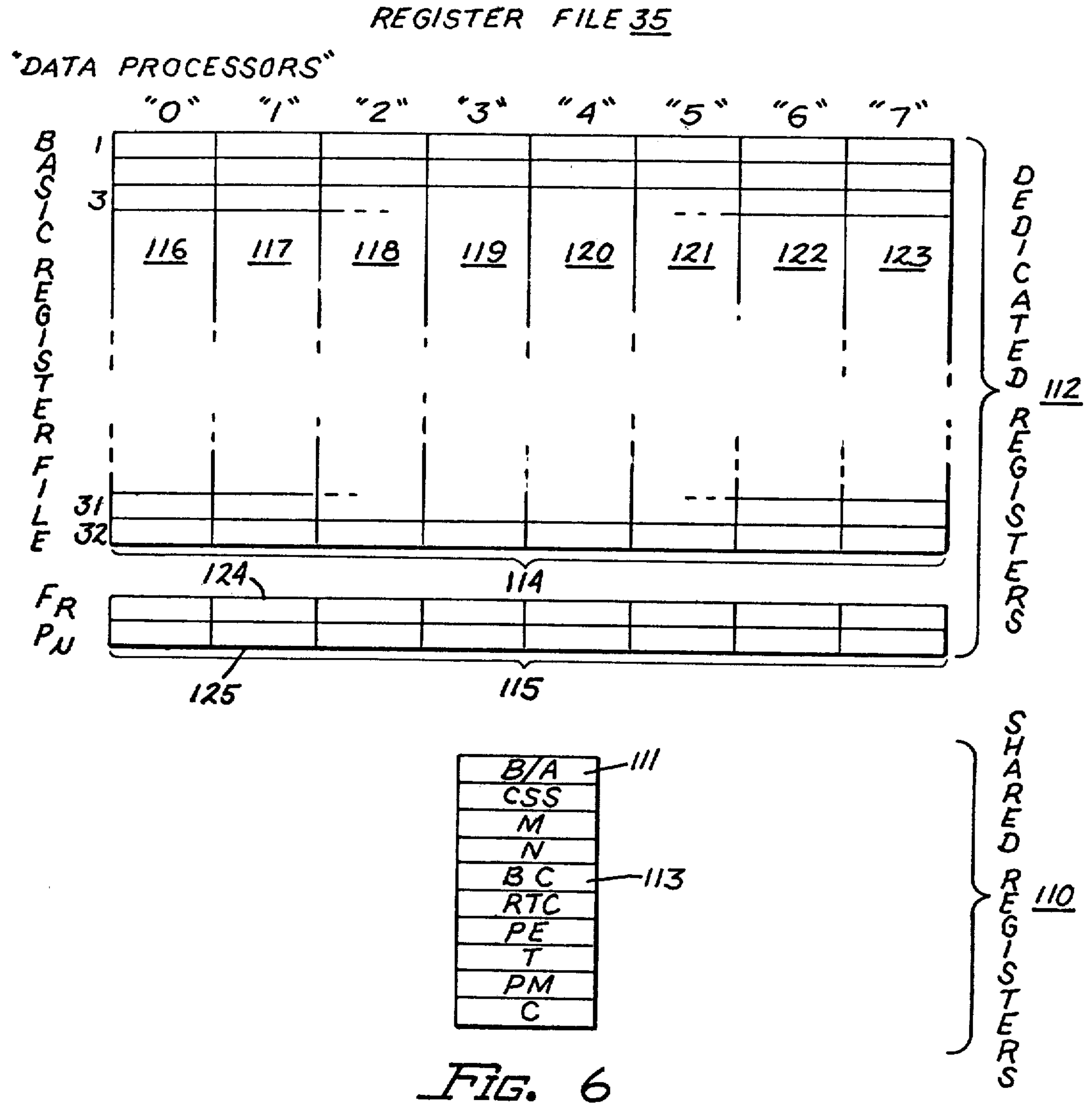
FIG. 6 is a diagrammatic illustration depicting the organizational partitioning of the Register File of the present invention disclosed in FIG. 1.

The physical and functional partitioning of registers within the Register File 35 (FIGS. 1 and 2) is fundamental to the forming of the data processors within the system. An organizational diagram depicting the partitioning of the Register File 35 is illustrated in FIG. 6. Referring to FIG. 6, it will be noted that the Register File 35 is broadly functionally divided into a plurality of shared registers generally designated as 110, and into a plurality of dedicated registers generally designated as 112. The shared registers 110 are commonly connected to (not shown in FIG. 6) and are available for use by all of the data processors within the data processing system. In the preferred embodiment, the shared registers 110 include ten 16-bit registers that are under hardware as well as microcommand control and provide varied special purpose functions required by the data processors of the system. The term shared registers should not be used coterminously with the term shared resources previously described; however, it will be noted that the shared registers 110 are included within the broader shared resources classification.

Except for those special purpose shared registers 110 whose specific functions should be understood for obtaining a basic understanding of my invention, a detailed description of these registers will not be undertaken within this specification. One of the shared registers 110 that is an essential element of the overall resource allocation scheme of my invention, to be hereinafter described, is the Busy/Active (B/A) register 111 (FIG. 6). The B/A register 111 provides status indications as hereinafter described, for each of the data processors within the data processing system. Another of the shared registers 110 that permits cross referencing under microcommand control between data processors, to be hereinafter described, is the Boundary Crossing register (BC) 113. Referring to FIG. 6, the remaining plurality of shared registers 110 are dedicated in the preferred embodiment to such special purpose functions as: establishing a real time clock reference (RTC), providing parity error address locations (PE), providing visual address and data read-out of main storage and control storage memories (CSS, M, N) and providing processor status condition signals for individual data processors (T, C, PM).

It will be recognized that although the preferred embodiment employs ten shared registers 110, any number of such registers may be employed to satisfy the specific data processing needs of a system. Similarly, although the preferred embodiment uses 16-bit shared registers 110, it will be recognized that the specific register length employed is entirely dependent upon the particular data format used and upon the requirements of the data processing system.

The dedicated registers 112 of the Register File 35 (see FIG. 6) are generally subdivided into first and second register groups 114 and 115 respectively. The first group of dedicated registers, collectively terms a Basic Register File 114, includes general purpose registers that are under microcommand control only. In the preferred embodiment, the Basic Register File 114 consists of 256-16-bit registers.

The individual basis for each data processor of the system is physically derived from a subdivision of the Basic Register File 114. The preferred embodiment contains eight unique data processors. Accordingly, the 256 registers within the basic register file 114 are functionally and physically subdivided into eight groups of 32 registers each designated as 116–123 in FIG. 6. Each functional register group, 116–123, is dedicated to a particular data processor (or processor state) respectively numerically referred to as data processors 0 through 7 in FIG. 6. The above subdivision of the Basic Register File 114 was briefly conceptually illustrated with respect to FIG. 2. Although the Basic Register File 114 of the preferred embodiment contains 256 registers which are subdivided to form eight data processors, it will be recognized that any convenient basic register file size and subdivision thereof to form a particular desired number of data processors may be employed.

The second register group 115 of dedicated registers 112 consists of sixteen 18-bit registers designated as the $F_R$124 and $P_u$125 registers (FIG. 6). In the preferred embodiment there are eight each of the $F_R$124 and the $P_u$125 registers. The second group of dedicated registers 115 are physically and functionally subdivided such that one each of the $F_R$124 and the $P_u$125 registers is dedicated to each of the eight data processors of the system.

Throughout this specification reference may be made to the "extended" registers of the Register File 35. The extended registers refer to those registers of the Register File 35 not included within the Basic Register File 114. With respect to FIG. 6, the extended registers would include the shared registers 110 and the $F_R$124 and the $P_u$125 registers.

In summary, the dedicated registers 112 are divided into eight functional register groups (116–123), one functional register group associated with each of the eight data processors within the system, with each group containing 34 registers. The $P_u$ register 125 associated with each functional register group contains the control store address, to be hereinafter described, of the next microcode instruction to be executed by the data processor to which that $P_u$ register is dedicated. The $F_R$ register 124 of each functional register group contains the first two byte (16 bit) word, as hereinafter described, of the function code of the machine language instruction that is to be executed next by the data processor to which that $F_R$ register is dedicated.

A general block diagram schematic representation of the major functional elements comprising the multiprocessor system of the preferred embodiment is illustrated in FIGS. 7–10.

Figure 7:
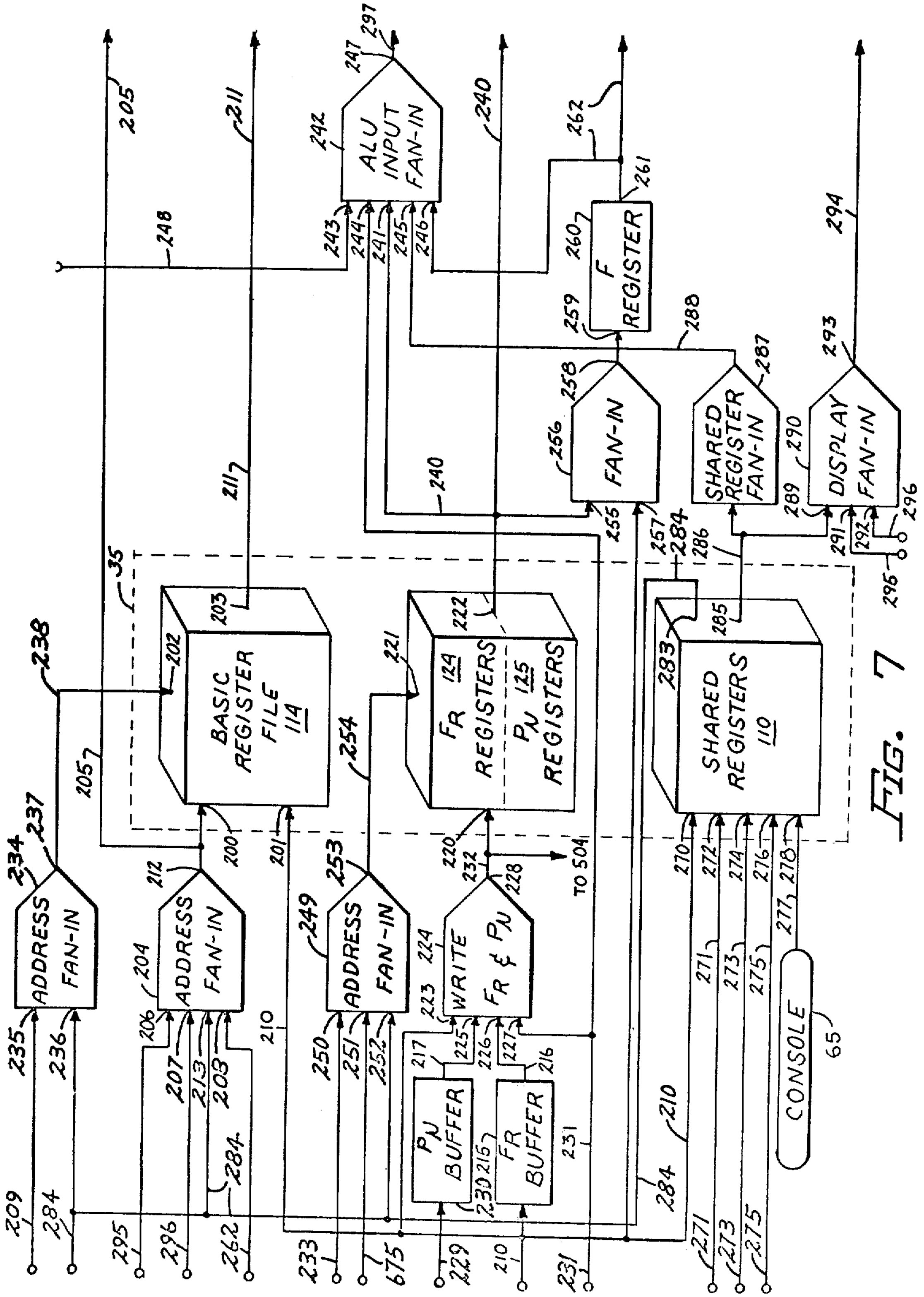
FIG. 7 is a functional schematic representation of the Register File and associated Timing and Control circuits of the present invention as disclosed in FIG. 1.

A functional block diagram illustrating registers of the Register File 35, the major functional control elements associated therewith and the signal flow interrelationships thereamong is illustrated in FIG. 7. It should be generally noted with respect to FIGS. 7–10, that those functional elements that are not designated as elements of one of the function blocks illustrated in FIG. 1, form part in the Timing and Control networks 38 functionally illustrated in FIG. 1. Also, with respect to FIG. 7, it should be noted that the functional division and specific dedication (as data processors) of registers within the Register File 35 is not illustrated.

There is generally shown in FIG. 7 the Register File 35 functionally subdivided into the Basic Register File 114, the $F_R$124 and the $P_u$125 registers and the shared registers 110. The remaining illustrated circuitry comprises networks of the Timing and Control functional block 38 (FIG. 1). Signal flow paths to the three subdivisions of the Register File 35 will be understood to be functionally and physically connected to all of the individual registers (illustrated in FIG. 6) within a subdivision of the Register File 35.

Referring to FIG. 7, the Basic Register File 114 has an address input 200, a data input 201, a write input 202 and a data output 203. An Address fan-in network 204 having a signal output 212 provides input signals from its signal output 212 to the address input 200 of the Basic Register File 114 by means of a signal flow path 205. The Address fan-in network 204 has a first input 206, a second input 207, a third input 208 and a fourth input 213. Signal flow is provided to the inputs 206 and 207 of the Address fan-in network 204, respectively, by means of a conductor 295 and by means of a conductor 296, both originating within the Timing and Control circuits 38 as hereinafter described. The Address fan-in network also provides signal flow by means of the signal flow path 205 to the I/O section 30. The Address fan-in network 204 is a typical logic network essentially performing logical selection OR functions for signals applied to its inputs. The foregoing fan-in connotation will be used throughout this specification.

An Address fan-in network 234 having a signal output 237 provides signal flow to the write input 202 of the Basic Register File 114 by means of a signal flow path 238 connecting the signal output 234 with the write input 202. The Address fan-in network 234 further has a first input 235 and a second input 236. Signal flow is provided to the first input 235 of the Address fan-in network by means of a signal flow path 209 originating within the Resource Allocation network 37 as hereinafter described.

Signal inputs are provided to the data input 201 of the Basic Register File 114 by means of a signal flow path 210 originating within the ALU 36 as hereinafter described. Output data signals are carried from the data output 203 of the Basic Register File 114 by means of a data signal flow path 211.

The $F_R$124 and $P_u$125 registers are commonly addressed by means of a first commonly designated input 220 and by means of a commonly designated write input 221. Signal flow from the $F_R$124 and $P_u$125 registers occurs through a commonly designated output 222.

The signal flow path 210 is directly connected to a first input 223 of a Write $F_R$ and $P_u$ fan-in network 224. The fan-in network 224 further has a second input 225, a third input 226, a fourth input 227 and a signal output 228. The signal flow path 210 is further connected by means of an $F_R$ buffer register 215 and a signal flow path 216 to the third input 226 of the fan-in network 224. A signal flow path 229 originating at circuits within the Timing and Control section 38, as hereinafter described, provides signal flow by means of a $P_u$ buffer register 230 and a signal flow path 217 to the second input 225 of the fan-in network 224. A signal flow path 231 originating within the Timing and Control section 38, as hereinafter described, provides signal flow to the fourth input 227 of the fan-in network 224. Signals from the output 228 of the fan-in network 224 flow by means of a signal flow path 232 to the first commonly designated input 220 of the $F_R$124 and the $P_u$125 registers. The signal flow path 232 also provides signal flow to the Control Storage section 60 as hereinafter described.

An Address fan-in network 249 having a signal output 253 provides signal flow to the commonly designated write input 221 of the $F_R$124 and $P_u$125 registers by means of a signal flow path 254. Connecting the signal output 253 with the commonly designated write input 221. The Address fan-in network 249 further has a first input 250, a second input 251 and a third input 252. Signal flow is provided to the first and second inputs 250 and 251 respectively of the Address fan-in network 249 by means of a signal flow path 233 and by means of a signal flow path 675 respectively connected thereto and originating within the Resource Allocation network 37 as hereinafter described.

The commonly designated output 222 of the $F_R$124 and the $P_u$125 registers is connected by means of a signal flow path 240 to a first input 241 of an ALU Input, fan-in network 242. The ALU Input fan-in network 242 further has a second input 243, a third input 244, a fourth input 245, a fifth input 246 and a signal output 247. Input signal flow is provided from the I/O section 30 by means of a signal flow path 248 to the second input 243 of the fan-in network 242. It should be noted that the signal flow path 248 is included as a part of the more general signal flow path between the I/O and Timing and Control sections 30 and 38, respectively, generally designated as 44 in FIG. 1. The signal flow path 231 originating within the Timing and Control network 38, as hereinafter described, provides input signals to the third input 244 of the fan-in network 242.

The signal flow path 240 also provides signal flow, as hereinafter described, to the Control Storage section 60 of the system and further (FIG. 7) provides signal flow to a first input 255 of an F register fan-in network 256. The fan-in network 256 further has a second input 257 which is connected to receive input signals by means of a signal flow path 210. Signal flow from the fan-in network 256 is provided by means of a signal flow path 258 to an input 259 of an F register 260. The F register 260 further has an output 261 from which signal flow is provided by means of a signal flow path 262 directly connected to the fifth input 246 of the ALU Input fan-in network 242 and is also directly connected to the third input 208 of the Address fan-in network 204. The signal flow path 262 further provides signal flow to the Timing and Control network 38 as hereinafter described.

The signal flow path 210 further provides input signals to the shared registers 110 by means of a first commonly designated input 270. Further input signals are provided to the shared registers 110 respectively by means of: a signal flow path 271, originating within the ALU 36 as hereinafter described, and terminating at a second common input 272; by means of a signal flow path 273, originating at circuits within the Timing and Control section 38 as hereinafter described, and terminating at a third common input 274; by means of a signal flow path 275, originating within the Control Storage section 60 as hereinafter described, and terminating at a fourth common input 276; and by means of a signal flow path 277 originating within the Console functional block 65 and terminating at a fifth commonly connected input 278.

Signal flow from the shared registers 110 generally occurs by means of a commonly designated output 285. A general signal flow path 286 directly connects the signal output 285 to a Shared Register fan-in network 287 are directed by means of a signal flow path 288 to the fourth input 245 of the ALU Input fan-in network 242. Signal flow from the shared registers 110 is also provided by means of the general signal flow path 286 to a first input 289 of a Display fan-in network 290. The Display fan-in network 290 further has a second input 291, a third input 292, and a signal output 293. Signal flow to the second and third inputs 291 and 292 respectively of the Display fan-in network 290 is provided by means of a signal flow path 295 directly connected to the second input 291 and by means of a signal flow path 296 directly connected to the third input 292. The signal flow path 295 and 296 originate within the Timing and Control circuits 38 as hereinafter described. Signal flow from the output 293 of the Display fan-in network 290 is provided by means of a signal flow path 294 as hereinafter described.

Signal flow from the BC register 113 of the shared register 110 (FIG. 6) also is provided by means of a generally designated BC signal output 283 and by means of a signal flow path 284 connected thereto. The signal flow path 284 is directly connected: to the second input 236 of the Address fan-in network 234; to the fourth input 213 of the Address fan-in network 204; and to the third input 252 of the Address fan-in network 249. The function of the signal flow path 284 will be hereinafter described in relation to the operation of the boundary crossing facility of the system.

Signal flow from the output 247 of the ALU Input fan-in network 242 is conducted by means of a signal flow path 297 connected thereto and terminating within the ALU 36 as hereinafter described.

Arithmetic and Logic Unit

The networks of the ALU 36 perform arithmetic and logical and manipulative operations on digital data received thereby. Within the foregoing definitions, the networks combined to form the ALU 36 are classified as shared resources, which functionally connect by means of the general signal flow paths 42 and 43 (FIG. 1), the functional dedicated register groups (116–123) within the Register File 35 with the Main Storage memory 32. As previously discussed, each of the functional dedicated register groups (116–123) within the Register File 35 when operatively connected with the Timing and Control networks 38 to share the ALU networks and the Main Storage memory 32 forms a unique data processor of the data processing system.

Figure 8:
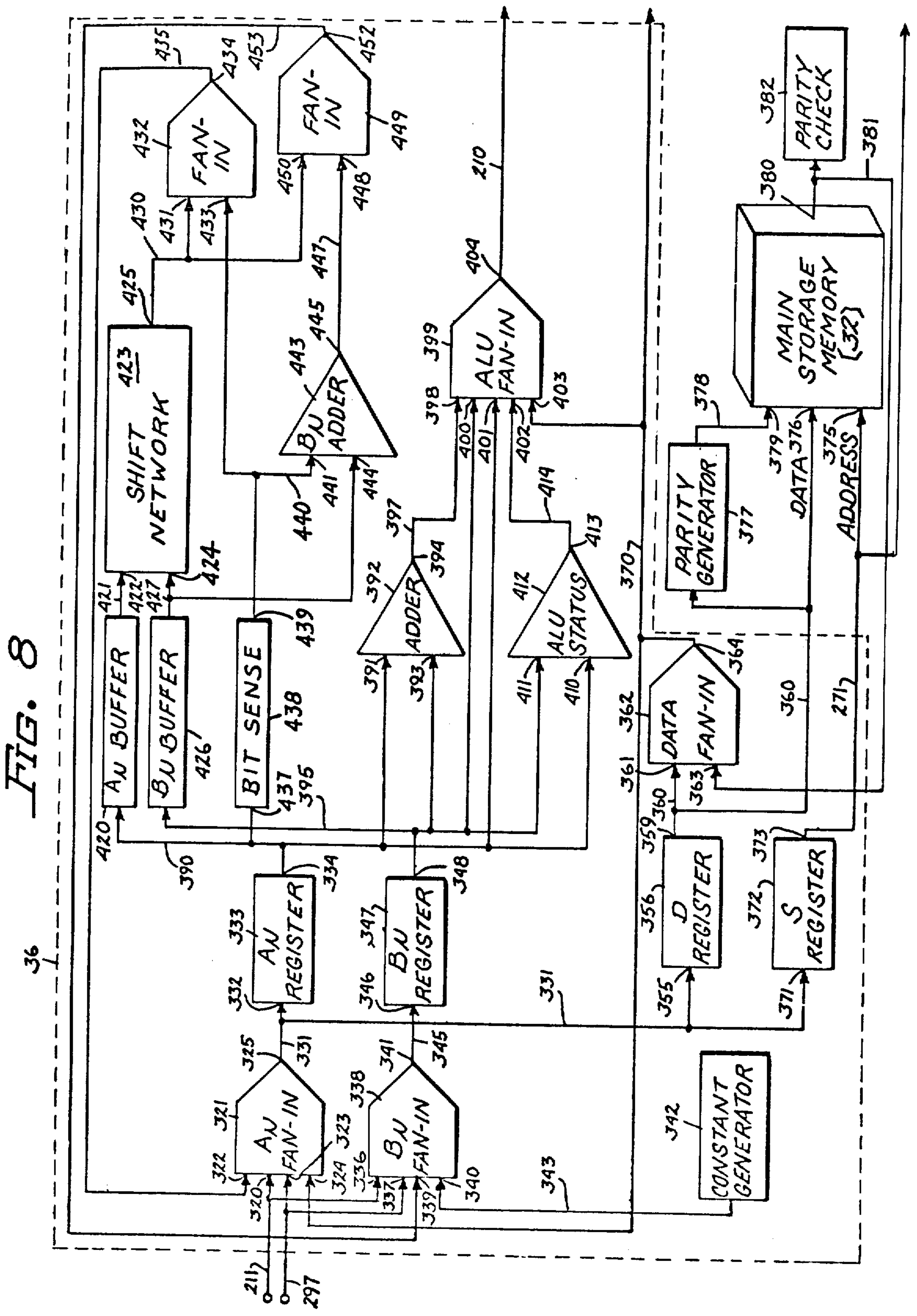
FIG. 8 is a functional schematic representation illustrating the Arithmetic and Logic Unit and the Main Storage memory sections of the present invention as disclosed in FIG. 1.

A functional block diagram schematic illustration of the major blocks comprising the ALU 36 is shown in FIG. 8. Referring to FIG. 8, there is generally shown the ALU 36 with its functional connections to the Main Storage memory 32. The signal flow path 211 from the data output 203 of the Basic Register file 114 (FIG. 7) is directly connected to a first input 320 of an $A_u$ fan-in network 321. A $A_u$ fan-in network 321 further has a second input 322, a third input 323, a fourth input 324, and an output 325. The signal flow path 297 directly connects the output 247 of the ALU Input fan-in network 242 (FIG. 7) to the third input 323 of the $A_u$ fan-in network 321. The output 325 of the fan-in network 321 is connected by means of a signal flow path 331 to an input 332 of an $A_u$ register 333. The $A_u$ register 333 further has a signal output 334.

The signal flow paths 211 and 297 are also directly connected respectively to a first input 336 and to a second input 337 of a $B_u$ fan-in network 338. The $B_u$ fan-in network 338 further has a third signal input 339, a fourth signal input 340 and a signal output 341. A Constant Generator 342 is directly connected by means of a signal flow path 343 to the fourth signal input 340 of the $B_u$ fan-in network 338.

The signal output 341 of the $B_u$ fan-in network 338 is directly connected by means of a signal flow path 345 to an input 346 of a $B_u$ register 347. The $B_u$ register 347 also has a signal output 348.

The signal flow path 331 is further directly connected to a common input 355 of a D register 356. The D register 356 further has a signal output 359 connected by means of a signal flow path 360 to a first input 361 of a Data fan-in network 362. The Data fan-in network 362 also has a second input 363 and a signal output 364. The data output 364 of the Data fan-in network 362 is connected by means of a signal flow path 370 to the fourth input 324 of the $A_u$ fan-in network 321.

The signal flow path 370 also provides a signal flow input, as hereinafter described, to the Address Table networks 61.

The signal flow path 331 is also directly connected to a common input 371 of an S register 372. The S register 372 also has a signal output 373 connected by means of the signal flow path 271 to an address input 375 of the Main Storage memory 32. The signal flow path 271 is also directly connected to the second common input 273 of the shared registers 110 (FIG. 7).

The signal flow path 360 also connects the output 359 of the D register 356 with a data input 376 of the Main Storage memory 32 and further connects the output 359 of the D register 356 by means of a Parity Generator 377 and a signal flow 378 with a parity input 379 of the Main Storage memory 32. The Main Storage memory 32 also has a generally designated data output 380 which is connected by means of a signal flow path 381 to the second input 363 of the Data fan-in network 362. The signal flow path 381 is also connected and provides signal input flow to a Parity Check network 382.

The signal output 334 of the $A_u$ register 333 is directly connected by means of a signal flow path 390 to a first input 391 of an Adder network 392. The Adder network 392 also has a second input 393 and a signal output 394. The signal output 348 of the $B_u$ register 347 is directly connected by means of a signal flow path 395 to the second input 393 of the Adder network 392.

The output 394 of the Adder network 392 is connected by means of a signal flow path 397 to a first input 398 of an ALU fan-in network 399. The ALU fan-in network 399 also has a second input 400, a third input 401, a fourth input 402, a fifth input 403 and a signal output 404.

The signal output 334 of the $A_u$ register 333 is also directly connected by means of the signal flow path 390 to the third input 401 of the ALU fan-in network 399. The signal output 348 of the $B_u$ register 347 is also directly connected by means of the signal flow path 395 to the second input 400 of the ALU fan-in network 399.

The signal flow paths 390 and 395 are also directly connected respectively to the first input 410 and to a second input 411 of an ALU Status functional block 412. The ALU Status functional block 412 further has a signal output 413 directly connected by means of a signal flow path 414 to the fourth input 402 of the ALU fan-in network 399.

The signal flow path 370 directly connects the signal output 364 of the Data fan-in network 362 to the fifth input 403 of the ALU fan-in network 399. The signal output 404 of the ALU fan-in network 399 is connected to the signal flow path 210 as previously referenced with respect to inputs of the Timing and Control network 38 circuits of FIG. 7.

Signals are also carried from the output 334 of the $A_u$ register 333 by means of the signal flow path 390, an $A_u$ buffer register 420, and a signal flow path 421 to a first input 422 of a Shift network 423. The Shift network 423 also has a second input 424 and a signal output 425. Signal flow is provided from the signal output 348 of the $B_u$ register 347 by means of the signal flow path 395, a $B_u$ buffer register 426 and a signal flow path 427 to the second input 424 of the Shift network 423.

Signal flow from the output 425 of the Shift network 423 is provided by means of a signal flow path 430 to a first input 431 of a Shift and Bit Sense fan-in network 432. The fan-in network 432 further has a second input 433 and a signal output 434. The signal output 434 of the fan-in network 432 is directly connected by means of a signal flow path 435 to the second input 322 of the $A_u$ fan-in network 321.

The signal flow path 390 also directly connects the output 334 of the $A_u$ register 333 to an input 437 of a Bit Sense network 438. The Bit Sense network 438 further has a signal output 439 directly connected by means of a signal flow path 440 to the second input 433 of the fan-in network 432.

The signal flow path 440 is also directly connected to a first input 441 of a $B_u$ Adder functional unit 443. The $B_u$ Adder unit 443 further has a second input 444 and a signal output 445. The signal flow path 427 from the $B_u$ buffer register 426 is connected to provide a signal flow path to the second input 444 of the $B_u$ Adder unit 443.

The output 445 of the $B_u$ Adder unit 443 is directly connected by means of a signal flow path 447 to a first input 448 of a Shift and $B_u$ Adder fan-in network 449. The fan-in network 449 further has a second input 450 and also has an output 452. The signal output 425 of the Shift network 423 is connected by means of the signal flow path 430 to the second input 450 of the fan-in network 449. The output 452 of the fan-in network 449 is directly connected by means of a signal flow path 453 to the third signal input 339 of the $B_u$ fan-in network 338.

With reference to FIG. 8, it will be noted that all signal inputs to the ALU 36 are directed to the $A_u$ 333 and to the $B_u$ 347 registers by means of the $A_u$ 321 and $B_u$ 338 fan-in networks respectively. In the preferred embodiment, the $A_u$ 333 and the $B_u$ 347 registers contain 16-bits and function to receive that digital information to be logically acted upon within the date processing system.

The Adder network 392 consists of an additive logical network for arithmetically combining the contents of the Au 333 and the $B_u$ 347 registers. The output of the Adder network 392 is available to the ALU fan-in network 399 for selection during write references to the Register File 35 under microcommand control. The ALU Status network 412 includes those networks required for translating overflow conditions and for comparing the $A_u$ 333 and the $B_u$ 347 register conditions. The Bit Sense network 438, the Shift network 423, the $B_u$ Adder network 443 and the associated buffer registers 420 and 426 and fan-in networks 433 and 449 provide that logic required to implement specific classes of microcommand instructions. Since the specific microcode instruction repertoires that can be used within a data processing system employing my invention may vary, and since the particular circuitry required to implement a specific microcode repertoire depends upon the particular repertoire used, the details of such circuitry will not add to an understanding of our invention and, accordingly, will not be pursued within this specification.

The ALU fan-in network 399 includes that logic circuitry required for selecting the data from the ALU 36 to be transferred to the Register File 35 under microcommand control. The ALU fan-in network 399 also provides the means for transferring data from the ALU 36 to visual display panels (not shown) but located within the Console 65. The S register 372 contains 16-bits and is the address register of the Main Storage memory 32. The D register 356 consists of 16-bits and is the immediate circuit through which data is placed into the Main Storage memory 32. The contents of the D register 356 are also made available by means of the Data fan-in network 362 to the $A_u$ register 333, to the ALU fan-in network 399 and to the Address Table 61 addressing mechanism in lieu of the contents of the Control Storage 60 address register (to be hereinafter described) for the purposes of executing particular microcommand instructions within the preferred embodiment. The Constant Generator 342 provides immediate operands to the $B_u$ register 347 as required by the microcommand instructions and such related functions.

Control Storage/Address Table

Figure 9:
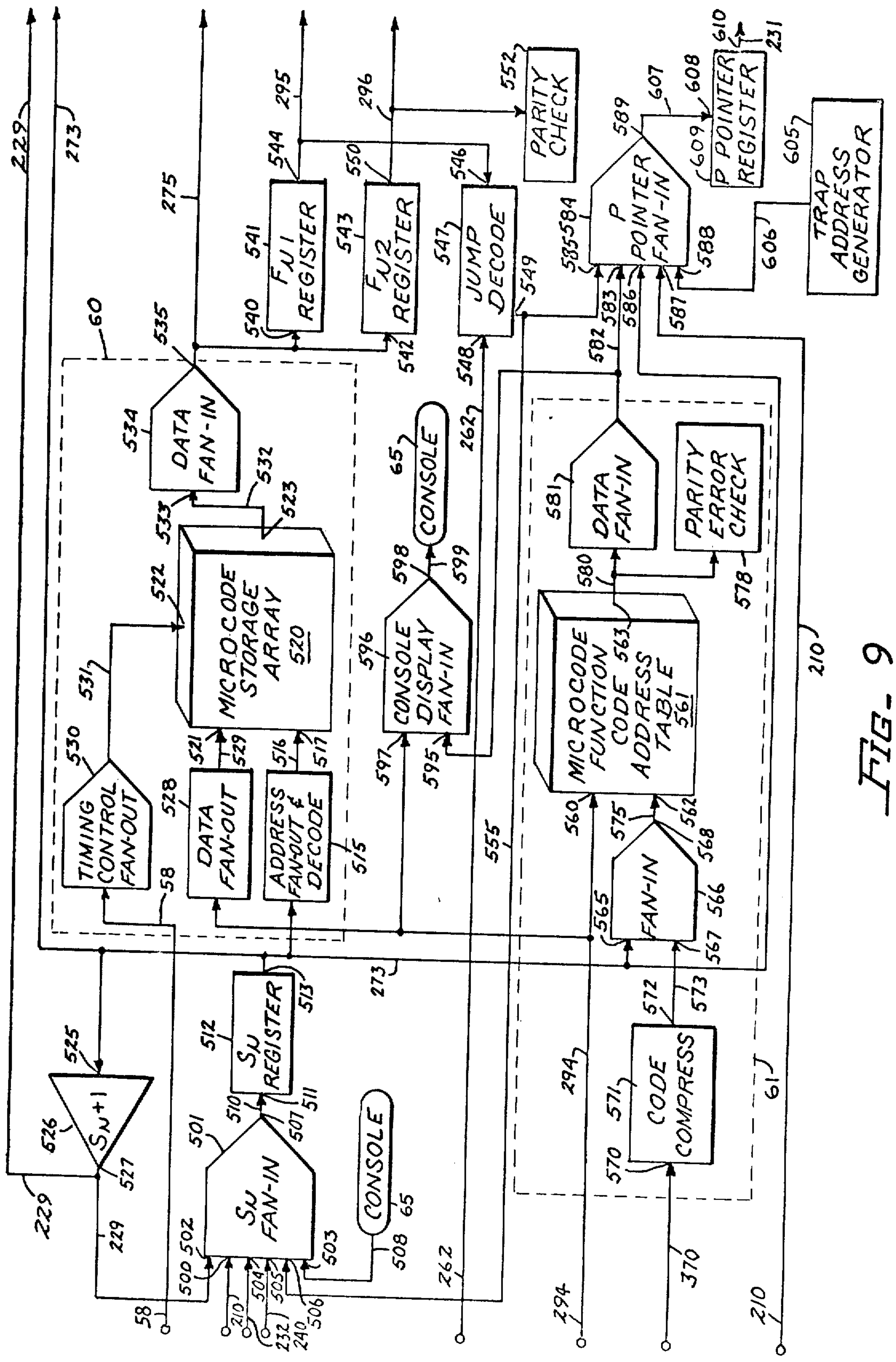
FIG. 9 is a functional schematic representation of the Control Storage and Address Table sections with associated Timing and Control circuit networks of the present invention as disclosed in FIG. 1.

The control storage facility of the data processing system of the preferred embodiment is generally illustrated in FIG. 9. The control storage facility is generally divided into the Control Storage Proper network 60 and the Address Table network 61. The associated peripheral networks illustrated in FIG. 9 represent circuits within the Timing and Control network 38 (see FIG. 1). The control storage facility networks in general provide for the storage of and for access to the micro-instructions employed to implement the machine language instructions within the data processing system.

Referring to FIG. 9, the signal flow path 210 from the ALU fan-in network 399 of the ALU 36 forms a first input 500 to a $S_u$ fan-in network 501. The $S_u$ fan-in network 501 further has second through sixth inputs designated respectively as 502 through 506 and a signal output 507. The signal flow path 232 from the output 228 of the $P_u$ and $F_R$ fan-in network 224 of FIG. 7 is directly connected to the fourth input 504 of the $S_u$ fan-in network 501. The signal flow path 240 from the output 222 of the $F_R$ 124 and the $P_u$ 125 registers of the Register File 35 (FIG. 7) is directly connected to the fifth input 505 of the $S_u$ fan-in network 501. The Console 65 is connected by means of a signal flow path 508 to the third input 503 of the $S_u$ fan-in network 501.

The output 507 of the $S_u$ fan-in network 501 is connected by means of a signal flow path 510 to an input 511 of an $S_u$ register 512. The $S_u$ register 512 is the address register for the Control Storage Proper 60. The $S_u$ register 512 further has an output 513 connected by means of the signal flow path 273, an Address fan-out and decode network 515 and a signal flow path 516 to an address input 517 of a Microcode Storage Array network 520. The signal flow path 273 is also directly connected to the commonly designated input 274 of the shared registers 110 (FIG. 7).

The Microcode Storage Array 520 further has a data input 521, a timing and control input 522 and a data output 523. The general signal flow path 58 from the Timing and Control network 38 applies signals to the timing and control input 522 of the Microcode Storage Array 520, by means of a timing and control fan-out network 530 and a signal flow path 531 directly connected to the input 522 of the Storage Array 520. In the preferred embodiment, the Microcode Storage Array 520 consists of 16,384 14-bit words; however, it should be noted that any appropriate storage array size may be employed.

The signal flow path 273 from the output 513 of the $S_u$ register 512 is also directly connected to an input 525 of a $S_u$+1 incrementing functional block 526. The incrementing functional block 526 further has an output 527 connected by means of the signal flow path 229 to the second input 502 of the $S_u$ fan-in network 501. The signal flow path 229 also connects the output 527 of the $S_u$+1 network 526 to the $P_u$ buffer register 230 (FIG. 7).

Signals from the output 293 of the Display fan-in network 290 (FIG. 7) are applied by means of the signal flow path 294, a Data fan-out network 528 (FIG. 9) and a signal flow path 529 to the data input 521 of the Microcode Storage Array 520. The commonly designated data output 523 of the Microcode Storage Array 520 is connected by means of a signal flow path 532 to a commonly designated input 533 of a Data fan-in network 534. The Data fan-in network 534 also has a data output 535 connected to form the origin of the signal flow path 275. The data output 535 of the Data fan-in network 534 is connected by means of the signal flow path 275 to the fourth input 276 of the shared register network 110 (FIG. 7), and is also connected by means of the signal flow path 275 to an input 540 of an $F_{u1}$ register 541 and to an input 542 of an $F_{u2}$ register 543. In the preferred embodiment, the $F_{u1}$ register 541 and the $F_{u2}$ register 543 are 16-bit buffer registers whose function will be hereinafter described. The $F_{u1}$ register 541 also has a signal output 544 connected by means of the signal flow path 295 to a first input 546 of a Jump Decode functional block 547. The Jump Decode functional block 547 also has a second input 548 and a signal output 549. The signal output 544 of the $F_{u1}$ register 541 is also connected by means of the signal flow path 295 to the second input 291 of the Display fan-in network 290 and to the first input 206 of the Address fan-in network 204 (FIG. 7). The $F_{u2}$ register 543 further has a signal output 550 connected by means of the signal flow path 296 to a Control Store Parity Check functional network 552. The output 550 of the $F_{u2}$ register 543 is also connected by means of the signal flow path 296 to the third input 292 of the Display fan-in network 290 and also to the second input 207 of the Address fan-in network 204 (FIG. 7).

The output 261 of the F register 260 (FIG. 7) is directly connected by means of the signal flow path 262 to the second input 548 of the Jump Decode network 547. The output 549 of the Jump Decode network 547 is directly connected by means of a signal flow path 555 to the sixth input 506 of the $S_u$ fan-in network 501.

The signal flow path 294 (FIG. 9) also is directly connected to a first input 560 of a microcode function code Address Table Array 561. The Address Table Array 561 further has a second input 562 and a commonly designated output 563. In the preferred embodiment, the Address Table Array 561 consists of a maximum of 1,024 10-bit words and contains the beginning address location of a microcode instruction within the microcode Storage Array network 520 as preprogrammed to correspond with the specific microcode instructions employed within the date processing system.

The output 513 of the $S_u$ register 512 is also connected by means of the signal flow path 273 to a first input 565 of a fan-in network 566. The fan-in network 566 also has a second input 567 and a signal output 568.

The output 364 of the Data fan-in network 362 (FIG. 8) is directly connected by means of the signal flow path 370 to an input 570 of a Code Compression network 571. The Code Compression network 571 further has a signal output 572 directly connected by means of a signal flow path 573 to the second input 567 of the fan-in network 566. The output 568 of the fan-in network 566 is directly connected by means of a signal flow path 575 to the second input 562 of the function code Address Table 561.

The commonly designated output 563 of the function code Address Table 561 is connected by means of a signal flow path 580 to a Parity Error Check network 578. Output signals from the function code Address Table 561 are also provided by means of the signal flow path 580, a Data fan-in network 581 and a signal flow path 582 to a first input 583 of a $P_{pointer}$ fan-in network 584. The $P_{pointer}$ fan-in network 584 further has a second input 585, a third input 586, a fourth input 587, a fifth input 588 and a signal output 589. The signal output 549 of the Jump Decode functional block 547 is directly connected by means of the signal flow path 555 to the second input 585 of the $P_{pointer}$ fan-in network 584.

The signal flow path 582 is also directly connected to a first input 595 of a Console Display fan-in network 596. The Console Display fan-in network 596 also has a second input 597 and a signal output 598. The signal flow path 294 is directly connected to the second input 597 of the Console Display fan-in network 596. The signal output 598 of the Console Display fan-in network 596 is connected by means of a signal flow path 599 to the Console 65.

The output 513 of the $S_u$ register 512 is further directly connected by means of the signal flow path 273 to the third input 586 of the $P_{pointer}$ fan-in network 584.

The output 404 of the ALU fan-in network 399 (FIG. 8) is also directly connected by means of the signal flow path 210 to the fourth input 587 of the $P_{pointer}$ fan-in network 584.

A Trap Address Generator network 605 is connected by means of a signal flow path 606 to the fifth input 588 of the $P_{pointer}$ fan-in network 584.

The output 589 of the $P_{pointer}$ fan-in network 584 is connected by means of a signal flow path 607 to an input 608 of a $P_{pointer}$ register 609. The $P_{pointer}$ register 609 also has a signal output 610 directly connected by means of the signal flow path 231 to the third input 244 of the ALU input fan-in network 242 (FIG. 7). The output 610 of the $P_{pointer}$ register 609 is also directly connected by means of the signal flow path 231 to the fourth input 227 of the $F_R$ and $P_u$ fan-in network 224 (FIG. 7).

The Control Storage Proper 60 contains the circuits for storing microcommands to be read, translated and executed under hardware control. The Address Table 61 contains the circuits for storing the specific address locations of microcommands within the Control Storage Proper 60 such that specific microcommands may perform high speed branch operations for decoding purposes. The $S_u$ register 512 is the only register that can be used for directly addressing the microcode Storage Array 520 of the Control Storage Proper 60, and also provides the only means for directly addressing the function code Address Table 561 of the Address Table network 61. When the contents of Control Storage Proper 60 are to be read, translated and executed as microcommands, the $F_{u1}$ 541 and the $F_{u2}$ 543 registers buffer the output of the Control Storage Proper 60. Microcommands are duplicated in the $F_{u1}$ 541 and the $F_{u2}$ 543 registers and horizontal parity checking is performed on the contents of the $F_{u2}$ register 543. When the contents of the Control Storage Proper 60 are to be read but not treated as microcommands, the output read from the Control Storage Proper 60 is transmitted by means of the signal flow path 275 to the Register File 35 where it is buffered by the shared registers 110.

When the contents of the Address Table 61 are read under microcommand control, the Address Table 61 is addressed by a coded signal from the Data fan-in network 362 of the ALU unit 36 which flows by means of the signal flow path 370 to the Code Compression network 571. The Code Compression network 571 decodes the Data fan-in network 362 output signal and the decoded signal is used to address the function code Address Table 561. In the preferred embodiment, the contents of the Address Table 561 location thus referenced is checked for odd horizontal parity by the Parity Error Check network 581.

Resource Allocation Network (General)

The circuits which perform resource allocation functions of the present invention coordinate the data processing activities of the eight data processors of the preferred embodiment. Those circuits which combine to allocate the use of the shared resources to the eight data processors include circuits of the Resource Allocation network 37 (FIG. 1), the Basic Timing circuits 67, the Timing and Control networks 38, and the B/A register 111 of the shared registers 110 (FIG. 6).

The general functions of the resource allocation scheme of this invention are briefly described as follows. In general, circuits of the resource allocation scheme of this invention continuously receive signals produced by the eight data processors, each requesting according to its needs the exclusive use of the shared resource circuits for performing its individual data processing tasks. An individual data processor produces in real time such resource utilization request signals only when in actual need of the shared resources in order to efficiently continue execution of the specific data processing task it is actively executing under microcommand control. The resource allocation circuits arrange the received data processor resource utilization request signals according to a priority schedule ordered according to the specific data processing function being performed by each data processor. The priority weighted resource utilization request signals of the data processors are automatically reviewed prior to the beginning of each major cycle and the shared resource circuits are operatively connected at the beginning of each major cycle to structurally complete that specific data processor whose resource utilization request had the highest priority (refer to discussion with respect to FIG. 2).

Figure 10:
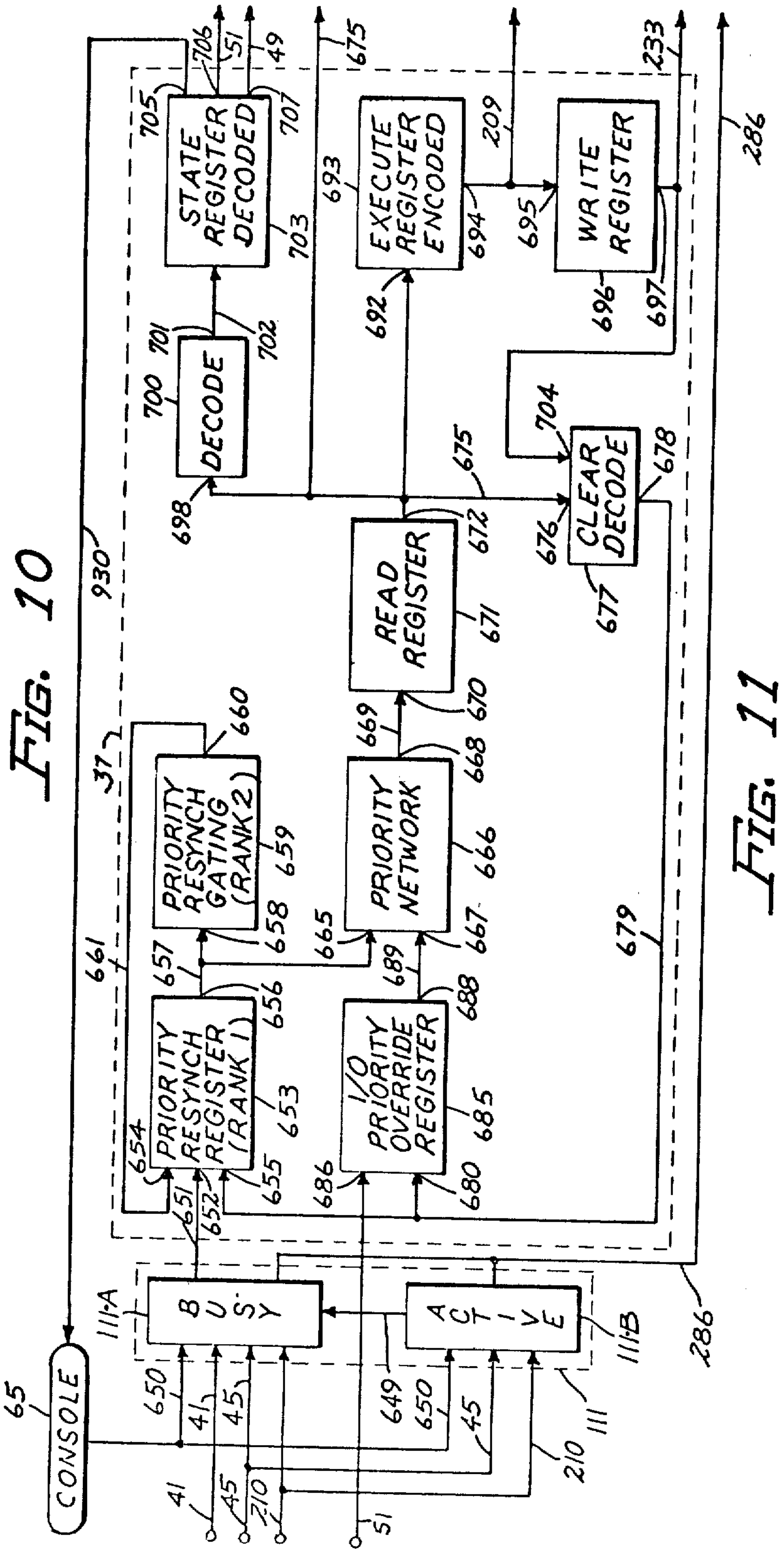
FIG. 10 is a functional schematic representation of the Resource Allocation section of the present invention as disclosed in FIG. 1.

The major functional circuits of the Resource Allocation network scheme of the present invention are diagrammatically illustrated in FIG. 10. Referring to FIG. 10, it will be noted that those circuits of the Resource Allocation network, designated as 37 in FIG. 1, have been included within a dotted line. The B/A register 111, although structurally a part of the shared registers 110, is also a basic functional element of the overall resource allocation scheme.

Referring to FIG. 10, with cross references to other figures as indicated, signal flow inputs to the B/A register 111 are generally received from the I/O section 30 by means of the signal flow path 41 (FIG. 2), from the output 404 of the ALU fan-in network 399 by means of the signal flow path 210 (FIG. 8), from the Timing and Control circuits 38 by means of the signal flow path 45, and from the Console 65 by means of a signal flow path 650. It will be noted that the signal flow path 650 is a general representation including, in FIG. 1, the signal flow path 66, circuits of the Timing and Control network 38, and the signal flow path 46.

Figure 11:
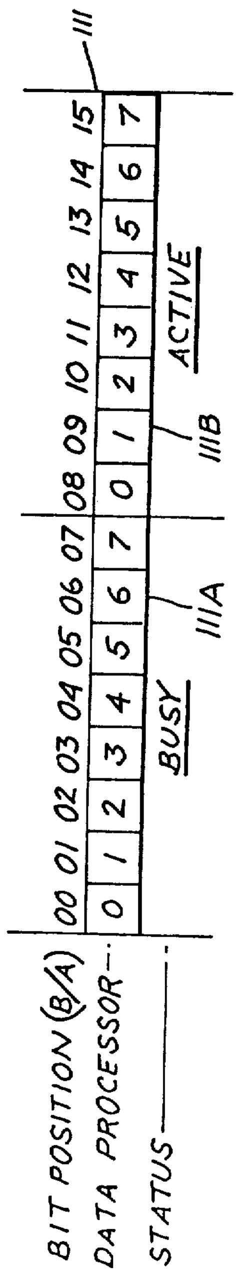
FIG. 11 is a diagrammatic illustration of the Busy/Active register of the present invention as disclosed in FIG. 10.

A more detailed diagrammatic iillustration of the B/A register 111 is shown in FIG. 11. Referring to FIG. 11, it is noted that the B/A register 111 consists of 16-bits, lettered respectively from left to right as "00" through "15". The leftmost byte (8-bits) of the B/A register 111 is termed the Busy byte 111-A of the register, and the rightmost byte of the B/A register 111 is termed the Active byte 111-B. Each of the 8-bits of the Busy 111-A and of the Active 111-B bytes of the B/A register 111 is specifically associated with one data processor of the system. As illustrated in FIG. 11, the 8 bits of each of the Busy 111-A and each of the Active 111-B bytes are in the preferred embodiment respectively consecutively dedicated to the data processors previously consecutively identified as "4" through 7 (FIG. 6). As previously employed throughout this specification, the signal flow paths (for example 41, 45, 650 and 210) are the physical conduction paths by which signals flow from one functional block to another. In the case of the B/A register 111, the termination of a signal flow path at either of the Busy 111-A or the Active 111-B bytes implies that a physical signal flow path has been established to each of the 8-bits within that particular byte. The foregoing will become more clear in the following detailed discussion concerning the operation of the B/A register 111.

As disgrammatically illustrated in FIG. 10, the signal flow path 41 from the I/O section 30 applies signal inputs to only the Busy section of the B/A register 111. The signal flow paths 45, 210 and 650, however, supply signal inputs to both the Busy 111-A and to the Active 111-B bytes of the B/A register 111, as hereinafter described. The input signals applied to the Busy byte 111-A are also conditioned by output signals from the Active byte 111-B as hereinafter described, by means of the generally designated signal flow path 649 connecting the Busy 111-A and Active 111-B bytes (FIG. 10).

Signal flow from the Busy 111-A and from the Active 111-B bytes of the B/A register 111 is provided by means of a signal flow path 286 (previously described with reference to the description of the shared registers 110 of FIG. 7) which is connected to all 16-bits of the B/A register 111. Output signals are transferred from the B/A register 111 by means of the signal flow path 286 to the Shared Register fan-in network 287 and to the Display fan-in network 290 (FIG. 7) as previously described.

Signals from the eight bits of the Busy 111-A byte of the B/A register 111 also flow by means of a signal flow path 651 to a first generally designated input 652 of a Priority Resynch register 653. The Priority Resynch register 653 further has a second input 654, a third input 655 and a signal output 656. The signal output 656 of the Priority Resynch register 653 is directly connected by means of a signal flow path 657 to an input 658 of a Priority Resynch Gating circuit 659.

The Priority Resynch Gating circuit 659 also has a signal output 660 directly connected by means of a signal flow path 661 to the second input 654 of the Priority Resynch register 653.

The signal output 656 of the Priority Resynch register 653 is also connected by means of the signal flow path 657 to a first input 665 of a Priority network 666. The Priority network 666 further has a second input 667 and a signal output 668. The signal output 668 of the Priority network 666 is directly connected by means of a signal flow path 669 to an input 670 of a Read register 671.

The Read register 671 further has a signal output 672 directly connected by means of a signal flow path 675 to a first signal input 676 of a Clear Decode functional block 677. The Clear Decode function block 677 also has a second signal input 704 and a signal output 678 directly connected by means of a signal flow path 679 to a first input 680 of an I/O Priority Override register 685. The signal flow path 679 also connects the output 678 of the Clear Decode functional block 677 to the third input 655 of the Priority Resynch register 653.

The I/O Priority Override register 685 further has a second input 686 and a signal output 688. The signal output 688 is connected by means of a signal flow path 689 to the second input 667 of the Priority network 666.

Priority request signals, as hereinafter described, are directly applied from the I/O section 30 to the second input 686 of the I/O Priority Override register 685 by means of the generally designated signal flow path 51 (FIG. 1).

The output 672 of the Read register 671 is also directly connected by means of the signal flow path 675 to an input 692 of an Execute register 693. The Execute register 693 also has a signal output 694 directly connected by means of the signal flow path 209 to an input 695 of a Write register 696. Signals from the output 694 of the Execute register 693 also flow by means of the signal flow path 209 to the first input 235 of the Address fan-in network 234 (FIG. 7).

The Write register 696 further has a signal output 697 directly connected by means of the signal flow path 233 to the first input 250 of the Address fan-in network 249 (FIG. 7) and is also connected to provide signal inputs to the second input 704 of the Clear Decode functional block 677.

The signal flow path 675 also connects the signal output 672 of the Read register 671 with the second input 251 of the Address fan-in network 249 (FIG. 7).

The signal flow path 675 also connects the output 672 of the Read register 671 with an input 698 of a Decode functional block 700. The Decode functional block 700 further has a signal output 701. Signal flow from the signal output 701 of the Decode functional block 700 is provided by means of a signal flow path 702 connected thereto and terminating at a State register functional block 703. The State register 703 further has a first signal output 705 connected by means of a signal flow path 930 to the Console 65, a second signal output 706 connected by means of the signal flow path 51 to the I/O section 30, and a third signal output 707 connected by means of the signal flow path 49 to the Register File 35.

Resource Allocation Network (Detail)

The circuits forming the functional blocks of the Resource Allocation network 37 (FIG. 10) are schematically illustrated in FIGS. 14–17.

Figure 14:
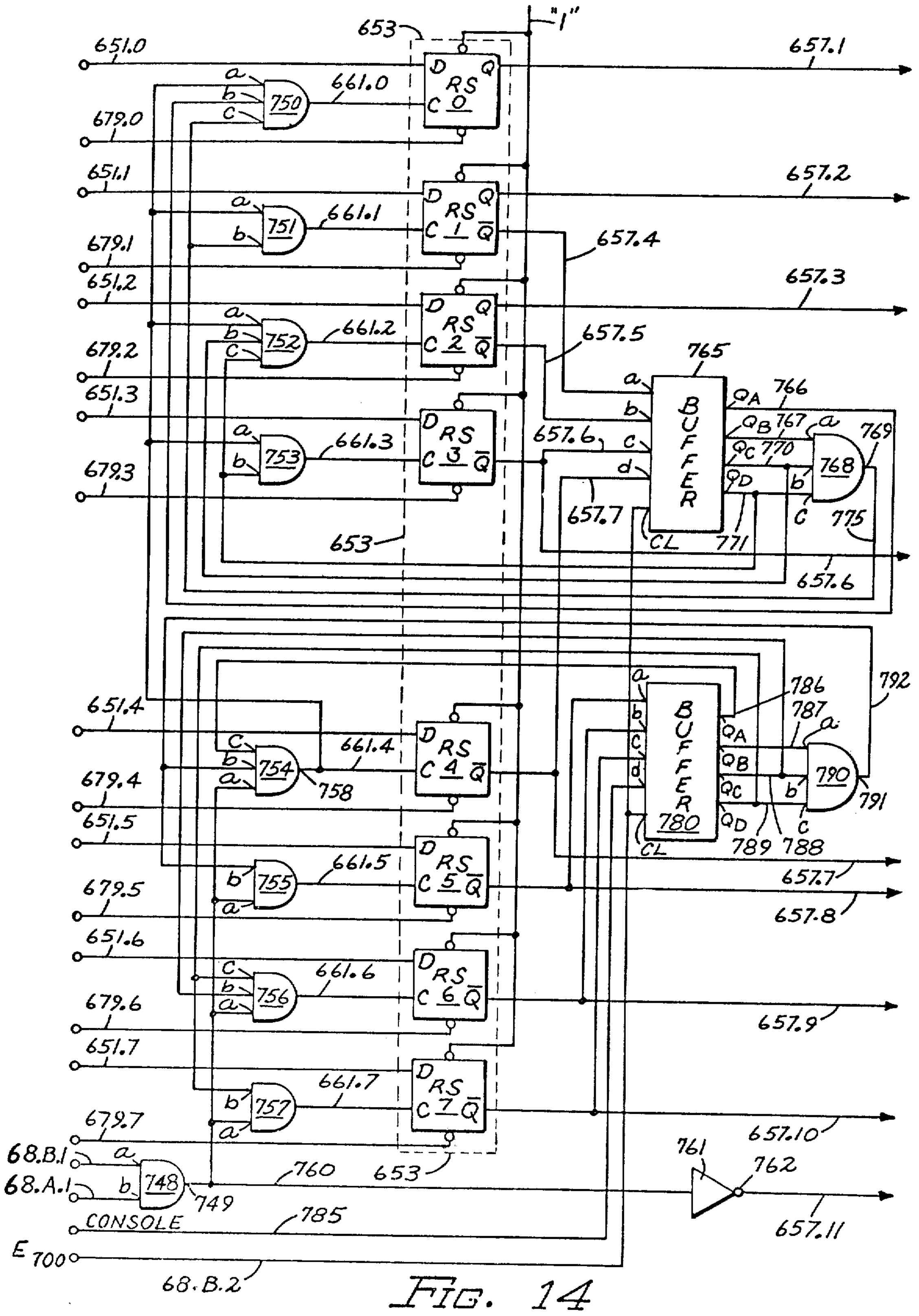
FIG. 14 is a schematic illustration of the Priority Resynch register and the Priority Resynch Gating network functional sections of the present invention as disclosed in FIG. 10.

The electrical circuits forming the priority Resynch register 653 and the Priority Resynch Gating network 659 are schematically illustrated in FIG. 14. Referring to FIG. 14, the circuits defining Priority Resynch (resynchronization) register 653 generally include eight flip-flops designated as "RS-O" through "RS-7" corresponding respectively with the data processors 0 through 7. That circuitry not included within the dashed line 653, forms the priority Resynch Gating network (659 of FIG. 10). In the preferred embodiment, the eight flip-flops of the Priority Resynch register 653 are standard D positive edge triggered flip-flops. Each flip-flop has a data input (D), a clock input (C), a pair of outputs (Q and $\overline{Q}$), a preset input (diagrammatically located at the top of the flip-flop) and a clear input (diagrammatically located at the bottom of each flip-flop).

The 00 through 07 bits of the Busy byte 111-A of the B/A register 111 are respectively connected to the data inputs (D) of the RS-O through RS-7 flip-flops by means of a plurality of conductors 651.0 through 651.7. The preset inputs of each of the RS-0 through RS-7 flip-flops are connected to a logical 1 level. It will be noted that the 651.0 through 651.7 conductors from the Busy byte 111-A of the B/A register 111 correspond to the general signal flow path 651 of FIG. 10.

The output 678 of the Clear Decode network 677 (FIG. 10) is connected by means of a plurality of conductors 679.0 through 679.7, respectively, (as hereinafter described) to the clear inputs of the RS-O through RS-7 flip-flops. Note that the plurality of conductors 679.0 through 679.7 collectively form the signal flow path 679 of FIG. 10.

It should be noted that the foregoing manner of dividing a general signal flow path into its component conductors will be employed through this specification.

To simplify the description of logical AND, NAND, OR, and NOR gates and standard electrical functional blocks throughout the specification, the inputs to such gates will be numerically referred to as "a", "b", "c", etc. where the progressive letters of the alphabet will be used to refer respectively to the first (*a*), the second (*b*), and the third (*c*), etc. inputs of the specific component referred to. Similarly, the outputs of the specific logic gates will not be numerically designated unless the output is connected to more than one point or if required for ease of circuit description. Similarly, the outputs of standard functional blocks may be denoted by an alphabetic capital letter as hereinafter described.

Referring to FIG. 14, an AND gate 748 has first and second inputs (*a*) and (*b*) respectively and a signal output 749. The first (*a*) and second (*b*) inputs of the AND gate 748 are respectively connected by means of a conductor 68.B.1 and a conductor 68.A.1 to the major cycle time $E_{100}$ and the minor cycle time $T_{60}$ signal outputs of the Basic Timing circuit 67 (FIG. 5A).

A plurality of AND gates 750 through 757 each has an output respectively connected by means of a plurality of conductors 661.0 through 661.7 to the clock (C) inputs of the RS-O through RS-7 flip-flops of the Priority Resynch register 653. Each of the AND gates 750, 752, 754 and 756 has a first (a), a second (b) and a third (*c*) input; and each of the AND gates 751, 753, 755 and 757 has a first (*a*) and a second (*b*) input. The output of the AND gate 754, designated 758, is connected by means of the conductor 661.4 to the clock input (C) of the RS-4 flip-flop and is also connected by means of the conductor 661.4 to the first inputs (*a*) of the AND gates 750, 751, 752 and 753.

The output 749 of the AND gate 748 is directly connected by means of a conductor 760 to the first inputs (*a*) of the AND gates 754, 755, 756 and 757. The output 749 of the AND gate 748 is also connected by means of the conductor 760 to an inverter 761. The inverter 761 further has an output 762 directly connected to an output conductor 657.11.

Referring to FIG. 14, the $\overline{Q}$ outputs of the RS-1, the RS-2, the RS-3 and the RS-4 flip-flops respectively are connected by means of a plurality of conductors 657.4, 657.5, 657.6 and 657.7 to a plurality of inputs (*a*) through (*d*) respectively of a first buffer network 765. The buffer network 765 is a 4-bit shift register also having a clock input (CL) and a plurality of outputs $Q_A$, $Q_B$, $Q_C$, and $Q_D$, respectively, functionally associated with the data inputs (*a*), (*b*), (*c*) and (*d*) of the buffer network 765. The clock input (CL) of the buffer network 765 is connected by means of a conductor 68.B.2 to the Basic Timing network 67 (FIG. 5A) so as to receive the major cycle timing output clock pulse appearing at $E_{700}$. The shift register 765 acts as a buffer network in a manner such that signals applied to its inputs (*a*)–(*d*) are gated in parallel into the register when its clock input (CL) is pulsed.

The $Q_A$ output of the buffer network 765 is connected by means of a conductor 766 to the second input (b) of the AND gate 750. The $Q_B$ output of the buffer network 765 is connected by means of a conductor 767 to a first input (*a*) of an AND gate 768. The AND gate 768 further has a second (*b*) and a third (*c*) input and a signal output 769.

The $Q_C$ output of the buffer network 765 is directly connected by means of a conductor 770 to the second (*b*) input of the AND gate 768, and is also directly connected by means of the conductor 770 to the second input (*b*) of the AND gate 752.

The $Q_D$ output of the buffer network 765 is directly connected by means of a conductor 771 to the third input (*c*) of the AND gate 768, and is also directly connected by means of the conductor 771 to the second input (*b*) of AND gate 753 and to the third input (*c*) of the AND gate 752. The signal output 769 of the AND gate 768 is connected by means of a conductor 775 to the second input (*b*) of the AND gate 751 and is also connected by means of the conductor 775 to the third input (*c*) of the AND gate 750.

Signal flow from the (Q) outputs of the RS-O, the RS-l and the RS-2 flip-flops of the Priority Resynch register 653 is provided, as hereinafter described, by means of a plurality of output conductors 657.1, 657.2 and 657.3, respectively connected thereto. Signal flow from the $\overline{Q}$ output of the RS-3 flip-flop is also provided, as hereinafter described, to the other circuitry by means of the conductor 657.6 connected thereto.

The $\overline{Q}$ outputs of the RS-5, the RS-6 and RS-7 flip-flops are respectively connected by means of a plurality of conductors 657.8, 657.9 and 657.10 to a first (*a*), to a second (*b*) and to a third (*c*) input of a second buffer network 780. The buffer network 780 is identical in construction and function to that of the buffer network 765 previously described. The buffer network 780 further has a fourth input (*d*), a clock input (CL), and a plurality of outputs $Q_A$, $Q_B$, $Q_C$ and $Q_D$, respectively, functionally associated with the (*a*), (*b*), (*c*) and (*d*) inputs.

The major cycle time clock pulse signal occurring at time $E_{700}$ is directly applied by means of the conductor 68.B.2 to the clock input (CL) of the buffer 780. Signal flow from the Console 65 is provided to the fourth input (d) of the buffer network 780 by means of a conductor 785 connected therebetween.

The $Q_A$ output of the buffer network 780 is directly connected by means of a conductor 786 to the third input (*c*) of the AND gate 754. The $Q_B$ output of the buffer network 780 is directly connected by means of a conductor 787 to a first input (*a*) of an AND gate 790. The AND gate 790 further has a second input (*b*), a third input (*c*) and a signal output 791.

The $Q_C$ output of the buffer network 780 is directly connected by means of a conductor 788 to the second input (*b*) of the AND gate 790, and is also connected by means of the conductor 788 to the second input (b) of the AND gate 756. The $Q_D$ output of the buffer 780 is directly connected by means of a conductor 789 to the third input (*c*) of the AND gate 790, and is also connected by means of the conductor 789 to the third input (*c*) of the AND gate 756 and to the second input (*b*) of the AND gate 757. The signal output 791 of the AND gate 790 is connected by means of a conductor 792 to the second input (*b*) of the AND gate 754 and is also connected by means of the conductor 792 to the second input (*b*) of the AND gate 755.

Signals appearing at the $\overline{Q}$ outputs of the RS-4 the RS-5, the RS-6 and RS-7 flip-flops are respectively available for transfer to other circuits within the Resource Allocation network 37, (as hereinafter described) by means of the conductors 657.7, 657.8, 657.9 and 657.10 connected respectively thereto.

Figure 15:
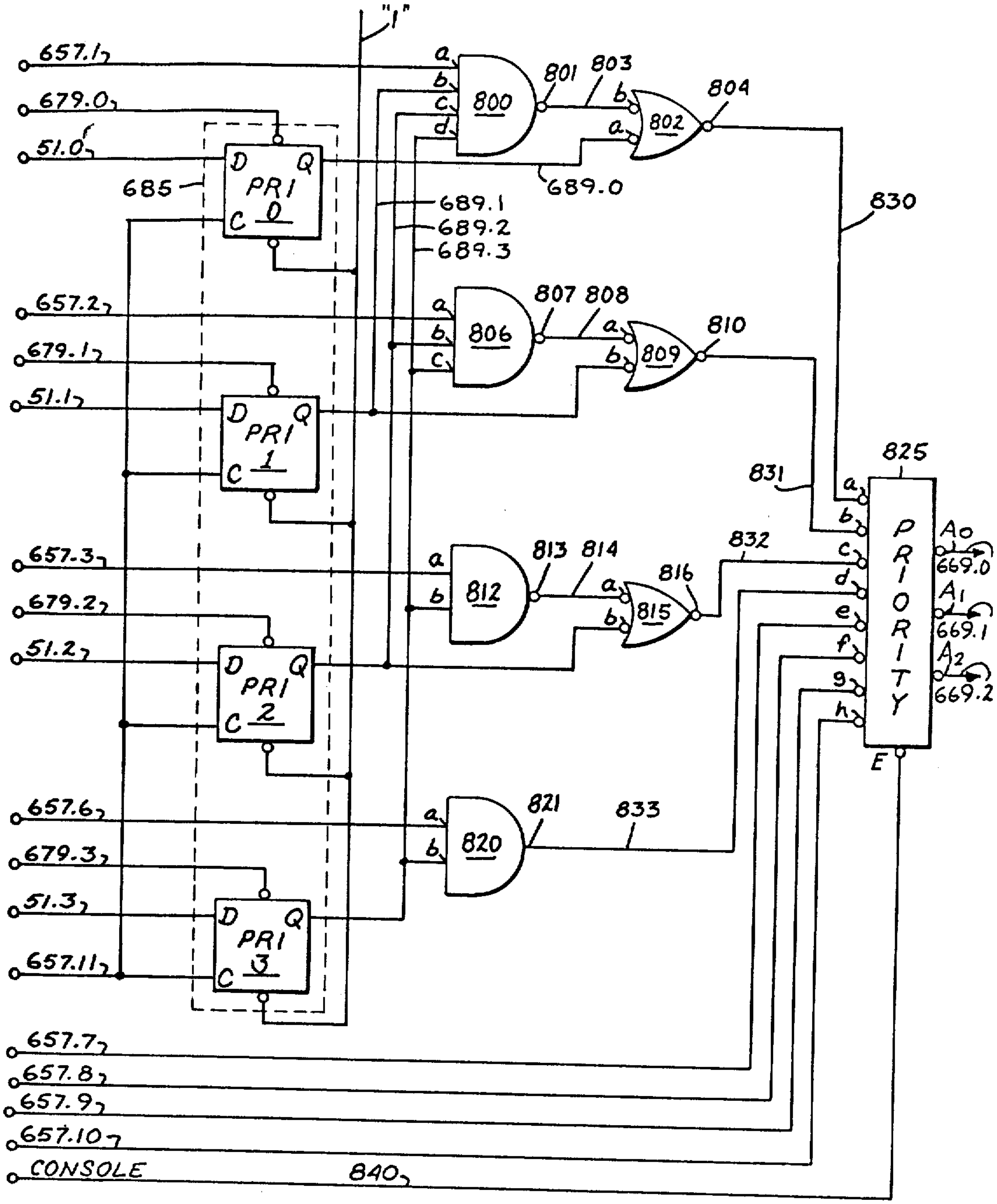
FIG. 15 is a schematic illustration of the I/O Priority Override register and the Priority Network functional sections of the present invention as disclosed in FIG. 10.

A schematic illustration of the circuits included within the I/O Priority Override register 685 and within the Priority network 666 (FIG. 10) is presented in FIG. 15. Referring to FIG. 15, the I/O Priority Override register 685 generally consists of four flip-flops designated as PRI-0, PRI-1, PRI-2 and PRI-3 all contained within the dotted line. The flip-flops of the I/O Priority Override register 685 are of the standard D-positive edge triggered-type, previously discussed with reference to the Priority Resynch circuits of FIG. 14. Each of the flip-flops of the I/O Priority Override register has a data input (D), a clock input (C), an output (Q), a preset input (diagrammatically illustrated at the top of the flip-flop) and a clear input (diagrammatically illustrated at the bottom of the flip-flop).

Priority request signals are applied to the data inputs (D) of the PRI-0, the PRI-1, the PRI-2 and the PRI-3 flip-flops from the I/O section 30 respectively by means of a plurality of conductors 51.0, 51.1, 51.2 and 51.3. The preset inputs of the PRI-O through PRI-3 flip-flops are respectively connected to the output 688 of the Clear Decode network 677 (FIG. 10) by means of the plurality of conductors 679.0, 679.1, 679.2 and 679.3. The clock inputs (C) of the PRI-0 through PRI-3 flip-flops are each connected by means of the conductor 657.11 to the output 762 of the inverter 761(FIG. 14). The clear inputs of the PRI-0 through PRI-3 flip-flops are all directly connected to a logical 1 level.

Referring to FIGS. 14 and 15, the Q output of the RS-0 flip-flop is connected by means of the conductor 657.1 to a first input (*a*) of an NAND gate 800. The NAND gate 800 further has a second input (*b*), a third input (*c*), a fourth input (*d*) and a signal output 801.

The Q outputs of the PRI-1, the PRI-2 and the PRI-3 flip-flops are respectively connected by means of a plurality of conductors 689.1, 689.2 and 689.3 to the second (*b*), the third (*c*), and the fourth (*d*) inputs of the NAND gate 800.

The Q output of the PRI-0 flip-flop is directly connected by means of a conductor 689.0 to a first input (*a*) of an AND gate 802. It will be noted that the AND gate 802 is represented in its negative logic form. The AND gate 802 further has a second input (*b*) directly connected by means of a conductor 803 to the output 801 of the NAND gate 800. The AND gate 802 further has a signal output 804.

The $\overline{Q}$ output of the RS-1 flip-flop (FIG. 14) is directly connected by means of the conductor 657.2 to a first input (*a*) of a NAND gate 806. The NAND gate 806 further has a second input (*b*), a third input (*c*) and a signal output 807. The Q outputs of the PRI-2 and the PRI-3 flip-flops are respectively directly connected by means of the conductors 689.2 and 689.3 to the second (*b*) and to the third (*c*) inputs of the NAND gate 806.

The output 807 of the NAND gate 806 is directly connected by means of a conductor 808 to a first input (*a*) of an AND gate 809. The AND gate 809 further has a second input (*b*) and a signal output 810. The Q output of the PRI-1 flip-flop is directly connected by means of the conductor 689.1 to the second input (*b*) of the AND gate 809.

The Q output of the RS-2 flip-flop (FIG. 14) is directly connected by means of the conductor 657.3 to a first input (*a*) of a NAND gate 812. The NAND gate 812 further has a second input (*b*) and a signal output 813. The Q output of the PRI-3 flip-flop is directly connected by means of the conductor 689.3 to the second input (b) of NAND gate 812.

The output 813 of the NAND gate 812 is directly connected by means of a conductor 814 to a first input (*a*) of an AND gate 815. The AND gate 815 further has a second input (*b*) and a signal output 816. The Q output of the PRI-2 flip-flop is directly connected by means of the conductor 689.2 to the second input (*b*) of the AND gate 815.

The $\overline{Q}$ output of RS-3 flip-flop (FIG. 14) is directly connected by means of the conductor 657.6 to a first input (*a*) of an AND gate 820. The AND gate 820 further has a second input (*b*) and a signal output 821. The Q output of the PRI-3 flip-flop is directly connected by means of the conductor 689.3 to the second input (*b*) of the AND gate 820.

The output 804 of the AND gate 802 is directly connected by means of a conductor 830 to a first input (*a*) of a priority circuit 825. The priority circuit 825 further has second through eighth signal inputs respectively consecutively designated as (*b*) through (*h*) inclusively, an enable input (E), and three signal outputs AO, A1 and A2. The priority network 825 is a standard 8-input priority encoder circuit which operates according to the truth table of FIG. 18 (sheet 2).

Referring to the truth table of FIG. 18, the priority network functions to assign priority to each of its inputs in a manner such that when two or more inputs are simultaneously low, the input with the highest priority is represented as a binary number at its outputs (A0, A1 and A2), such that the input (*a*) has the highest priority and the input (*h*) has the lowest priority.

The output 810 of the AND gate 809 is directly connected by means of a conductor 831 to the second input (*b*) of the priority encoder circuit 825. The output 816 of the AND gate 815 is connected by means of a conductor 832 to the third input (*c*) of the priority encoder circuit 825. The output 821 of the AND gate 820 is directly connected by means of a conductor 833 to the fourth input (*d*) of the priority encoder circuit 825.

The $\overline{Q}$ output of the RS-4, the RS-5, the RS-6 and the RS-7 flip-flops (FIG. 14) are respectively and consecutively directly connected by means of the conductors 657.7, 657.8, 657.9 and 657.10 to the (*e*), the (*f*) the (*g*) and the (*h*) inputs of the priority encoder circuit 825.

Signal flow is provided from the Console 65 to the enable (E) input of the priority encoder circuit 825 by means of a conductor 840 connected therebetween.

Signal flow from the A0, the A1 and the A2 outputs of the priority encoder circuit 825 is respectively provided, as hereinafter described, by means of a plurality of conductors 669.0, 669.1 and 669.2.

Figure 16:
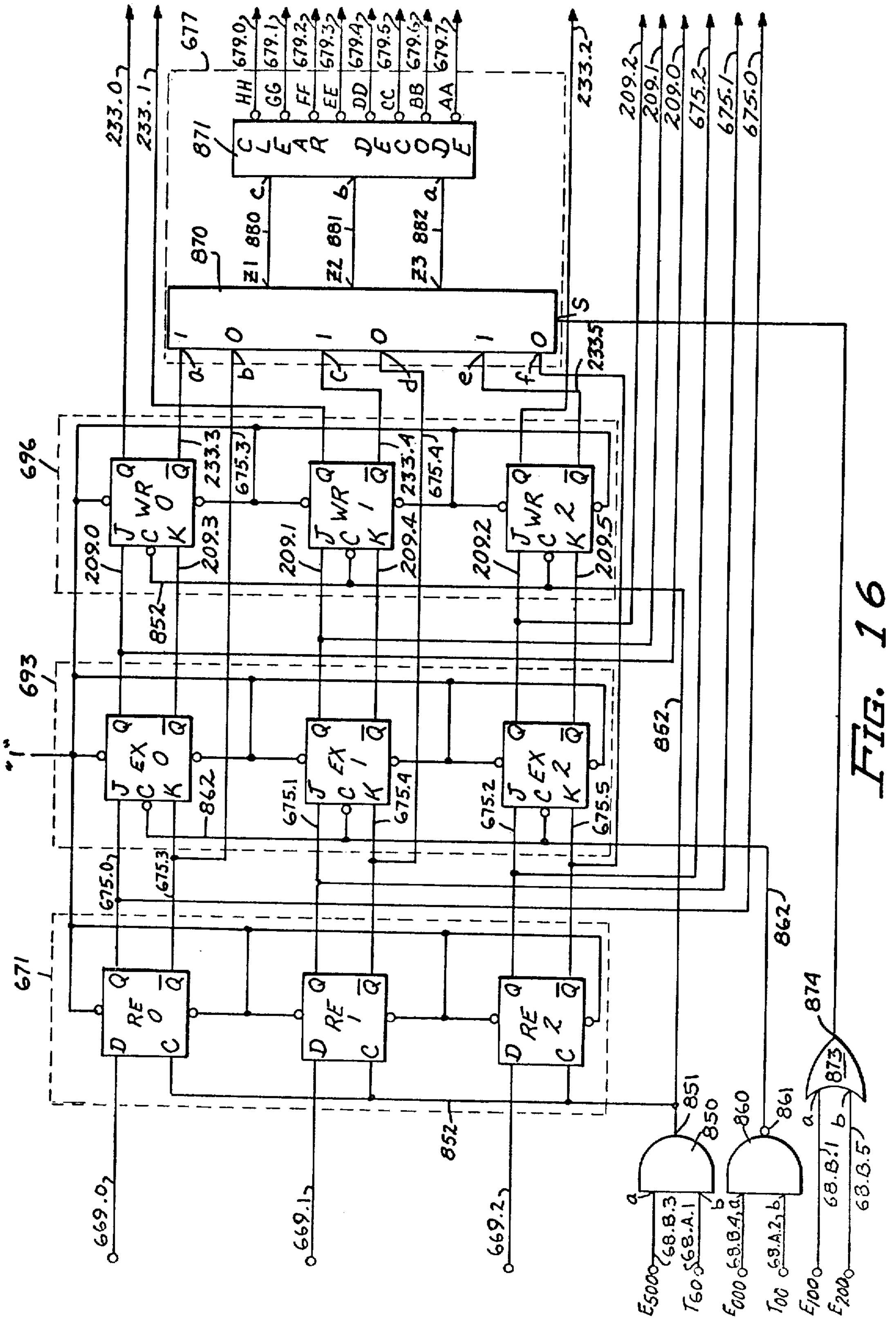
FIG. 16 is a schematic illustration of the Read, the Execute, and the Write registers and of the Clear Decode functional sections of the present invention as disclosed in FIG. 10.

The circuits included within the Read register 671, the Clear Decode network 677, the Execute register 693 and the Write register 696 are schematically illustrated in FIG. 16. Referring to FIGS. 15 and 16, three standard D-positive edge triggered flip-flops designated as RE-O, RE-1 and RE-2 form the circuit elements defining the Read register 671. The RE-O through RE-2 flip-flops each has a data input (D), a clock input (C), a Q and $\overline{Q}$ output, a preset input, and a clear input. The outputs A0, A1 and A2 of the priority circuit 825 are respectively connected by means of the conductors 669.0, 669.1 and 669.2 to the data (D) input of each of the RE-0 through RE-2 flip-flops. Each of the preset and clear inputs of the RE-0 through RE-2 flip-flops is directly connected to a logical 1 level.

Referring to FIGS. 5A and 16, the major cycle timing clock pulse signal $E_{500}$ and the minor cycle timing clock pulse signal $T_{60}$ produced by the Basic Timing circuit 67 are respectively applied by means of a conductor 68.B.3 and the conductor 68.A.1 to a first input (*a*) and to a second input (*b*) of an AND gate 850. The AND gate 850 further has an output 851 directly connected by means of a conductor 852 to the clock inputs (C) of each of the RE-0, the RE-1 and the RE-2 flip-flops.

Referring to FIG. 16, a plurality of J-K flip-flops designated as EX-0, EX-1 and EX-2 form the circuit elements defining the Execute register 693. The flip-flops of the Execute register 693 are of standard J-K negative edge triggered construction with each having a first input (J), a second input (K), a clock input (C), a pair of outputs (Q) and $\overline{Q}$, a preset input (diagrammatically illustrated at the top of each flip-flop) and a clear input (diagrammatically illustrated at the bottom of each flip-flop).

Referring to FIGS. 5A and 16, the major cycle timing clock pulse signal $E_{000}$ and the minor cycle timing clock pulse signal $T_{00}$ produced by the Basic Timing circuit 67 are respectively applied by means of a conductor 68.B.4 and a conductor 68.A.2 to a first input (*a*) and to a second input (*b*) respectively, of a NAND gate 860. The NAND gate 860 further has a signal output 861 connected by means of a conductor 862 to each of the clock inputs (C) of the EX-0 through EX-2 flip-flops. Both the preset and the clear inputs of each of the EX-0, the EX-1 and EX-2 flip-flops is directly connected to a logical 1 level.

The $\overline{Q}$ outputs of the RE-0, the RE-1 and the RE-2 flip-flops are directly respectively connected by means of a plurality of conductors 675.0, 675.1 and 675.2 to the J inputs of the EX-0, the EX-1 and the EX-2 flip-flops. The Q outputs of the RE-0 through RE-2 flip-flops are also available for connection to the network 700 as hereinafter described, and collectively provide the addressing input data to the second input 251 of the Address fan-in network 249 (FIG. 7).

The Q outputs of the RE-O, the RE-1 and the RE-2 flip-flops are respectively connected by means of a plurality of conductors 675.3, 675.4 and 675.5 to the (K) inputs of the EX-0, the EX-1 and the EX-2 flip-flops.

Referring to FIG. 16, a plurality of J-K flip-flops designated as WR-0, WR-1 and WR-2 form the circuit elements defining the Write register 696. The flip-flops of the Write register 696 are of standard J-K negative edge triggered construction, each having a (J), a (K), a clock (C), a preset, and a clear input and a Q and a $\overline{Q}$ output as previously discussed. The signal output 851 of the AND gate 850 is directly connected by means of the conductor 852 to the clock input (C) of each of the WR-O, the WR-1 and the WR-2 flip-flops. Both the preset and the clear inputs of the WR-O, the WR-1 and the WR-2 flip-flops are each directly connected to a logical 1 level.

The Q outputs of the EX-0, the EX-1 and the EX-2 flip-flops are directly respectively connected by means of a plurality of conductors 209.0, 209.1 and 209.2 to the (J) inputs respectively of the WR-0, the WR-1 and the WR-2 flip-flops, and further collectively provide the addressing input data to the first input 235 of the Address fan-in network 234 (FIG. 7). The $\overline{Q}$ outputs of the EX-0, the EX-1 and the EX-2 flip-flops are directly respectively connected by means of a plurality of conductors 209.3, 209.4 and 209.5 to the (K) inputs respectively of the WR-0, the WR-1 and the WR-2 flip-flops.

The Q outputs of the WR-0, the WR-1 and the WR-2 flip-flops are respectively collectively connected by means of a plurality of conductors 233.0, 233.1 and 233.2 to the first input 250 of the Address fan-in network 249 (FIG. 7).

Referring to FIGS. 10 and 16, the Clear Decode network 677 is schematically represented by the circuits within the dotted line of like number. The basic functional circuits combining to form the clear decode network 677 are an input multiplexer circuit 870 and a 1 of 8 decoder network 871. The input multiplexer circuit 870 has three pairs of inputs lettered as input (*a*) through (*f*) and further, has a select clock input (S) and three outputs respectively designated as Z1, Z2 and Z3. The input multiplexer circuit 870 functions upon the receipt of clock pulses at its select (S) input in the following manner. Upon receipt of a logical low level at its select (S) input, the signals applied to the (*b*), the (*d*), and the (*f*) inputs are transmitted respectively to the Z1, Z2 and Z3 signal outputs. Upon the application of a logical high signal to the select input (S), signals applied to the (*a*), the (*c*) and the (*e*) signal inputs are transmitted respectively to the Z1, Z2 and the Z3 outputs.

Referring to FIGS. 5A and 16, the major cycle timing clock pulse signals $E_{100}$ and $E_{200}$ are respectively applied by means of the conductor 68.B.1 and a conductor 68.B.5 to a first input (*a*) and to second input (*b*) of an OR gate 873. The OR gate 873 further has a signal output 874 directly connected by means of a conductor 875 to the select input (S) of the input multiplexer network 870.

The $\overline{Q}$ outputs of the WR-0, the WR-1 and the WR-2 flip-flops are respectively connected by means of a plurality of conductors 233.3, 233.4 and 233.5 to the (*a*) input, to the (*c*) input and to the (*e*) input respectively of the input multiplexer circuit 870.

The $\overline{Q}$ outputs of the RE-0, the RE-1 and the RE-2 flip-flops are directly respectively connected by means of the conductors 675.3, 675.4 and 675.5 to the (*b*) input, to the (*d*) input and to the (*f*) input respectively of the input multiplexer curcuit 870.

The Z3, Z2 and Z1 signal outputs of the input multiplexer network 870 are directly respectively connected by means of a conductor 882, a conductor 881 and a conductor 880 to a first input (*a*), to a second input (*b*), and a third input (*c*) of the 1 of 8 decoder network 871. The 1 of 8 decoder network 871 further has a plurality of outputs designated as (AA)–(HH) inclusively. The 1 of 8 decoder network 871 functions (according to the truth table of FIG. 19 [sheet 2]) to receive at its inputs (*a*) through (*c*) an encoded binary signal and to produce therefrom a logical low level at that one of its outputs (AA–HH) which corresponds to the decimal representation of the received binary number. The signal outputs (AA–HH) respectively correspond to the decimal numbers 0–7.

The signal outputs (HH) through (AA) of the 1 of 8 decoder network 871 are consecutively respectively connected by means of the conductors 679.0 through 679.7 to the signal inputs (as previously designated) of the Priority Resynch register 653 (FIG. 14) and to the signal inputs (as previously designated) of the I/O Priority Override register 685 (FIG. 15).

Figure 17:
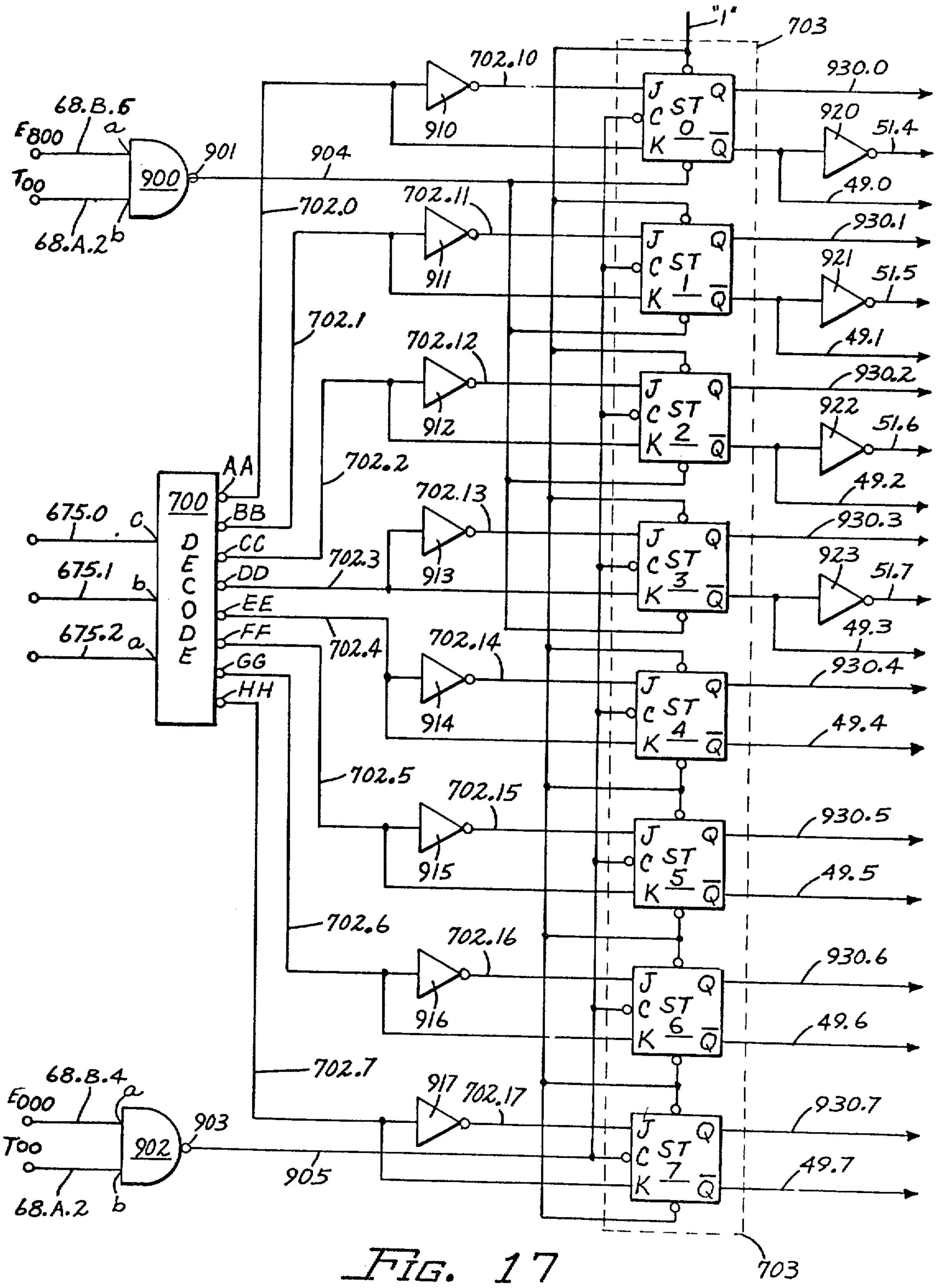
FIG. 17 is a schematic illustration of the State register and of the Decode network functional sections of the present invention as disclosed in FIG. 10.

The Decode functional block 700 and the State register network 703 of the Resource Allocation network 37 are schematically illustrated in FIG. 17. Referring to FIG. 17, the Decode functional block 700 is represented by a 1 of 8 decoder network of like numbers having three inputs (*a*), (*b*), and (*c*), and eight outputs consecutively lettered from (AA) through (HH). The 1 of 8 decoder network 700 is identical in construction and functions to the decoder network 871 as above described with respect to the clear decode network 677 (FIG. 16).

Referring to FIGS. 16 and 17, the Q outputs of the RE-O, the RE-1 and the RE-2 flip-flops of the Read register 671 are directly respectively connected by means of the conductors 675.2, 675.1 and 675.0 to the first (*a*), the second (*b*), and to the third (*c*) inputs of the 1 of 8 decode network 700.

Referring to FIGS. 5A and 17, the major cycle timing clock pulse signal $E_{800}$ and the minor cycle timing clock pulse signal $T_{00}$ produced within the Basic Timing circuit 67 are respectively applied by means of a signal flow path 68.B.6 and the signal flow path 68.A.2 to a first input (*a*) and to a second input (*b*) of a NAND gate 900. The NAND gate 900 further has a signal output 901.

The major cycle timing clock pulse signal $E_{(000)}$ and the minor cycle timing clock pulse signal $T_{(0)}$ are respectively applied by means of the signal flow path 68.B.4 and the signal flow path 68.A.2 respectively to a first input (*a*) and to a second input (*b*) of a NAND gate 902. The NAND gate 902 further has a signal output 903.

Referring to FIG. 17, there is generally shown a plurality of J-K flip-flops designated as ST-O through ST-7 inclusively, which represent the electrical elements defining the State register 703. The State register flip-flops are of the standard J-K flip-flop construction and operation as previously discussed, each flip-flop having a (J) input, a (K) input, a (Q) output, a ($\overline{Q}$) output, and clock, preset and clear inputs.

The preset inputs of each of the ST-O through ST-7 flip-flops and the clear inputs of each of the ST-4 through ST-7 flip-flops are connected to a logical 1 level. The signal output 901 of the NAND gate 900 is connected by means of a conductor 904 to the clear input of each of the ST-0 through ST-3 flip-flops. The signal output 903 of the NAND gate 902 is connected by means of a conductor 905 to the clock input of each of the ST-O through ST-7 flip-flops.

The (AA) through (HH) outputs inclusively of the 1 of 8 decoder circuit 700 are respectively consecutively connected by means of a plurality of conductors 702.0 through 702.7 inclusively, to the (K) inputs of the ST-0 through ST-7 flip-flops. The (AA) through (HH) outputs inclusively, of the 1 of 8 decoder circuit 700 are further respectively consecutively connected by means of the conductors 702.0 through 702.7, by means of a plurality of inverters 910 through 917 and by means of a plurality of conductors 702.10 through 702.17 to the (J) inputs of the ST-0 through ST-7 flip-flops.

Signal flow from the $\overline{Q}$ outputs of the ST-0 through ST-7 flip-flops is provided by means of a plurality of conductors 49.0 through 49.7 respectively connected thereto and forming part of the signal flow path 49 to the Register File 35. The Q outputs of each of the ST-0 through ST-3 flip-flops are also connected respectively by means of the 49.0, the 49.1, the 49.2 and the 49.3 conductors, by means of a plurality of inverters 920, 921, 922 and 923 and by means of a plurality of conductors 51.4, 51.5, 51.6 and 51.7 to the I/O section 30.

The Q outputs of the ST-0 through ST-7 flip-flops are respectively connected by means of a plurality of conductors 930.0 through 930.7 inclusively to visual display facilities within the Console 65.

OPERATION OF THE PREFERRED EMBODIMENT

As illustrated in FIG. 2 and as described with reference to the partitioning of the dedicated registers 112 of the Register File 35 (FIG. 6), the data processing system of the preferred embodiment contains eight data processors (0 – 7). Each data processor is configured so as to perform a specific type of data processing task. Data processors 0 – 3 in general perform those tasks requiring I/O operations as illustrated by their respective functional connections to the I/O section 30 in FIG. 2. In particular, data processors 0 – 2 perform I/O tasks related to communication with such peripheral devices 34 as keyboard printers, multiplexed communication channels, card readers, line printers, punches and the like. Data processor 3 performs I/O tasks which require communication with disc peripheral devices 34. Data process 4 functions as an Executive processor to coordinate operations of the other data processors in the execution of their respective tasks. Data processors 5 – 7 are general purpose processors adapted to suit a specific user's needs. It will be understood that any number of data processors could have been employed within the spirit and intent of this invention, and further, that the specific task assignment to individual data processors is also a matter of design discretion.

Resource Allocation - General

The Resource Allocation network 37 is the decision headquarters at which data processing functions performed by the data processors are coordinated. Since each of the data processors within the system depends for its existence upon the exclusive use of a single set of common resource networks (in particular for access to the Main Storage memory 32 and for use of the networks within the ALU 36), and since economics require that each data processor expeditiously performs its associated data processing task, the Resource Allocation Network 37 must necessarily perform its functions at extremely high rates of speed while remaining completely responsive to the common resource utilization needs of individual data processors. The Resource Allocation network 37 of this invention is completely responsive not only to the common resource utilization requirements of the data processor circuitry internal to the main frame of the data processing system, but is also responsive to the real time common resource utilization requirements of peripheral I/O sources 34 which arise during I/O operations requiring the transfer of data to and from the main frame system. The Resource Allocation network 37, by continuously sensing in real time the common resource utilization requirements throughout the data processing system, and by automatically (under hardware control) assigning the use of the common resources to the data processors based upon high speed priority determinations, enables the individual data processors of the system and individual peripheral sources 34 to appear simultaneously and autonomously operative. In fact, except for that time interrelationship which exists between individual data processors due to their sharing in time of common resource networks, and except for the Executive processor' s operations as hereinafter described, the individual data processors are autonomously operative with respect to each other in performing their associated data processing functions. The Executive processor (data processor 4), through the nature of its assigned task (to coordinate the task execution of the other data processors of the system), is, by its very nature, task related to all of the other data processors of the system. The Executive processor, for example, has the capability to stop the further task execution of any data processor upon discovering a multitude of parity errors which were generated in that data processor's task execution. To this extent, therefore, none of the data processors 0–3 and 5–7 is autonomously operative with respect to data processor 4.

(Busy/Active Register Operation)

Referring, therefore, in general to FIGS. 10–17, with specific references to individual figures as herein noted, a brief description of the operation of the Resource Allocation network 37 and the B/A register 111 follows. The Busy 111-A and Active 111-B bytes (FIG. 11) are combined to form a single B/A register 111 with the Busy byte 111-A comprising the first 8 bits (00–07) and the Active byte 111-B comprising the second 8 bits (08–15) of the register. A byte is 8 bits; and is the smallest addressable unit of storage in the Main Storage memory 32. In general, the status of the Busy byte 111-A indicates those data processors which are requesting utilization of the common resource networks. As previously discussed, each of the 8 bits of the Busy byte 111-A corresponds toa specific data processor with the first bit (00) corresponding to data processor 0, the second bit (01) corresponding to data processor 1, etc. as illustrated in FIG. 11. A Set (logical 1) bit within the Busy byte 111-A signifies that the corresponding data processor is requesting a memory cycle or use of the common resources. The 8 bits (08 – 15) of the Active byte 111-B are also respectively associated with the data processors 0 through 7 (FIG. 11). The logical status fo each bit of the Active byte 111-B is used to condition the logical status of the corresponding bit within the Busy byte 111-A. In general, the Active byte 111-B indicates which of the data processors are engaged in performing I/O operations.

The individual bits of the Active byte 111-B are set by signals from the ALU 36 received by means of the signal flow path 210 (FIG. 10). Whenever a data processor begins an I/O operation, the particular bit within the Active byte 111-B associated with that data processor is set under microcommand control. When the I/O operation being performed by that data processor has been completed, the respective associated bit within the Active byte 111-B is cleared under microcommand control. The Active byte 111-b, therefore, insures that an I/O operation initiated by (0 – 7). data processor is completed before that data processor can begin another I/O operation. The bits (08–15) of the Active byte 111B are clocked once each minor cycle at the minor cycle phase time $T_{80}$ (FIG. 4B).

The logical status of bits within the Busy byte 111-A is generally determined by signals from the ALU 36 applied to each bit of the Busy byte 111-A by means of the signal flow path 210 (FIG. 10). When a specific data processor, in execution of its data processing task, requires a memory cycle or other (exclusive) use of the common resource networks, the program being executed by the Active data processor generates a resource utilization request signal which is transferred by means of the ALU 36 and the signal flow path 210 to set the bit of the Busy byte 111-A corresponding to that data processor. The signals thus applied to the Busy byte 111-A by means of the signal flow path 210 are further conditioned on a bit-by-bit basis (not shown in the figures) by the state of individual bits of the Active byte 111-B as follows:

For the (00) and the (04) bit positions of the Busy byte 111-A, the Busy bits cannot change from the set to the clear state under microcommand control during any minor cycle in which the associated bit of the Active byte 111-B (08 or 12) appears in the set state.

For the bit positions (01), (02), and (03) of the Busy byte 111-A, the specific Busy bit cannot change from the clear to the set state under microcommand control during any minor cycle in which the associated bit (respectively (09), (10) and (11)) of the Active Byte 111-B appears in the set state.

The set signals applied to the Busy byte 111-A by means of the signal flow path 210 and as conditioned by the Active byte 111-B as described are clocked into the Busy byte 111-A once each minor cycle at the minor cycle phase time $T_{80}$ (FIG. 4B).

Set input signals to the (00), the (01), and (02) and the (03) bit positions of the Busy byte 111-A are also provided from the I/O section 30 by means of the signal flow path 41. The set signals thus applied by the signal flow path 41 originate within control logic (not illustrated) within the I/O section 30 and occur in response to the ability of the external sources 34 to transmit or to receive digital information to and from the main frame system. For example, when a data loading adapter circuit within the I/O section 30 has accumulated 16 bits of data from a card reader or the like, which is immediately thereafter available for strobing into the Central Processor unit 31, the control logic within the I/O section 30 will provide a set input signal by means of the signal flow path 41 to the appropriate bit position of the Busy byte 111-A corresponding to the data processor (0–3) which is awaiting the particular accumulated digital data. The set signals applied to the Busy byte 111-A by means of the signal flow path 41 are conditioned (not shown) to the extent that any signal applied by means of the signal flow path 41 to the Busy Byte 111-A is inhibited from reaching the Busy byte 111-A during the minor cycles $E_6$ and $E_7$; otherwise, the set signals applied by means of the signal flow path 41 may occur at any time as they are generated.

In addition to the set input signals applied to the Busy byte 111-A by means of the signal flow paths 210 and 41, (FIG. 10), in the preferred embodiment, set signals may be directly applied to all 16 bits of the B/A register 111 by means of the signal flow path 650 from the Console 65. The setting of the bits of the B/A register 111 under Console control is a special purpose function which may be utilized for visual display purposes, maintenance and the like, and will not be discussed with respect to this invention.

The bit position (04) of the Busy byte 111-A (which represents the Executive data processor) is also provided with a special set input signal (not specifically shown in the Figures) from the Console 65 by means of the signal flow path 650 for purposes of setting the Executive processor's busy bit (04 of the B/A register 111) to initiate data processing functions upon start-up of the data processing system.

Clear input signals are applied to the bit positions (05), (06) and (07) of the Busy byte 111-A of the timing and control section 38 by means of the signal flow path 45 at the beginning of minor cycle $E_4$ provided that the corresponding bit position (13, 14 and 15 respectively) of the Active byte 111-B is in the clear state. Clear input signals are applied to the bit positions (00), (01), (02), (03), and (04) of the Busy byte 111-A by means of the signal flow path 10 from the ALU 36; these clear signals are initiated by the execution of specific microcommands by the associated data processor and are operative to clear a particular bit of the Busy byte 111-A provided that the associated bit (08-12) of the Active byte 111-B is in a cleared state.

The effect of the set and clear input signals applied to the bits of the Busy byte 111-A as above described is as follows. The bits (05-07) of the Busy byte 111A (representing data processors 5, 6 and 7) can be set only by program execution by the Executive data processor 4. However, the bits (05–07) of the Busy byte 111-A can be cleared either by program command from the Executive processor 4 or by command of the program being executed by the respective data processor 5, 6 or 7. The bit positions (00–03) of the Busy byte 111-A, corresponding to those data processors which perform I/O operations, can be set by either program command, by the Executive processor 4 or by input set signals from the I/O sources 34 used by these data processors, as previously described. The bit positions (00–03) of the Busy byte 111-A can be cleared under program command from either the Executive processor 4 or from the specific program being executed by the data processors 0–3. Normally that program being executed by the specific data processor will clear the busy bit position associated with that data processor.

Resource Allocation Network - Operation

Figure 13A:
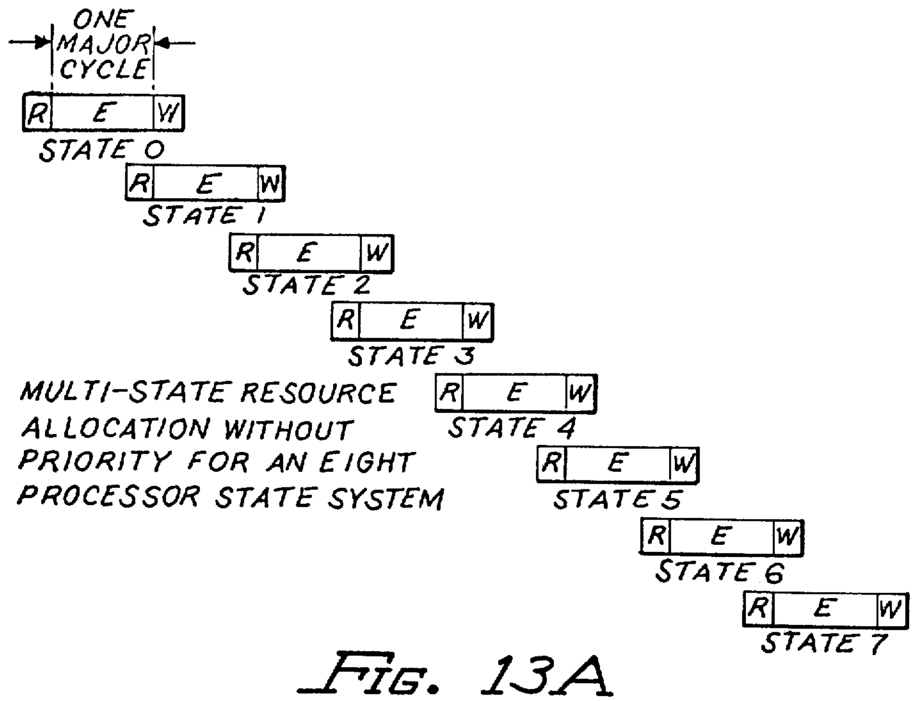
FIG. 13A is a diagrammatic timing representation illustrating the sequential activation timing schedule for data processors of the preferred embodiment of the present invention when data processor priority requests are not considered.

As previously discussed, the multi-processor data processing system of the preferred embodiment contains eight unique data processors each independently capable of requesting according to its task execution needs, the exclusive use of the shared (common) resource circuits. The Resource Allocation network 37 basically assigns the use of (allocates) the shared resources to the eight data processors in a manner so as to insure that each requesting data processor receives its fair share of the use of the shared resources. Disregarding for the moment override priority considerations of individual data processors, in a situation wherein each of the eight data processors is requesting resource utilization time (as indicated by the set condition of the eight bits of the Busy byte 111-A), the Resource Allocation network 37 would sequentially assign major cycles to the data processors 0 through 7 in the manner illustrated in FIG. 13A. Referring to FIG. 13A, it will be noted that without priority override considerations, a data processor cannot receive more than one major cycle (time slice) of use of the shared resources before each of the other similarly requesting data processors has also been assigned a time slice. This phenomenon was also conceptually illustrated with respect to task execution by the system as illustrated in FIG. 3. It will be noted in FIG. 13A that each major cycle is preceded by a segment of time designated as "R" and is immediately followed by a time segment designated as "W". The R and the W time segments are respectively dedicated to reading and writing operations associated with the execution of microcommand instructions within the particular major cycle to which they are adjacent. The R and the W time periods will be hereinafter discussed in more detail.

The aforementioned sequential assignment of time slices to the respective requesting data processors (without regard to override priority) is basically performed by the circuits of the Priority Resynch register 653 and of the Priority Resynch Gating network 659 (FIGS. 10 and 14). With reference thereto, in general, the Priority Resynch register 653 consists of eight flip-flops (RS-0 through RS-7) whose data inputs (D) are respectively activated by the bit positions (00 through 07) of the Busy byte 111-A by means of the conductors 651.0–651.7. The AND gates 748, 750–757, 768 and 790, the buffer networks 765 and 780 and the associated interconnections thereamong form the circuits of the Priority Resynch Gating network 659. The circuits of the Priority Resynch Gating network 659 generally provide the input clocking signals to the RS-0 through RS-7 flip-flops.

The circuits of the Priority Resynch Gating network 659 enable clocking of the RS-0 through RS-7 flip-flops in a manner analogous to the taking of "snapshots" of the Busy byte 111-A. The "snapshot" terminology herein employed is identical in scope and intent to that used with reference to the description of general task execution within the system (FIG. 2). The following discussion describes the mechanics involved in taking snapshots and employing the results thereof.

At any one snapshot point in time the logical status of the bits of the Busy byte 111-A are transferred to the data inputs (D) of the flip-flops (RS-0 through RS-7) of the Priority Resynch register 653. The bits (outputs of the RS-0 through RS-7 flip-flops) of the Priority Resynch register 653 are thereafter scanned (as hereinafter described) for a set condition, in a sequential manner beginning with the output of the RS-0 flip-flop and proceeding to the output for the RS-7 flip-flop. When a set condition is detected, a major cycle (time slice) is assigned to the data processor corresponding to that flip-flop of the Priority Resynch register 653. That particular flip-flop of the Priority Resynch register 653 is then cleared, and the scanning operation is continued to determine the assignment of the next time slice. After the foregoing scanning operation has proceeded to the bit position corresponding to the RS-7 flip-flop, another snapshot is taken of the Busy byte 111-A by clocking the logical status of the bits of the Busy byte into the Priority Resynch register 653.

Referring to FIG. 14, the Priority Resynch register 653 flip-flops RS-4 through RS-7 are clocked at $E_{160}$ time as conditioned by the AND gates 754 through 757 respectively. Similarly, the RS-0 through RS-3 flip-flops are clocked at $E_{160}$ time plus the delay time associated with signal transmission through the AND gate 754, and as further conditioned by and AND gates 750 through 753. Therefore, generally speaking, if the non-clocking inputs of the AND gates 750 through 757 are at a logical high level, the RS-0 through RS-7 flip-flops will be clocked approximately at $E_{160}$ time. The situation as above described would occur at that period of time previously described as a snapshot time. Immediately following the foregoing clocking operation, the bits (as represented by the outputs of RS-0 through RS-7) of the Priority Resynch register 653 are identical to that condition at which the corresponding bits of the Busy byte 111-A were, at the $E_{160}$ time. It will be recalled that the status of the bits of the Busy byte 111-A are updated once each minor cycle $T_{80}$ phase time.

Following the initial snapshot clocking of the Priority Resynch register 653 flip-flops, further clocking of the RS-0 through RS-7 flip-flops once each major cycle, approximately at the $E_{160}$ time, will be inhibited according to the logical input status of the AND gates 750–757. The logical status of the inputs of each of the AND gates 750–757, other than the clock input to each gate, is provided by the buffer networks 765 and 780.

As previously described, the buffer networks 765 and 780 are 4-bit shift registers which function as buffer chips to transfer in parallel, signals applied to their inputs (*a–d*) respectively to their outputs ($Q_A$-$Q_D$) whenever pulsed at their respective clock inputs (CL). The buffered circuits 765 and 780 are clocked at every $E_{700}$ time by means of the signal flow path 68.B.2. The logical levels of the $\overline{Q}$ outputs of the RS-1 through RS-4 flip-flops respectively, are therefore clocked at every $E_{700}$ time to the outputs $Q_A$ through $Q_D$ of the buffer networks 765. Similarly, the status of the $\overline{Q}$ outputs of the RS-5 through RS-7 flip-flops are clocked at $E_{700}$ time to the $Q_A$ through $Q_C$ outputs of the buffer network 780. A signal input from the Console 65, applied by means of the conductor 785 to the (*d*) input of the buffer network 780, is clocked to the $Q_D$ output of the buffer network 780 at $E_{700}$ time; this signal normally appears at a logical high. The signal outputs $Q_A$ through $Q_D$ of each of the buffer networks 765 and 780 form as connected thereto, the non-clocking inputs to the AND gates 750–757.

The following example will illustrate the operation of the Priority Resynch register 653 and of the Priority Resynch Gating network 659. Assuming that each of the RS-0 through RS-7 flip-flops is in a logically cleared state, and that the console signal input applied by means of the conductor 785 is at a logical high, all of the inputs (*a–d*) of each of the buffer networks 765 and 780 will appear at a logical high level. At the next $E_{700}$ time, the logical high status appearing at the respective inputs (*a–d*) of the buffer networks 765 and 780 will be clocked by means of their respective outputs ($Q_A$-$Q_D$), by means of the associated conductors connected thereto and by means of the AND gates 768 and 790 to the appropriate (*b*) and (*c*) signal inputs of the AND gates 750 through 757. At the next $E_{160}$ time, a clock pulse appearing at the signal output 749 of the AND gate 748 will enable by means of the conductor 760, the AND gates 754-757 thus providing clocking signal inputs to the RS-4 through RS-7 flip-flops. When enabled, the AND gate 754 will also provide a clocking enable, signal by means of the conductor 661.4 to the AND gates 750 through 753 which will thereafter respectively provide clocking signal inputs to the RS-0 through RS-3 flip-flops. Thus, at $E_{160}$ time, the logical status of the bits of the Busy-byte 111-A will be clocked by means of the conductors 651.0 – 651.7 and the data inputs (D) respectively into the RS-0 through RS-7 flip-flops.

Assuming, for illustration purposes, that only the 00–03 bit positions of the Busy byte 111-A were set, immediately following the $E_{160}$ time clocking of the Priority Resynch register 653, only the RS-0 through RS-3 flip-flops would be set, and the RS-4 through RS-7 flip-flops would remain in a cleared state. Therefore, the (*d*) signal input to the buffer network 765 and all of the signal inputs (*a*) through (*d*) of the buffer network 780 would remain at a logical high, but the signal inputs applied to the (*a*) through (*c*) inputs of the buffer network 765 would appear at a logical low. As a result, at the next succeeding $E_{700}$ time, a clock pulse applied to the clock inputs (CL) of the buffer networks 765 and 780, will cause the logical low levels applied to the (*a*) through (*c*) inputs of the buffer network 765 to be transmitted by means of its $Q_A$, $Q_B$ and $Q_C$ outputs, the associated conductors connected thereto and the AND gate 768 and associated conductor 775, to inhibit the further clocking of the AND gate 750, 751 and 752. Based only on the foregoing description, the Priority network 666, hereinafter described, will assign the next time slice period to data processor 0 and will effect a clearing of RS-0 flip-flop by means of a clear signal applied by the conductor 679.0. Therefore, at the next $E_{160}$ time, the clock input (C) of the RS-0 flip-flop will be inhibited. In like manner, the next time slice will be awarded to data processor 1, and at the succeeding $E_{160}$ time, the clock inputs of both the RS-0 and RS-1 flip-flops will be inhibited. It will be noted, however, that "lower order" (RS-0 being of highest order and RS-7 being of lowest order), Priority Resynch register 653 flip-flops are not disabled during successive $E_{160}$ time clocking periods; it is only important to disable those flip-flops of the Priority Resynch register 653 which correspond to a data processor which has previously received a time slice following the initial snapshot transfer of information from the Busy byte 111-A.

The sequence of events in the preceding example will repetitively occur once each major cycle until each of those data processors requesting utilization time of the shared resources have been serviced as determined by the set condition of the appropriate flip-flop of the Priority Resynch register 653. After each of the requesting data processors have been serviced (by sequentially assigning it a time slice according to its order) the status of each of the outputs ($Q_A$-$Q_D$) of the buffer networks 765 and 780 will appear at a logical high level which will result in the enabling of each of the AND gates 750–757, and will thus allow another snapshot of the Busy byte 111-A by means of the next occurring $E_{160}$ time clock pulse.

From the foregoing, it will be readily noted that in the preferred embodiment the time period between successive snapshots taken by the Priority Resynch register 653 and by the Priority Resynch Gating network 659 is variable between two (since a single data processor cannot receive two consecutive time slices) and eight major cycles.

Priority decisions regarding the allocation of time slices to the data processors, other than the basic sequential resource allocation provided by the Priority Resynch register 653 and the Priority Resynch Gating network 659, are performed by means of the circuitry illustrated in FIG. 15. Referring to FIGS. 11, 14 and 15, signal outputs from the RS-0, the RS-1, the RS-2 and the RS-3 flip-flops are respectively applied by means of the conductors 657.1, 657.2, 657.3 and 657.6 to the signal conditioning input logic (the NAND gates 800, 806 and 812 and the AND gate 820) of the Priority network 666. In addition, the signal outputs of the RS-4 through RS-7 flip-flops are respectively applied by means of the conductors 657.7 through 657.10 directly to the inputs (e) through (h) of the priority encoder circuit 825. The priority encoder circuit 825 and its associated input signal conditioning logic determines the priority to be assigned to the resource utilization requests by the individual data processors. In the preferred embodiment, only the data processors 0 through 3 have a priority override capability. Priority override capability as used herein refers to the potential of a lower order data processor that is initiating a resource utilization request to the Resource Allocation network 37 by means of the I/O hardware associated therewith, to (override) the normally submitted request of a higher order data processor.

Priority override requests by the data processors 0 through 3 are respectively applied to the four flip-flops (FIG. 15) of the I/O Priority Override register 685. The priority override requests are applied to the data (D) inputs of the PRI-0 through PRI-3 flip-flops respectively by means of the conductors 51.0 through 51.3. The override request signals originate within the I/O section 30, and in the preferred embodiment are logical low signals which will clear the flip-flops of the I/O Priority register 685 when clocked into that register. The PRI-O through PRI-3 flip-flops are clocked by means of the conductor 657.11 by clock pulses applied to their clock inputs (C) each major cycle at time $E_{160}$. Therefore, when one or more of the PRI-O through PRI-3 flip-flops appear in a cleared state, the associated data processor's I/O circuits have initiated a priority override request condition for those data processors. The PRI-0 through PRI-3 flip-flops are set from the Clear Decode functional block 677 respectively by means of the conductors 679.0 through 679.3. It will be noted that a set condition of all four bits of the I/O Priority Override register represents the normal condition occurring in the absence of any I/O priority override requests.

Referring to FIG. 15, the NAND gates 800, 806 and 812 and the AND gate 820 in conjunction with the AND gates 802, 809 and 815 (illustrated in negative logic form) determine the priority considerations to be given to I/O priority override request signals from the I/O Priority Override register 685. In the absence of any priority override request signals applied to the I/O Priority Override register 685, the NAND gate 800 upon receipt of a priority request signal at its (a) input from the Priority Resynch register 653 will produce a logical low signal at its output 801, thereby also causing a logical low to appear at the output 804 of the AND gate 802. A similar occurrence will result with respect to operation of the NAND gates 806 and 812. Since the (a) input of the AND gate 820 is connected to the $\overline{Q}$ output of the RS-3 flip-flop of the Priority Resynch register 653, a normal request for priority by the data processor 3 will result in a logical low level being applied to the (a) input of the AND gate 820 and will cause its output 821 to similarly appear at a logical low level. Since the conductors 657.7 through 657.10 are similarly connected to the $\overline{Q}$ outputs of the RS-4 through RS-7 flip-flops of the Priority Resynch register 653, a normal request for priority from each of the data processors associated with these flip-flops will result in logical low levels being respectively applied to the (*e*) through (*h*) inputs of the priority encoder circuit 825.

As previously described, and with reference to the truth table of FIG. 18, the priority encoder circuit 825 functions in response to logically low input levels, and assigns priority to simultaneously received low inputs in a manner such that the (*a*) input receives the highest priority and the (*h*) receives the lowest priority. Therefore, if all eight of the data processors were simultaneously requesting priority in the normal fashion (i.e., without priority override requests), all eight inputs (*a*) through (*h*) of the priority encoder network 825 would appear at a logical low level, and the priority encoder circuit 825 would thereafter function to encode at its signal outputs (A0 through A2) the encoded binary signal representation of the (*a*) input (refer to FIG. 18). However, when an I/O priority override request signal is received by one of the lower order flip-flops of the I/O Priority Override register 685 (in the absence of the I/O priority override request signals by higher order flip-flops), the higher order input signals applied to the priority encoder circuit 825 will appear at a logical high level, thus enabling the priority encoder circuit 825 to assign priority to the lower order data processor whose associated I/O circuit initiated that override request.

For example, if the I/O circuitry associated with data processor 2 initiates an I/O ovoerride request signal to the PRI-2 flip-flop, the Q output of the PRI-2 flip-flop will appear at a logical low level. The logical low at the Q output of the PRI-2 flip-flop will cause the output 816 of the AND gate 815 to appear at a logical low level, thus providing a logical low signal to the (*c*) input of the priority encoder circuit 825. The Q output of the PRI-2 flip-flop will simultaneously cause the outputs 801 and 807 of the NAND gates 800 and 806 respectively to appear at logical high levels. Since I/O priority override request signals have not been applied to the PRI-0 and the PRI-1 flip-flops, their respective Q outputs will appear at logical high levels resulting in the AND gates 802 and 809 both being enabled and thus providing logical high input signals to the (*a*) and to the (*b*) inputs of the priority encoder circuit 825. The priority encoder circuit 825 is therefore enabled to assign priority in response to the low signal applied to its input (*c*) since that input now represents the highest order input on which there appears a logical low level.

By providing priority override requests to the I/O Priority Override register 685, the I/O peripheral devices (34) by means of the I/O section 30 can directly communicate to the Central Processor unit 31 the fact that the associated processor should be serviced (supplied a time slice) in order to avoid either losing data or to avoid using the peripheral device inefficiently.

Figure 13B:
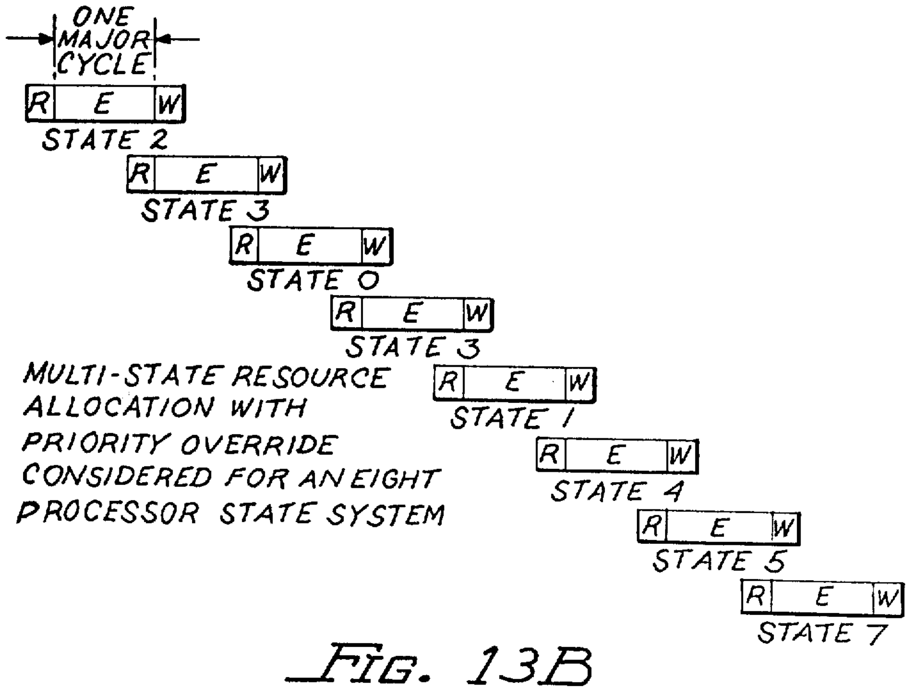
FIG. 13B is a diagrammatic timing representation illustrating a sequential activation timing schedule for the data processors of a preferred embodiment of the present invention when a typical priority override request sequence has been initiated.

An example of time slice allocation of the common resource circuits by the Resource Allocation network 37 when priority override requests by the data processors are considered is illustrated in FIG. 13B. FIG. 13B illustrates the allocation of common resources to the data processors after a typical snapshot by the Priority Resynch register 653 and Priority Resynch Gating network 659 circuits according to the following common resource utilization request schedule of the data processors. The bit positions (00 through 05, and 07) of the Busy byte 111-A were set when the snapshot was taken, indicating that the data processors 0 through 5 and 7 were requesting time slices. In addition, priority override request signals were initiated by data processors 2 and 3, thus clearing the PRI-2 and PRI-3 flip-flops of the I/O Priority Override register 685 (FIG. 15). The priority override requests were such that data processor 2 only required one time slice, whereas data processor 3 required two time slices to complete their respective subtasks.

According to the above example resource utilization request schedule, time slices will be awarded as follows. Since priority override requests are present for both data processors 2 and 3, the Priority network 666 will inhibit the request signals (FIG. 15) for data processors 0 and 1; the priority encoder circuit 825 will thus assign the first time slice to data processor 2. Similarly, the second time slice will be awarded to data processor 3. However, upon receiving a time slice, the PRI-3 flip-flop (for data processor 3) will be "set" for the next time slice period (as previously described), thus disabling its priority override request signal and allowing the priority encoder circuit 825 to award the third time slice to data processor 0 (the highest order requesting data processor). After the third time slice has been awarded the priority override request signal of data processor 3 will again be enabled, allowing data processor 3 to be awarded the fourth time slice. Thereafter, since there are no data processors which are invoking priority override requests, the priority encoder circuit 825 will consecutively award time slices to the remaining requesting data processors according to their numerical order until all of the requesting data processors have been serviced, see FIG. 13B.

Referring to FIGS. 10, 15 and 16, the signals appearing at the A0 through A2 signal outputs of the priority encoder network 825 are respectively applied by means of the conductors 669.0 through 669.2 to the data inputs (D) of the Read register 671 flip-flops (RE-0 through RE-2). The Read register 671, therefore, receives the encoded output signal of the priority encoder circuit 825 identifying that data processor (by its respective data processor number 0 through 7 encoded in inverted binary) which received the last assigned time slice. The Read register 671 is clocked at the $E_{560}$ time.

The output signals appearing at the Q and the $\overline{Q}$ outputs of the RE-0 through RE-2 flip-flops of the Read register 671 are directly applied to the (J) and to the (K) inputs respectively of the EX-0 through EX-2 flip-flops of the Execute register 693. The contents of the Execute register 693, therefore, are a duplicate of that data contained within the Read register 671 except that the EX-0 through EX-2 flip-flops of the Execute register 693 are clocked at the $E_{000}$ time.

The signals appearing at the $\overline{Q}$ outputs of the RE-0 through RE-2 flip-flops of the Read register 671 are also directly applied by means of the conductors 675.3 through 675.5 respectively to the (*b*), the (*d*), and the (*f*) inputs of the input multiplexer circuit 870. As previously described, the input multiplexer circuit 870 functions to transmit the signals applied to the (*b*), (*d*) and the (*f*) inputs respectively to the Z1, Z2 and the Z3 outputs whenever the select enable input (S) is at a logical low level; this occurs during minor cycle periods other than the $E_1$ and the $E_2$ minor cycles. Therefore, following a clocking of the Read register 671 at the $E_{560}$ time the encoded signal applied to the Read register 671 will thereafter be transferred by means of the multiplexer circuit 870 and the conductors 880–882 to the inputs (*c*)–(*a*) of the clear decode network 871.

The clear decode network 871, as previously described, is a 1 of 8 decoder circuit which functions to produce at one of its eight outputs a logical low level, according to the truth table of FIG. 19 (sheet 2). The particular output (AA–HH) selected is the decimal equivalent of the inverted binary coded numerical representation received at the inputs (*a*)–(*c*) of the clear decode network 871, where the output (HH) has the decimal equivalent of (0) and the output (AA) is equivalent to the decimal number 7. For example, if the inverted binary encoded number received at the inputs were: (*a*) = low, (*b*) = high, and (*c*) = low, the clear decode network 871 would function in response thereto to provide a logical low level at its (CC) output, since the (CC) output corresponds to the decimal number (5), and also represents (in the preferred embodiment) the data processor "5".

The signals appearing at the outputs (HH–AA) of the clear decode network 871 are respectively applied to the clear inputs (C) of the RS-0 through RS-7 flip-flops of the Priority Resynch register 653. The (HH–EE) outputs inclusively of the clear decode network 871 are respectively applied to the preset inputs of the PRI-0 through PRI-3 flip-flops of the I/O Priority Override register 685. Therefore, when a specific data processor has been assigned priority to receive the next time slice, its respective flip-flop within the Priority Resynch register 653 is cleared, and its respective flip-flop within the I/O Priority Override register 685 (if it has one) is set. The foregoing procedure insures that any particular data processor cannot be assigned two consecutive major cycle allocations of the shared resources.

Referring to FIGS. 16 and 17, signals from the Q outputs of the RE-0 through RE-2 flip-flops of the Read register 671 are also directly applied to the (*c*–*a*) inputs of the decode network 700 by means of the conductors 675.0 through 675.2. The decode network 700 electrically functions according to the truth table of FIG. 19 (sheet 2). The decode network 700 functions to decode the binary signal applied at its inputs (*c*–*a*) and to set in response thereto (by means of the inverters 910-917) the flip-flops ST-0 through ST-7 of the State register 703. The flip-flops of the State register 703 are set at the $E_{000}$ time and indicate that data processor that has currently been assigned a time slice. It will be noted, that the ST-0 through ST-7 flip-flops inclusively respectively are associated with the data processors 0 through 7.

Signals from the Q outputs of the flip-flops of the State register 703 are directed to the Console 65 by means of the signal flow path 930 and are used for display and other informational purposes within the data processor system. Signals appearing at the $\overline{Q}$ outputs of the flip-flops within the State register 703 are directed by means of the signal flow path 49 to the Register File 35 for conditioning of registers therein. Signals appearing at the $\overline{Q}$ outputs of the ST-0 through ST-3 flip-flops of the State register 703 are also directed by means of the signal flow path 61 to control circuits within the I/O section 30 (not shown) for indicating to those peripheral devices (34) which have invoked a priority override signal, whether or not the associated data processors have been assigned a time slice.

The signal outputs of the Execute register 693 are also directly applied to the inputs of the Write register 696. The flip-flops of the Write register (WR-0 through WR-2) are set at the $E_{560}$ time, the contents thereof being a duplicate of the contents of the Execute register 693. Signals appearing at the Q outputs of the flip-flops of the Write register 696 are directed by means of the signal flow path 233 to the write input 221 of the $F_{124}$ and the $P_{125}$ registers. Signals appearing at the $\overline{Q}$ outputs of the flip-flops of the Write register 696 are directly applied to the (*a*), the (*c*), and the (*e*) inputs of the multiplexer circuit 870 for transmission thereby to the clear decodoe network 871, as previously described, during the E1 and the E2 minor cycle periods.

General System Operation

The following discussion pertains to the function elements illustrated in FIGS. 7–10 with specific references to other Figures as herein cited. The multiprocessor data processing system of the preferred embodiment contains eight data processors, as previously discussed, each functionally defined by a dedicated register functional group of the Register File 35 (FIG. 6) operatively connected with the shared resource circuits 70 (FIG. 2), to perform a unique data processing task.

It will be recalled, that a data processing task includes the mere handling of, as well as arithmetic and logical manipulations performed upon digital data. In the preferred embodiment, each data processor performs its associated data processing task under microcode control. As used herein, microcode is the numeric code in which micro-instructions are written. Each micro-instruction performs a unique data manipulation within the registers and logic networks of the Central Processor Unit 31. Generally, 1 microinstruction can be executed during each minor cycle (100 nsec), although some micro-instructions require two minor cycles for their execution.

A series of micro-instructions when combined so as to implement the execution of one machine language instruction, is called a micro-program. In the preferred embodiment, the data processors perform arithmetic and other higher order logical manipulative data processing tasks under machine language control. Individual machine language instructions, however, are executed under microcommand control by the micro-programs.

Machine language instructions (collectively forming machine language programs) are stored within the Main Storage memory 32. Specifically, the Main Storage memory 32 contains those machine language programs currently being executed by the eight data processors. The Main Storage memory 32 interface circuits general consist of the D register 356 and the S register 372 (FIG. 8). The S register 372 is used to contain the address of data being read from or written into the Main Storage memory 32. The D register 356 is used to contain the data being read from or written into the Main Storage memory 32. Data read from the Main Storage memory 32 is transferred throughout the system by means of the Data fan-in network 362.

A repetoire of micro-programs are stored within the Microcode Storage Array 520 of the Control Storage section 60. Microcode instructions are sequentially stored in the Microcode Storage Array 520 to form micro-programs such that a micro-program can be referenced by addressing its first micro-instruction. The micro-program, once referenced (as hereinafter described), will thereafter be executed by sequentially executing the individual micro-instructions of the program.

When a machine language instruction is referenced in the Main Storage memory 32, for execution thereof, the appropriate micro-program required to execute that machine language instruction must be referenced in the Microcode Storage Array 520 to begin execution of the machine language instruction. The Address Table 61 assists in this referencing function. The Address Table 61 (in particular the Function Code Address Table 561) contains the beginning micro-instruction address of micro-programs stored in the Control Storage 60, arranged therein so as to be referenced by the function code (to be hereinafter described) of a machine language instruction. Referring to FIGS. 8 and 9, the first word (two bytes) of the machine language instruction referenced from the Main Storage memory 32 is transferred by means of the Data fan-in network 362 and the signal flow path 370 to the Code compression network 571 of the Address Table 61. The first byte of the referenced machine language instruction word contains a coded instruction (function code) for referencing the contents of the Function Code Address Table 561. The Code Compression network 571 decodes the function code of the machine language word, and the decoded signal is then used to address the Function Code Address Table 561 by means of the fan-in network 566. The thus referenced micro-instruction address from the Function Code Address Table 561 is transferred by means of the Data fan-in network 581 and by means of the $P_{pointer}$ fan-in network 584 to the $P_{pointer}$ register 609. The contents of the $P_{pointer}$ register are written into the $P_u$125 register (FIG. 7) of that data processor which is to execute the referenced machine language instruction. The writing of the $P_u$ register 125 of the appropriate data processor is performed as the last operation in a major cycle, as hereinafter described, in preparation for the execution of (or the continued execution of, as the case may be) the machine language instruction during the next time slice awarded to that data processor.

It will be recalled, that the $S_u$ register 512 is the only register that can be used for directly addressing the Microcode Storage Array 520 of the Control Storage Proper 60, and also provides the only means for directly addressing the Function Code Address Table 561 of the Address Table 61.

The micro-programs and the function code addresses are respectively loaded into the Microcode Storage Array 520 and into the Function Code Address Table 561 during an initial "start-up" loading sequence of the system. Upon receipt of an appropriate start-up signal from the Console section 65, the loader logic 64 (FIG. 1) of the I/O section 30 loads the Microcode Storage Array 520 and the Function Code Address Table 561 (in that order) by means of the signal flow path 63. In the preferred embodiment, the loader logic 64 receives the micro-instructions and the function code addresses to be transferred from either disc or card reader external sources 34 by means of the signal flow path 40. The transfer of data occurs in asynchronous mode until the Microcode Storage Array 520 and the Function Code Address Table 561 have been filled (until all addresses available from the appropriate external sources 34 have been written). When all such micro-instructions and function code addresses have been transferred, an "Autoload" sequence is automatically initiated.

The Autoload sequence, under automatic hardware control, begins by initiating a "master clear" signal which clears the registers throughout the system. The (04) bit position of the Busy byte 111-A of the B/A register 111 is then set, enabling the Executive processor (data processor 04) to gain priority on the first time slice to be awarded by the Resource Allocation Network 37. During the previously described loading operation, a dedicated Autoload micro-program had been loaded into the Microcode Storage Array 520. Concurrently with the setting of the Executive processors' busy bit, the address of the first microcode instruction of the dedicated Autoload micro-program is forced into the $S_u$ register 512. Therefore, when data processor 04 is awarded the first time slice, it automatically begins its microcode execution of the dedicated Autoload micro-program. Thereafter (and without going into unnecessary detail), The Executive processor proceeds under its microcommand execution of the dedicated Autoload micro-program to initiate and to supervise operations of the I/O data processor 3 (or other I/O data processor) in loading the machine language programs to be thereafter executed by the data processors into the Main Storage Memory 32, and proceeds to perform an automatic check-out of the system. Upon completion of the Autoload sequence, the Executive processor 04 turns off its busy bit (the 04 bit position of the Busy byte 111-A); thereafter, the normal resource allocation priority assignment mode governs the operations of the data processing system.

Major Cycle Timing Considerations

As previously discussed, the eight data processors perform their assigned data processing tasks on a major cycle time basis as regulated by the allocation of time slices by the Resource Allocation network 37. Each major cycle time period is approximately of the same time duration as the system storage time. It will be recalled that since a MOS memory is being employed in the preferred embodiment, the Main Storage Memory 32 access time is approximately 350 nsec. The standard duration of a major cycle is 800 nsec. Therefore a data processor, in the execution of its associated data processing task within an assigned time slice, has sufficient time in which to reference the Main Storage Memory 32, plus execute one or more micro-instructions in response thereto before the termination of its awarded time slice. In the preferred embodiment, all references to the Main Storage Memory 32 must occur during the first minor cycle (EO) of a major cycle.

Figure 12:
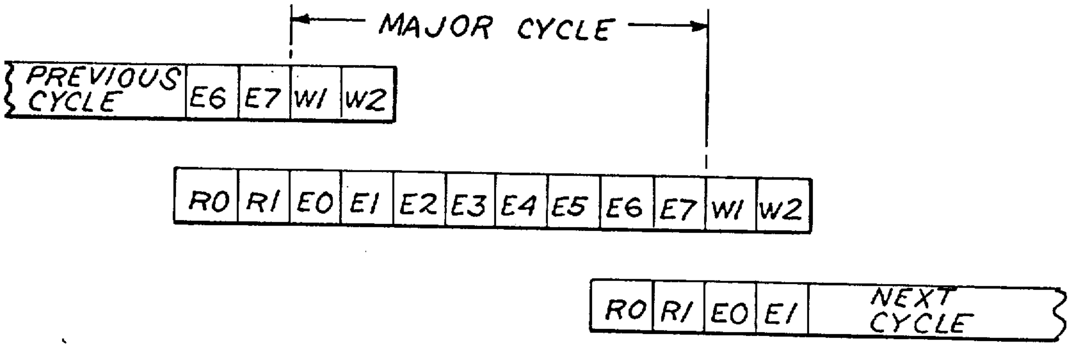
FIG. 12 (sheet 6) is a diagrammatic representation illustrating the overlapping in time of consecutive time slice periods of the present invention as they would occur in normal operation of the data processor system of the present invention.

Referring to FIG. 12, sheet 6, each major cycle generally contains eight minor cycles (EO through E7). Each of the minor cycles is 100 nsec in duration and functionally represents the smallest period of time in which a micro-instruction can be executed. In the preferred embodiment, therefore, execution of a micro-instruction will extend over at least one minor cycle, and perhaps over two or three minor cycles depending upon the particular nature of the micro-instruction.

Each major cycle (FIG. 12) is preceded by two successive minor cycle periods designated as R0 and R1, and is followed by two successive minor cycle periods designated as W1 and W2. The R0 and the R1 minor cycles are referred to as state initialization minor cycles (collectively designated as R in FIGS. 13A and B), and are dedicated to performing those manipulative operations required to prepare the data processor which has been selected to receive the next awarded major cycle for the active execution of its micro-instructions at the beginning of the following E0 minor cycle (as hereinafter described). Referring to FIG. 12, it will be noted that the R0 minor cycle of any major cycle is initiated simultaneously with the execution of the previously awarded major cycle, (specifically, at the $E_{560}$ time of the previous major cycle) and is also concurrent with the E6 minor cycle of the previously awarded major cycle. Similarly, the R1 minor cycle occurs concurrently with the E7 minor cycle time of the previously awarded major cycle. The W1 and the W2 minor cycles referred to as the state housekeeping minor cycles (collectively designated as W in FIGS. 13A and B) are dedicated (under hardware control) to those processes required to update (as hereinafter described) the appropriate circuits of the data processor which was active in the associated major cycle, so as to reflect the operations performed by that data processor during its assigned time slice. Referring to FIG. 12, it will be noted that the W1 minor cycle occurs simultaneously with the E0 minor cycle of the next awarded major cycle, and that the W1 minor cycle occurs simultaneously with the E1 minor cycle of the next awarded major cycle.

From the foregoing, it will be noted that the "active" portions of successively awarded major cycles (consisting of the minor cycles E0 through E7) occur contiguously in real time such that the end of any active major cycle (the minor cycle E7) occurs at the same instant of time as the beginning of the next awarded active major cycle (the EO minor cycle). Accordingly, the processor state initialization operations for a data processor which is to receive the next awarded time slice are performed prior to (at R0 and R1) the actual initialization of the associated data processor, and the housekeeping operations associated with the data processor which was last active occur only after activation of (at W1 and W2) the next awarded data processor has occurred. The fact of overlapping the initialization and housekeeping functions as previously described, provides a data processing system having zero Central Processor unit 31 overhead with respect to processor initialization and housekeeping functions. Therefore, each activated data processor receives maximum utilization of the common resource circuits during its awarded time slice.

Basic Task Operation During a Time Slice

With reference to FIGS. 7–10, keeping in mind the previously described timing considerations, and the operations of the Resource Allocation network 37, the following will generally illustrate the operation of a data processor of the preferred embodiment in the execution of its assigned data processing task during one time slice period.

It will be recalled that the $P_u$ register 125 of each data processor contains the address location within the Microcode Storage Array 520 of the next microcode instruction to be executed by that data processor. Similarly, it will be recalled that the $F_R$ register 124 of each data processor contains the function code of the first word (two bytes) of the machine language instruction that will be next executed by the data processor. The following, therefore, applies to a data processor which has been awarded priority (by the Resource Allocation network 37) for the next assigned major cycle time period. During the processor state initialization minor cycle R0 the contents of the $P_u$125 register of the data processor to be activated are transferred (under hardware control) by means of the $S_u$ fan-in network 501 to the $S_u$ address register 512. Therefore, at the beginning of the major cycle proper (at time $E_{000}$) the Control Storage Proper 60 will be addressed at the appropriate microcode instruction for that data processor.

During the data processor initialization minor cycle R1 the contents of the $F_R$ register 124 of the data processor to be activated are transferred (under hardware control) by means of the fan-in network 256 to the F register 260. The contents of the F register 260 are thereafter available for use by the ALU circuits 36, for microcode modification, or the like.

At the beginning of the time slice awarded to the data processor (at $E_{000}$) the data processor will begin its microcode execution of the micro-instruction located at the address in the Control Storage Proper 60 which is contained within the $S_u$ register 512. At time $E_{000}$ the micro-instruction whose address is contained in $S_u$ 512 register is addressed within the Microcode Storage Array 520 and is transferred by means of the data fanout network 534 to the $F_{u1}$541 and to the $F_{u2}$543 registers. The $F_{u1}$541 and the $F_{u2}$543 registers are identical in construction and function; however, two registers are required in the preferred embodiment for drive purposes. Also, as illustrated in FIG. 9, parity checking is performed only on the contents of the $F_{u2}$ register 543. After the micro-instruction address has been clocked out of the $S_u$ register 512, the contents of the $S_u$ register 512 are incremented by means of the $S_u+1$ network 526 and the $S_u$ fan-in network 501, such that the $S_u$ register 512 will contain the address of the next micro-instruction of the microprogram being executed by the active data processor.

It will be recalled that each minor cycle is subdivided into five discrete phase time segments as illustrated in FIG. 4B. Once the micro-instruction to be executed has been transferred to the $F_{u1}$ and $F_{u2}$ registers 541 and 543 respectively, that particular micro-instruction is thereafter executed throughout the remaining phase time segments of the minor cycle (or successive minor cycles) as hereinafter described. In the preferred embodiment, there is no direct provision within the system for indicating when the execution of a particular micro-instruction has been completed. The function is inherent in the system by a predetermined knowledge of the length of execution of a particular micro-instruction. For example, if a particular micro-instruction requires two consecutive minor cycles for its completion, the $S_u$ register 512 is not updated (by means of the $S_u+1$ network 526) by entering the address of the succeeding micro-instruction therein, until after the two consecutive minor cycles have elapsed.

Successive micro-instructions, up to a maximum of eight, are executed by the active data processor within its assigned time slice throughout the minor cycles E0 through E7 of a major cycle generally according to the phase schedule illustrated in FIG. 4B. Referring to FIG. 4B, specific microcommands (microinstructions) designated as "$n$" through "$n+2$" being executed by a data processor have been respectively assigned to the minor cycles E2, E3 and E4. In general, without considering the peculiarities of a particular microcommand, the microcommand execution proceeds as follows, it being understood that although specific references are made to the E2 and the E3 minor cycle times, the same general procedure would apply to any of the minor cycles of a major cycle. At time $E_{250}$, if the microcommand $n$ was an instruction for writing information into the Basic Register File 114, execution of the $n$ microcommand would begin thereat. At time $E_{280}$, preparatory access of the microcommand $n+2$ would commence with the clocking of the control storage address of the $n+2$ microcommand into the $S_u$ register 512. At time $E_{300}$, the translation of microcommand $n+1$ would commence with the clocking of the $n+1$ microcommand instruction from the Control Storage Proper 60 into the $F_{u1}$ and $F_{u2}$ registers 541 and 543 respectively. At the $E_{320}$ time, if the microcommand $n$ employed a reading of the Basic Register File 114, execution thereof would commence with the clocking of the appropriate contents of the Basic Register File 114 into the $A_u$333 and into the $B_u$347 registers.

Program execution of the microcommands by a data processor continues throughout its assigned time slice until the end of the minor cycle E7 also signifying the end of the active portion of the particular major cycle. A special class of microinstructions, referred to in the preferred embodiment as "blockpoint" instructions when executed, cause the contents of the $P_{pointer}$ register 609 to be updated with the address of the next microcode instruction to be executed by the active data processor. The blockpoint micro-instructions, by use of the $P_{pointer}$ register 609, permit the data processors to execute their assigned tasks on a non-contiguous time slice basis. At the end of an active major cycle (during the minor cycle W0) the contents of the $P_{pointer}$ register 609 are clocked back into the $P_u$ register 125 of the data processor which was active during the last time slice. The next time that this data processor is awarded a time slice, therefore, it will begin execution of its micro-instructions at the micro-instruction in Control Storage Proper 60 located at the address contained within the $P_u$ register 125 of that data processor. Thus, each major cycle allocated to a data processor must involve the execution of at least one blockpoint microcommand. The effect of a blockpoint instruction upon the task execution of a data processor, is that the micro-instructions executed in a major cycle following a blockpoint microinstruction make no assumptions as to the contents of the common resource circuits of the ALU 36, unless such micro-instructions are known to occur within the same major cycle as the last executed blockpoint micro-instruction. When the last blockpoint micro-instruction occurs at a minor cycle other than E7 for any major cycle allocated to a data processor, the micro-instructions executed after that last executed blockpoint micro-instruction will be repeated during the next major cycle allocated to the associated data processor.

When an active data processor, in the execution of its machine language instructions completes the execution of a specific machine language instruction, the $F_R$ register 124 of that data processor is automatically updated so as to contain the function code of the next machine language instruction to be executed. The contents of the F register 260 and the $F_R$ Buffer register 215 are likewise simultaneously updated. Specifically, with respect to execution during a time slice, during the minor cycle W1 the contents of the $F_R$ Buffer register 215 are rewritten into the $F_R$ register 124 of the data processor that received the last time slice.

During the execution of a machine language program by a data processor, the S register 272 contains the beginning address of the particular machine language instruction being executed. Each data processor uses two registers (Q1 and Q2, not shown) within its Basic Register 114 functionally dedicated group (116–123) to keep track of its machine language program execution. Initially, both the Q1 and Q2 registers contain the address in Main Storage memory 32 of the first machine language instruction to be executed. In reading the first word of a machine language instruction, the data processor addresses Main Storage memory 32 at the contents of the Q1 register (the S register 372 is loaded with the contents of the respective Q1 register). As that machine language instruction is being executed, the contents of the Q1 register are incremented by two and the contents of the Q2 register are incremented by four. For a two byte machine language instruction, the next machine language instruction will occur at the address contained in the Q1 register (since the machine language is two bytes long, it is necessary to jump two address locations in the Main Storage memory 32). Similarly, if the machine language instruction is four bytes long, the next machine language instruction will occur at the address contained within the Q2 register. When reading a machine language instruction from the Main Storage memory 32 during an assigned time slice, the S register 372 indexes the particular machine language instruction as indicated by either the contents of the Q1 or the Q2 registers. It will be recalled, that such a reference to the Main Storage memory 32 can only occur during the E0 minor cycle of a major cycle. The machine language instruction is transferred out of the Main Storage memory 32 by means of the Data fan-in network 362 and by means of the ALU fan-in network 399 to update the $F_R$ Buffer register 215 by means of the signal flow path 210 and to update the F register 260 by means of the signal flow path 210 and the fan-in network 256. Simultaneously, the machine language instruction is forwarded to the Address Table 61 where it is decoded. In decoding, that address at which the first microcode instruction corresponding to the particular machine language instruction can be found is determined by means of the Address Table 61. That particular address of the first microcode instruction is sent to the $S_u$ fan-in network 501 and thereafter to the $S_u$ register 512 where it is available for direct addressing of the Control Storage Proper 60. Thereafter, the machine language instruction is executed per the sequence of microcode instructions as previously described.

Boundary Crossing

Although each data processor performs its assigned data processing task independently with respect to the other seven data processors, each data processor in the execution of its assigned data processing task may call upon the facilities of another data processor by cross-referencing registers of that data processor. This particular feature of the preferred embodiment, generally referred to as the boundary crossing facility, is enabled by means of the Boundary Crossing (BC) registers 113 (FIG. 6) of the shared registers 110 of the Register File 35 and by means of the microcode controlled addressing switching capability provided by the Address fan-in networks 234, 204 and 249 (FIG. 7) to dedicated registers within the Basic Register File 114 and within the extended $F_R$ 124 and $P_u$ 125 registers.

In the preferred embodiment, the BC register 113 is a 16-bit register which is written under microcommand control. The format of the 16 bits (00–15) of the BC register 113 is as follows. The contents of the bit positions 08, 09 and 10 designate the data processor (encoded in binary) which is to be referenced by the data processor that is initiating the boundary crossing reference. The contents of the bit positions 11–15 contain the encoded designation of the particular register of the data processor (as indicated by bit positions 08–10) to be referenced. The status of the bit position 07 of the BC register 113 indicates whether the data processor register to be referenced is part of the Basic Register File 114 or whether it is one of the extended $F_R$ 124 or $P_u$ 125 registers. In the preferred embodiment, the seven higher order bit positions 00–06 of the BC register 113 are unused.

Although it is physically possible for each of the data processors to cross reference by means of the boundary crossing facility registers of other data processors within the system, the boundary crossing facility is generally employed by the Executive data processor ("data processor 04"). By its very nature, the Executive processor's task is to monitor the execution of and to assign new data processing tasks to each of the other data processors. Therefore, to efficiently perform its own data processing task it becomes important for the Executive data processor to have the capability of cross referencing registers of the other data processors within the system.

In normal operation, an active data processor addresses registers of the Basic Register File 114 only within that functional group (116-123 of FIG. 6) of basic registers which are dedicated to that data processor. In the preferred embodiment, registers within the Basic Register File 114 are commonly addressed by means of an 8-bit address supplied as described below with reference to FIGS. 7 and 9. Depending upon the particular task operation being executed by the active data processor, five of the eight addressing bits are supplied by either the F Register 260, or by one of the $F_u$ registers (the $F_{u1}$ register 541 or the $F_{u2}$ register 543), or by a combination of bits derived therefrom. Referring to FIGS. 7 and 9, it will be noted that the F register 260, the $F_{u1}$ register 541 and the $F_{u2}$ register 543 respectively, provide addressing inputs to the Address fan-in network 204 by means of the signal flow paths 262, 295 and 296. The Address fan-in network 204, under microcommand control, determines the specific combination of input signals that will comprise the five addressing bits to be forwarded to the Basic Register File 114 by means of the signal flow path 205. The five addressing bits supplied to the Basic Register File 114 by means of the signal flow path 205 identify the specific register within the Basic Register File to be addressed.

Under normal operation, the remaining three of the eight addressing bits supplied to the Basic Register File 114 are provided by the Execute register 693 by means of the signal flow path 209, the Address fan-in network 234 and the signal flow path 238 (see FIGS. 10 and 7). The three addressing bits supplied by the Execute register 693 designate that group of functional dedicated registers within the Basic Register File 114 which are to be addressed. It will be recalled, that the Execute register 693 output consists of the encoded designation of the specific data processor which is currently active; therefore, under normal task execution an active data processor can only reference its own functional dedicated registers within the Basic Register File 114.

Similarly, under normal (non-boundary crossing) task execution registers within the extended $F_R$ 124 and $P^u$ 125 registers are addressed by means of a 3-bit address supplied by either the Read register 671 or by the Write register 696 (FIGS. 7 and 10). Since there is only one $F_R$ 124 and one $P_u$ 125 register dedicated to each data processor, only three addressing bits are required to address these registers. Referring to FIGS. 7 and 10, it will be noted that the Read register 671 and the Write register 696 respectively provide addressing input signals to the Address fan-in network 249 respectively by means of the signal flow paths 675 and 233. The Address fan-in network 249, in response to signals from the Timing and Control circuits 38, selects the data that is to comprise the 3-bit address and addresses the $F_R$ 124 and the $P_u$ 125 registers by means of the signal flow path 254. It will be recalled, that under normal task execution a data processor can reference only its own dedicated $F_R$ 124 and $P_u$ 125 registers. The manner in which a data processor normally reads and writes its $F_R$ 124 and $P_u$ 125 registers has been described in the previous section entitled "Basic Task Operation During a Time Slice". From the foregoing discussion, it will be appreciated that the Read register 671 output signals will be selected by the Address fan-in network 249 to supply the appropriate 3-bit address for a reading operation of the $F_R$ 124 and the $P_u$ 125 registers, and that the Write register 696 output signals will be selected to supply the appropriate 3-bit address for a writing operation of these registers.

Referring to FIG. 7, it will be noted that a separate BC signal flow path 284 has been designated as an output of the shared registers 110. The signal flow path 284 originates at the BC register 113 and provides signal flow from the bit positions 07–15 thereof to the Address fan-in network 234, 204 and 249. When the boundary crossing facility is employed by a data processor to cross reference a register of another data processor, the appropriate Address fan-in networks 234, 204 and 249 will be instructed under microcommand control to select that addressing information supplied by means of the signal flow path 284. For example, if the boundary crossing facility is initiated to cross reference a register within the Basic Register File 114, the referencing data processor will simultaneously direct microcommand instructions to the Address fan-in networks 234 and 204 to select the addressing information supplied by the signal flow path 284 as inputs thereto. Accordingly, the Address fan-in network 234 will supply the three addressing bits designating the group of functional dedicated registers of the cross referenced data processor (as supplied by the status of the BC register bit positions 08–10); and the Address fan-in network 204 will provide the five addressing bits designating that register within the cross referenced group of functional dedicated registers which is to be referenced (as supplied by the BC register 113 bit positions 11–15). Similarly, if a data processor invokes the boundary crossing facility to cross reference an $F_R$ 124 or $P_u$ 125 register of another data processor, the referencing data processor will command the Address fan-in network 249 to select the addressing information supplied by the signal flow path 284; the Address fan-in network 249 will accordingly address the extended $F_R$ 124 and the $P_u$ 125 registers. It will be appreciated, that the addressing information supplied to the Address fan-in network 249 by the signal flow path 284 is a duplicate of the contents of the 08-10 bit positions of the BC register 113.

An active data processor may initiate a boundary crossing reference at any point in the execution of its associated data processing task. The actual cross reference is performed by the execution of a boundary crossing micro-instruction sub-routine which loads the BC register 113 with the desired cross reference addressing information and thereafter initiates the appropriate selection operations within the Address fan-in networks 234, 204 and 249 to effect an actual cross reference. The following example, typical of a data processor cross reference, will illustrate the operation of the boundary crossing facility.

In the preferred embodiment a data processor may be programmed to alert the Executive processor (data processor "04") of its data processing task execution status. When such a programmed data processor has completed its assigned data processing task, the Executive processor will proceed, by means of the boundary crossing facility, to assign another task to that recently idled data processor as follows. Upon determining the new task to be assigned to the idle data processor, the Executive processor will proceed to write into the appropriate registers of the idle data processor sufficient digital information to enable that data processor to begin execution of its new task. This is normally accomplished by loading the idle processor's machine language instruction address register with the address of the first machine language instruction of the new data processing task which that data processor is to execute. The Executive processor performs this operation by executing a micro-instruction boundary crossing sub-routine.

The following is typical of the micro-instruction sequence that would be executed by such a boundary crossing subroutine within a major cycle. The address (within the Main Storage memory 32) of the machine language instruction at which the idle data processor when activated will begin its program execution is loaded into the $A_u$ register 333. The BC register 113 is loaded with the 8-bit address designating the register to which the data contained within the $A_u$ register 333 is to be transferred. An "invoke" microcommand is next executed. For a cross reference to a register within the Basic Register File 114, the invoke microcommand triggers the selecting mechanisms of the Address fan-in networks 234 and 204 such that the BC register 113 address input data to these networks (by means of the signal flow path 284) is selected to address the Basic Register File 114. The contents of the $A_u$ registers 333 are then transferred to that register specified by the BC register 113 addressing information. A final "revoke" microinstruction restores the Address fan-in networks 234 and 204 to their normal (non-boundary crossing) states, thus re-establishing the common addressing paths provided by the signal flow paths 204, 295, 296 and 262 to the Basic Register File 114. Therefore, if the register thus loaded by means of the boundary crossing facility were the machine language program address register of the data processor, that data processor at its next awarded time slice period will proceed to execute its newly assigned data processing task.

Although the above illustration concerned a boundary crossing writing operation, it will be realized that the execution of a similar boundary crossing sub-routine would be employed to effect a boundary crossing reading operation. Also, although the above illustration concerned the cross referencing of a register within the Basic Register File 114, it will be apparent that a similar cross referencing operation may occur with respect to the $F_R$ 124 and the $P_u$ 125 registers.

Although a specific technique of cross referencing registers of one data processor by another has been illustrated, it will be realized that our invention is not limited to the specific cross referencing hardware or software employed by the preferred embodiment.

While we have disclosed a specific embodiment of my invention, it is to be understood that this is for the purpose of illustration only, and that may invention is to be limited solely by the scope of the appended claims.

What is claimed is:

1. An improved data processing system, comprising:

a. a plurality of data processing means each configured for executing data processing tasks on and in response to received digital information, said plurality of data processing means including shared common resource circuit means comprising data storage means, arithmetic and logic means, and timing and control means, said plurality of data processing means further having circuit means responsive to said execution of tasks by each of said data processing means for generating request output signals indicative of real time requirements for use of said shared common resource circuit means by each of said plurality of data processing means in the execution of its respective said data processing task;

b. input/output means operatively connecting at least one of said plurality of data processing means with external sources for transfer of said digital information therebetween;

c. basic timing circuit means for generating major cycle timing signals wherein the duration of a major cycle approximates one or more storage reference cycles of said data processing system up to that period of time required by said system to execute an instruction; and d. control means in circuit with said plurality of data processing means and with said basic timing circuit means for determining relative real time needs of said plurality of data processing means for operative use of said shared common resource circuit means in the execution of their respective said data processing tasks, and for selectively activating, responsive to said major cycle timing signals, said plurality of data processing means on said major cycle time period basis according to said determined relative real time task execution needs, said control means comprising:

1. means operatively connected to receive said plurality of request output signals, being responsive thereto and to said major cycle timing signals for processing means for use of said shared common circuit means; and 2. activating means responsive to said need determination output signals and to said major cycle timing signals for sequentially selectively activating said plurality of data processing means on contiguous major cycle time periods by operatively allocating use of said shared ocmmon resource circuit means among said plurality of data processing means in a manner such that each successively activated one of said data processing means actively executes its respective data processing task for the entire duration of that major cycle time period in which it is activated, without delay for selection operations of said control means.

2. An improved data processing system according to claim 1, wherein said plurality of data processing means include a plurality of distinct register circuit groups, each of said plurality of register circuit groups being operatively connected for dedicated use by a different one of said plurality of data processing means; and means for operatively connecting said plurality of register circuit groups to share said common resource circuit means.

3. An improved data processing system according to claim 1, wherein said activating means includes:

a. means for operatively preparing each of said data processing means for activation contemporaneously with the major cycle time period contiguously preceeding that major cycle in which that data processing means is to be activated; and b. means for operatively preserving an updated task execution status of each of said data processing means contemporaneously with the major cycle time period contiguously succeeding that major cycle in which that data processing means was activated.

4. An improved data processing system according to claim 1, wherein said control means includes means for selectively activating at least one of said plurality of data processing means once each said major cycle time period, and wherein the duration of one of said major cycle time periods is of the same order of magnitude as a storage reference cycle of said data processing system, said storage reference cycle being that time required by said system to execute a subinstruction.

5. An improved data processing system according to claim 4, wherein said control means, in selectively activating said plurality of data processing means, operatively allocates to that data processing means selected on each said major cycle time period, the exclusive use of that part of said shared common resource circuit means required by the selected data processing means for executing its respective data processing task.

6. An improved data processing system according to claim 4, wherein said timing and control means includes means for providing timing signals for subdividing said major cycle time periods into a plurality of smaller successive minor cycle time periods and wherein said plurality of data processing means include means for executing micro-instructions, the time for execution of a micro-instruction being generally coterminous with one or more of said minor cycles.

7. In a reconfigured data processing system comprising: input/output means for receiving and transmitting information from and to external sources; basic timing circuit means for generating major cycle timing signals; storage means for storing digital information including said received and transmitted information; arithmetic and logic circuit means for performing logical and other manipulative operations on and in response to said digital information; timing and control means for providing timing and control signals throughout said data processing system; a plurality of data processing means including and operatively sharing said input/output means, said storage means, said arithmetic and logic circuit means, and said timing and control means for performing data processing operations; and control means for selectively activating said plurality of data processing means; the improvement being characterized by:

a. said basic timing circuit means comprising means for generating said major cycle timing signals having a duration of one or more storage reference cycle times of said data processing system up to that period of time required by said system to execute an instruction;

b. each of said plurality of data processing means comprising means, independently operable when activated, for executing data processing tasks on and in response to said digital information on a time slice period basis, wherein the duration of a time slice period approximates said major cycle;

c. said plurality of data processing means including means for producing resource utilization request signals on an individual data processing task execution need basis; and d. said control means including resource allocation circuit means operatively connected to receive said resource utilization request signals for repeatedly selectively activating in response thereto said plurality of data processing means on contiguous ones of said time slice periods, said resource allocation circuit means including means operatively connected with said plurality of data processing means for actively energizing each successively selected data processing means for exclusive use of said shared circuit means in the active execution of its respective data processing task for the entire duration of that time slice period in which said data processing means is activated with no delay for processing means initialization and housekeeping operations.

8. An improved data processing system according to claim 7, wherein said resource allocation circuit means includes means for generating a priority output signal in advance of each of said time slice periods, identifying that one of said data processing means to be activated during the next time slice period.

9. An improved data processing system according to claim 7, wherein said control means includes sensing means operatively connected to receive said resource utilization request signals for maintaining an updated log of said resource utilization request signals, and wherein said resource allocation circuit means includes priority circuit means operatively connected to monitor the resource utilization request signal log of said sensing means for assigning priority sequencing thereto according to a predetermined priority schedule.

10. An improved data processing system according to claim 9, wherein said resource allocation circuit means includes resynchronizing circuit means operatively connected with said sensing means and with said priority circuit means for regulating flow of said resource utilization request signals to said priority circuit means on a snapshot time period basis, wherein the duration of a snapshot time period is a multiple of said time slice period and varies in response to the activation of said data processing means.

11. An improved data processing system according to claim 10, wherein said resynchronizing circuit means includes means for inhibiting the flow of said resource utilization request signals from each of said data processing means to said priority circuit means, following the activation of that data processing means within a same one of said snapshot time periods.

12. An improved data processing system according to claim 9, wherein said input/output means includes means for providing priority override signals in response to the data processing tasks executed by said plurality of data processing means; and wherein said priority circuit means includes priority override circuit means operatively connected to receive said priority override signals for causing on said time slice period basis, said priority circuit means to produce a priority output signal for activating said plurality of data processing means responsive to said received priority override signals, to the exclusion of said resource utilization request signals of a less time dependent nature.

13. A reconfigured data processing system, comprising:

a. input/output means for receiving and transmitting information, including a repertoire of microinstructions, respectively from and to external sources;

b. first storage means for storing digital information including said received and transmitted information;

c. control storage means for storing said microinstructions; and d. data handling circuit means operatively connecting said input/output means with said first storage means and with said control storage means for handling said digital information, said data handling circuit means including a central processor comprising:

1. basic timing circuit means for generating major cycle timing signals wherein the duration of a major cycle approximates one or more storage reference cycles of said data processing system up to that period of time required by said system to exectue an instruction;

2. timing and control circuit means responsive to said major cycle timing signals for providing timing and control signals to electrical networks within said central processor, said first storage means, said control storage means and said input/output means on said major cycle time period basis;

3. arithmetic and logic circuit means for transferring, responsive to said timing and control signals, said digital information between said input/output means and said first storage means and for performing thereon arithmetic, logical and other manipulative operations;

4. register file circuit means, including a plurality of dedicated register groups each operatively connected to share said arithmetic and logic circuit means, said first storage means, said control storage means and said timing and control circuit means, for operatively forming therewith a plurality of data processing means, for independently performing data processing tasks on and in response to said digital information, wherein each of said dedicated register groups is uniquely associated with one of said data processing means and is operatively connectable with and disconnectable from said arithmetic and logic circuit means, said first and control circuit means without loss of that transient data associated with each of said data processing means in the operative execution of its said data processing task;

5. resource allocation circuit means responsive to said major cycle timing signals for selectively operatively connecting one each of said plurality of dedicated register groups, one at a time, with said arithmetic and logic circuit means, said first and control storage means and said timing and control circuit means on said major cycle time period basis, thus activating one of said data processing means; and

6. means responsive to said major cycle time signals for controlling execution of that data processing task being performed by said activated data processing means under command of said microinstructions.

14. An improved data processing system according to claim 13, wherein said first storage means includes means for storing machine language instruction programs, and wherein each of said plurality of data processing means includes means for executing machine language instructions of said machine language programs.

15. An improved data processing system according to claim 14, wherein each of said plurality of dedicated register groups comprise:

a. a plurality of basic register circuits operatively connected for general use in executing the unique data processing task of the data processing means associated with the dedicated register group; and b. extended register circuit means for providing an address of the next machine language instruction to be executed by the associated data processing means; wherein said plurality of basic registers are separately addressable with respect to registers within said extended register circuit means.

16. An improved data processing system according to claim 14, wherein said means for executing said machine language instructions include means for executing micro-programs comprising said micro-instructions stored within said control storage means, and wherein each of said data processing means is to operable to execute one or more of said micro-instructions during a major cycle time period in which it is activated.

17. An improved data processing system according to claim 13, wherein said register file circuit means includes a plurality of shared registers operatively connected to be shared by said plurality of data processing means for servicing said data processing means, individually and collectively, wherein each of said plurality of shared registers is operative to perform a special purpose function within said data processing system commonly provided to each of said plurality of data processing means.

18. An improved data processing system according to claim 13, wherein each of said data processing means includes means for generating resource utilization request signals responsive to activation requirements of said data processing means in the execution of their respective data processing tasks, and wherein said resource allocation circuit means comprises:

a. priority circuit means operatively connected to receive said resource utilization request signals and responsive to said major cycle timing signals for assigning, on said major cycle time period basis, a priority sequencing thereto and for providing in response to said priority sequencing a priority signal identifying that requesting data processing means having the highest priority; and b. activating circuit means connected to receive said priority signal and responsive thereto and to said major cycle timing signals for selectively activating at least one of said data processing means on each of successive contiguous ones of said major cycle time periods such that each successively activated one of said data processing means has the exclusive operative use of said shared circuit means for the entire duration of that major cycle in which it is activated with no delay for processing means initialization and housekeeping operations by said resource allocation circuit means.

19. An improved data processing system according to claim 18, wherein said resource allocation circuit means comprises:

a. busy register means operatively connected to receive said resource utilization request signals and responsive to said major cycle timing signals for maintaining a real time log of the status thereof; and b. resynchronizing circuit means responsive to said major cycle timing signals, operatively connected with said busy register means for monitoring said log of resource utilization request signals and with said priority circuit means for selectively passing said resource utilization request signals on a periodic snapshot time period basis thereto, wherein the duration of a snapshot time period is a multiple of said major cycle time period and varies in response to the status of said monitored resource utilization request signals at the beginning of a snapshot time period.

20. An improved data processing system according to claim 18, wherein said activating circuit means includes preparatory circuit means responsive to said major cycle timing signals, connected to receive said priority signal on said major cycle time period basis for preparing to activate that data processing means identified by said priority signal, wherein said preparatory circuit means includes operatively connected to address the dedicated register group of that data processing means to be next activated for transferring to input means of said arithmetic and logic circuit means that said digital information required to enable the data processing means to be next activated to immediately execute its data processing task when activated at the beginning of the next major cycle time period.

21. An improved data processing system according to claim 20, wherein said activating circuit means further includes:

a. execute circuit means operatively connected to receive said priority signal for activating in response thereto and to said major cycle timing signals the identified data processing means, wherein said execute circuit means includes means for exclusively operatively connecting that said dedicated register group of the data processing means last identified by said priority signal to said arithmetic and logic circuit means, said first storage means and said control storage means; and b. preserving circuit means responsive to said major cycle timing signals for preserving an updated task execution status of said data processing means operative in response to said priority signal to transfer, immediately following a major cycle time period in which the identified data processing means was activated, from said arithmetic and logic circuit means that digital information representing the updated task execution status of the identified data processing means to the dedicated register group associated with that data processing means; wherein said preserving circuit means executes said transfer without interrupting the task execution of the data processing means which is concurrently active.

22. An improved data processing system according to claim 14, wherein said control storage means comprises:

a. a microcode storage array for storing said micro-instructions, said microcode storage array being operatively connected with said arithmetic and logic circuit means for providing micro-instructions thereto; and b. microcode address table means for facilitating addressing of micro-instructions within said microcode storage array, said microcode address table means being operatively connected with said plurality of data processing means for providing the address within said microcode storage array of a beginning micro-instruction by a said data processing means.

* * * * *

UNITED STATES PATENT OFFICE

CERTIFICATE OF CORRECTION

PATENT NO. : 3,913,070
DATED : October 14, 1975
INVENTOR(S) : Donald H. Malcolm, Matthew E. Kramer It is certified that error appears in the above-identified patent and that said Letters Patent are hereby corrected as shown below:

In column 3, line 8, after "such" delete "a"; in line 22, insert --(-- before "with";

In column 4, line 51, "the" should be --that--; and in line 52, insert --access-- after "requires";

In column 5, line 51, "withn" should be --within--;

In column 15, lines 28 and 29, place quotation marks around the numeral "0"; in line 35, place quotation marks around the numeral "7"; in line 38, place quotation marks around the numerals "2" and "4"; and in lines 39 and 42, place quotation marks around the numeral "7";

In column 16, line 24, the numeral "20" should not be in bold face type;

In column 17, line 7, the numeral "20" should not be in bold face type; and in line 8, the numeral "800" should not be in bold face type;

In column 18, line 29, the numeral "800" should not be in bold face type; and in lines 31 and 33, the numeral "100" should not be in bold face type;

In column 19, line 5, the numeral "16" should not be in bold face type; in line 62, place quotation marks around the numeral "0"; and line 63, place quotation marks about the numeral "7";

In column 20, lines 7-11, all numerals therein should be in bold face type; in line 19, the numeral "124" should be in bold face type; in line 20, the numeral "125" should be in bold face type;

UNITED STATES PATENT OFFICE

CERTIFICATE OF CORRECTION

PATENT NO. : 3,913,070

DATED : October 14, 1975

INVENTOR(S) : Donald H. Malcolm, Matthew E. Kramer

It is certified that error appears in the above-identified patent and that said Letters Patent are hereby corrected as shown below:

In column 21, in lines 30-35 and in lines 53-67, all numerals therein should be in bold face type;

In column 23, line 44, "A" should be --The--;

In column 25, lines 38-41, all numerals therein should be in bold face type; in line 42, the numeral "16" should not be in bold face type;

In column 26, lines 7 and 9, the numeral "16" should not be in bold face type; and in lines 45-47, all numerals therein should be in bold face type;

In column 27, line 29, the subscript letter on $F_{l1}$ should properly read as the numeral "1"; and in line 66, "date" should be --data--;

In column 29, lines 6-9 all numerals therein should be in bold face type;

In column 30, line 32, place quotation marks around the numeral "7"; and in line 40, the numeral "8" should not be in bold face type;

In column 32, line 16, place quotation marks around the numeral "O"; and in line 17, place quotation marks around the numeral "7";

In column 33, line 4, the numerals "752" and "754" should be in bold face type; in line 5, the numeral "755" should be in bold face type; and in line 22, the numeral "657.5" and "657.6" should be in bold face type;

UNITED STATES PATENT OFFICE

CERTIFICATE OF CORRECTION

PATENT NO. : 3,913,070

DATED : October 14, 1975

INVENTOR(S) : Donald H. Malcolm, Matthew E. Kramer

It is certified that error appears in the above-identified patent and that said Letters Patent are hereby corrected as shown below:

In column 37, line 56 the numeral "1" should not be in bold face type; and in line 57, the numeral "8" should not be in bold face type;

In column 38, in lines 26, 29, 38, 49, 52 and 61 thereof, the designation "1 of 8" should not be in bold face type;

In column 39, in lines 27, 28 and 32 thereof, the phrase "1 of 8" should not be bold face type; and in line 46, the numerals "921" and "922" should be in bold face type;

In column 41, lines 5 and 10, the numerals "8" should not be in bold face type; in line 11, "toa" should read --to a--; in line 20, "fo" should be --of--; in line 34, "111-b" should read --111-B- in line 35, delete "(0-7)." and insert --one--; and in line 38, "111B" should read --111-B--;

In column 42, line 66, "111A" should read --111-A--;

In column 46, line 43, the numeral "806" should be in bold face type;

In column 49, line 44, the phrase "1 of 8" should not be in bold face type;

In column 50, line 42, "contents" should read --contents--;

In column 52, line 6, the numeral "125" should be in bold face type;

In column 54, line 41, the numeral "125" should be in bold face type; in line 52, the whole line should be printed in regular print;

UNITED STATES PATENT OFFICE

CERTIFICATE OF CORRECTION

PATENT NO. : 3,913,070

DATED : October 14, 1975

INVENTOR(S) : Donald H. Malcolm, Matthew E. Kramer

It is certified that error appears in the above-identified patent and that said Letters Patent are hereby corrected as shown below:

and in lines 59-64, all numerals therein should be in bold face type

In column 55, line 4, the numeral "526" should be in bold face type; in line 24, the numeral "526" should be in bold face type; in line 55, the numeral "333" should be in bold face type; and in 56, the numeral "347" should be in bold face type;

In column 57, line 39, the numerals therein should be in bold face type; and in lines 53, 54 and 56, the numerals therein should all be in bold face type;

In column 58, line 44, the numeral "124" should be in bold face type; in line 45, "$P^u$" should read --$P_u$-- and the numeral "125" should be in bold face type; and in lines 48-56 and 58-67, all numerals therein should be in bold face type;

In column 59, lines 2, 3, 15, and 32-44, all numerals therein should be in bold face type;

In column 60, line 47, the numerals "124" and "125" should be in bold face type;

In column 61, line 32, after "for" insert --generating on said major cycle time period basis need determination output signals indicative of said relative real time needs of said plurality of data--; in line 40, "ocmmon" should read --common--; and in line 47 the word "selection" should be deleted;

In column 62, line 30, "reconfigured" should read --reconfigurable--;

In column 63, line 59, "reconfigured" should read --reconfigurable--;

UNITED STATES PATENT OFFICE

CERTIFICATE OF CORRECTION

PATENT NO. : 3,913,070

DATED : October 14, 1975

INVENTOR(S) : Donald H. Malcolm, Matthew E. Kramer

It is certified that error appears in the above-identified patent and that said Letters Patent are hereby corrected as shown below:

In column 65, line 19, after the word "is" delete "to"; and

In column 66, line 19, insert --means-- after "includes".

Signed and Sealed this

*fifteenth* Day of *June 1976*

[SEAL]

*Attest:*

RUTH C. MASON
*Attesting Officer*

C. MARSHALL DANN
*Commissioner of Patents and Trademarks*